United States Patent
Jackson

(10) Patent No.: US 11,861,404 B2
(45) Date of Patent: *Jan. 2, 2024

(54) SYSTEM AND METHOD OF PROVIDING SYSTEM JOBS WITHIN A COMPUTE ENVIRONMENT

(71) Applicant: III Holdings 12, LLC, Wilmington, DE (US)

(72) Inventor: David B. Jackson, Spanish Fork, UT (US)

(73) Assignee: III Holdings 12, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/985,267

(22) Filed: Nov. 11, 2022

(65) Prior Publication Data

US 2023/0130387 A1    Apr. 27, 2023

Related U.S. Application Data

(63) Continuation of application No. 17/700,847, filed on Mar. 22, 2022, now Pat. No. 11,537,435, which is a
(Continued)

(51) Int. Cl.
*G06F 9/50* (2006.01)
*G06F 9/48* (2006.01)
(Continued)

(52) U.S. Cl.
CPC .......... *G06F 9/5011* (2013.01); *G06F 9/4843* (2013.01); *G06F 9/542* (2013.01); *G06F 8/61* (2013.01)

(58) Field of Classification Search
None
See application file for complete search history.

(56) References Cited

U.S. PATENT DOCUMENTS

| 4,215,406 A | 7/1980 | Gomola et al. |
| 4,412,288 A | 10/1983 | Herman |

(Continued)

FOREIGN PATENT DOCUMENTS

| CA | 2496783 | 3/2004 |
| DE | 60216001 | 7/2007 |

(Continued)

OTHER PUBLICATIONS

US 7,774,482 B1, 08/2010, Szeto et al. (withdrawn)
(Continued)

*Primary Examiner* — Van H Nguyen
(74) *Attorney, Agent, or Firm* — Crowell & Moring LLP

(57) ABSTRACT

The disclosure relates to systems, methods and computer-readable media for using system jobs for performing actions outside the constraints of batch compute jobs submitted to a compute environment such as a cluster or a grid. The method for modifying a compute environment from a system job disclosure associating a system job to a queueable object, triggering the system job based on an event and performing arbitrary actions on resources outside of compute nodes in the compute environment. The queueable objects include objects such as batch compute jobs or job reservations. The events that trigger the system job may be time driven, such as ten minutes prior to completion of the batch compute job, or dependent on other actions associated with other system jobs. The system jobs may be utilized also to perform rolling maintenance on a node by node basis.

24 Claims, 4 Drawing Sheets

Related U.S. Application Data continuation of application No. 17/532,667, filed on Nov. 22, 2021, now Pat. No. 11,709,709, which is a continuation of application No. 17/470,209, filed on Sep. 9, 2021, now Pat. No. 11,656,907, which is a continuation of application No. 16/751,851, filed on Jan. 24, 2020, now Pat. No. 11,144,355, which is a continuation of application No. 15/437,135, filed on Feb. 20, 2017, now Pat. No. 10,585,704, which is a continuation of application No. 14/872,645, filed on Oct. 1, 2015, now Pat. No. 9,575,805, which is a continuation of application No. 13/621,987, filed on Sep. 18, 2012, now Pat. No. 9,152,455, which is a continuation of application No. 11/718,867, filed as application No. PCT/US2005/040669 on Nov. 8, 2005, now Pat. No. 8,271,980.

(60) Provisional application No. 60/625,894, filed on Nov. 8, 2004.

(51) Int. Cl.
*G06F 9/54* (2006.01)
*G06F 8/61* (2018.01)

(56) References Cited

U.S. PATENT DOCUMENTS

| | | |
|---|---|---|
| 4,525,780 A | 6/1985 | Bratt et al. |
| 4,532,893 A | 8/1985 | Day et al. |
| 4,542,458 A | 9/1985 | Kitajima |
| 4,553,202 A | 11/1985 | Trufyn |
| 4,677,614 A | 6/1987 | Circo |
| 4,850,891 A | 7/1989 | Walkup et al. |
| 4,852,001 A | 7/1989 | Tsushima et al. |
| 4,943,932 A | 7/1990 | Lark et al. |
| 4,975,840 A | 12/1990 | DeTore |
| 4,992,958 A | 2/1991 | Kageyama |
| 5,056,070 A | 10/1991 | Shibuya |
| 5,132,625 A | 7/1992 | Shaland |
| 5,146,561 A | 9/1992 | Carey et al. |
| 5,168,441 A | 12/1992 | Onarheim |
| 5,175,800 A | 12/1992 | Galis et al. |
| 5,257,374 A | 10/1993 | Hammer et al. |
| 5,276,877 A | 1/1994 | Friedrich |
| 5,299,115 A | 3/1994 | Fields et al. |
| 5,307,496 A | 4/1994 | Ichinose et al. |
| 5,325,526 A | 6/1994 | Cameron et al. |
| 5,349,682 A | 9/1994 | Rosenberry |
| 5,355,508 A | 10/1994 | Kan |
| 5,377,332 A | 12/1994 | Entwistle et al. |
| 5,408,663 A | 4/1995 | Miller |
| 5,451,936 A | 9/1995 | Yang et al. |
| 5,469,566 A | 11/1995 | Hohenstein |
| 5,473,773 A | 12/1995 | Aman et al. |
| 5,477,546 A | 12/1995 | Shibata |
| 5,495,533 A | 2/1996 | Linehan et al. |
| 5,504,894 A | 4/1996 | Ferguson et al. |
| 5,542,000 A | 7/1996 | Semba |
| 5,550,970 A | 8/1996 | Cline et al. |
| 5,594,901 A | 1/1997 | Andoh |
| 5,594,908 A | 1/1997 | Hyatt |
| 5,598,536 A | 1/1997 | Slaughter et al. |
| 5,600,844 A | 2/1997 | Shaw et al. |
| 5,623,641 A | 4/1997 | Kadoyashiki |
| 5,623,672 A | 4/1997 | Popat |
| 5,651,006 A | 7/1997 | Fujino et al. |
| 5,652,841 A | 7/1997 | Nemirovsky et al. |
| 5,666,293 A | 9/1997 | Metz |
| 5,675,739 A | 10/1997 | Eilert et al. |
| 5,701,451 A | 12/1997 | Rogers et al. |
| 5,729,754 A | 3/1998 | Estes |
| 5,732,077 A | 3/1998 | Whitehead |
| 5,734,818 A | 3/1998 | Kern et al. |
| 5,737,009 A | 4/1998 | Payton |
| 5,745,694 A | 4/1998 | Egawa |
| 5,752,030 A | 5/1998 | Konno et al. |
| 5,757,771 A | 5/1998 | Li |
| 5,761,433 A | 6/1998 | Billings |
| 5,761,475 A | 6/1998 | Yung |
| 5,761,484 A | 6/1998 | Agarwal et al. |
| 5,765,146 A | 6/1998 | Wolf |
| 5,774,660 A | 6/1998 | Brendel et al. |
| 5,774,668 A | 6/1998 | Choquier et al. |
| 5,781,187 A | 7/1998 | Gephardt et al. |
| 5,781,624 A | 7/1998 | Mitra et al. |
| 5,787,459 A | 7/1998 | Stallmo et al. |
| 5,799,174 A | 8/1998 | Muntz et al. |
| 5,801,985 A | 9/1998 | Roohparvar et al. |
| 5,826,080 A | 10/1998 | Dworzecki |
| 5,826,082 A | 10/1998 | Bishop et al. |
| 5,826,236 A | 10/1998 | Narimatsu et al. |
| 5,826,239 A | 10/1998 | Du et al. |
| 5,828,743 A | 10/1998 | Pinnell |
| 5,828,888 A | 10/1998 | Kozaki et al. |
| 5,832,517 A | 11/1998 | Knutsen, II |
| 5,854,887 A | 12/1998 | Kindell et al. |
| 5,862,478 A | 1/1999 | Cutler, Jr. et al. |
| 5,867,382 A | 2/1999 | McLaughlin |
| 5,874,789 A | 2/1999 | Su |
| 5,881,238 A | 3/1999 | Aman et al. |
| 5,901,048 A | 5/1999 | Hu |
| 5,908,468 A | 6/1999 | Hartmann |
| 5,911,143 A | 6/1999 | Deinhart et al. |
| 5,913,921 A | 6/1999 | Tosey |
| 5,918,017 A | 6/1999 | Attanasio et al. |
| 5,920,545 A | 7/1999 | Raesaenen et al. |
| 5,920,863 A | 7/1999 | McKeehan et al. |
| 5,926,798 A | 7/1999 | Carter |
| 5,930,167 A | 7/1999 | Lee et al. |
| 5,933,417 A | 8/1999 | Rottoo |
| 5,935,293 A | 8/1999 | Detering et al. |
| 5,950,190 A | 9/1999 | Yeager |
| 5,956,715 A | 9/1999 | Glasser |
| 5,958,003 A | 9/1999 | Preining et al. |
| 5,961,599 A | 10/1999 | Kalavade et al. |
| 5,968,176 A | 10/1999 | Nessett et al. |
| 5,971,804 A | 10/1999 | Gallagher et al. |
| 5,978,356 A | 11/1999 | Elwalid et al. |
| 5,987,611 A | 11/1999 | Freund |
| 6,003,061 A | 12/1999 | Jones et al. |
| 6,006,192 A | 12/1999 | Cheng et al. |
| 6,012,052 A | 1/2000 | Altschuler et al. |
| 6,021,425 A | 2/2000 | Waldron, III et al. |
| 6,032,224 A | 2/2000 | Blumenau |
| 6,052,707 A | 4/2000 | D'Souza |
| 6,055,618 A | 4/2000 | Thorson |
| 6,058,416 A | 5/2000 | Mukherjee et al. |
| 6,067,545 A | 5/2000 | Wolff |
| 6,076,174 A | 6/2000 | Freund |
| 6,078,953 A | 6/2000 | Vaid et al. |
| 6,079,863 A | 6/2000 | Furukawa |
| 6,085,238 A | 7/2000 | Yuasa et al. |
| 6,088,718 A | 7/2000 | Altschuler et al. |
| 6,092,178 A | 7/2000 | Jindal et al. |
| 6,094,712 A | 7/2000 | Follett |
| 6,097,882 A | 8/2000 | Mogul |
| 6,098,090 A | 8/2000 | Burns |
| 6,101,508 A | 8/2000 | Wolff |
| 6,105,117 A | 8/2000 | Ripley |
| 6,108,662 A | 8/2000 | Hoskins et al. |
| 6,122,664 A | 9/2000 | Boukobza |
| 6,141,214 A | 10/2000 | Ahn |
| 6,151,598 A | 11/2000 | Shaw et al. |
| 6,154,778 A | 11/2000 | Koistinen et al. |
| 6,161,170 A | 12/2000 | Burger et al. |
| 6,167,445 A | 12/2000 | Gai et al. |
| 6,175,869 B1 | 1/2001 | Ahuja et al. |
| 6,181,699 B1 | 1/2001 | Crinion et al. |
| 6,182,139 B1 | 1/2001 | Brendel et al. |
| 6,182,142 B1 | 1/2001 | Win et al. |
| 6,185,272 B1 | 2/2001 | Hiraoglu |
| 6,185,575 B1 | 2/2001 | Orcutt |

(56) References Cited

U.S. PATENT DOCUMENTS

| | | |
|---|---|---|
| 6,185,601 B1 | 2/2001 | Wolff |
| 6,189,111 B1 | 2/2001 | Alexander |
| 6,192,414 B1 | 2/2001 | Horn |
| 6,195,678 B1 | 2/2001 | Komuro |
| 6,198,741 B1 | 3/2001 | Yoshizawa et al. |
| 6,201,611 B1 | 3/2001 | Carter et al. |
| 6,202,080 B1 | 3/2001 | Lu et al. |
| 6,205,465 B1 | 3/2001 | Schoening et al. |
| 6,212,542 B1 | 4/2001 | Kahle et al. |
| 6,223,202 B1 | 4/2001 | Bayeh |
| 6,226,677 B1 | 5/2001 | Slemmer |
| 6,226,788 B1 | 5/2001 | Schoening et al. |
| 6,247,056 B1 | 6/2001 | Chou et al. |
| 6,252,878 B1 | 6/2001 | Locklear |
| 6,253,230 B1 | 6/2001 | Couland et al. |
| 6,256,704 B1 | 7/2001 | Hlava |
| 6,259,675 B1 | 7/2001 | Honda |
| 6,263,359 B1 | 7/2001 | Fong et al. |
| 6,266,667 B1 | 7/2001 | Olsson |
| 6,269,398 B1 | 7/2001 | Leong |
| 6,278,712 B1 | 8/2001 | Takihiro et al. |
| 6,282,561 B1 | 8/2001 | Jones et al. |
| 6,289,382 B1 | 9/2001 | Bowman-Amuah |
| 6,298,352 B1 | 10/2001 | Kannan et al. |
| 6,304,549 B1 | 10/2001 | Srinivasan |
| 6,314,114 B1 | 11/2001 | Coyle et al. |
| 6,314,487 B1 | 11/2001 | Hahn et al. |
| 6,314,501 B1 | 11/2001 | Gulick et al. |
| 6,314,555 B1 | 11/2001 | Ndumu et al. |
| 6,317,787 B1 | 11/2001 | Boyd et al. |
| 6,324,279 B1 | 11/2001 | Kalmanek, Jr. et al. |
| 6,327,364 B1 | 12/2001 | Shaffer et al. |
| 6,330,008 B1 | 12/2001 | Razdow et al. |
| 6,330,562 B1 | 12/2001 | Boden et al. |
| 6,330,583 B1 | 12/2001 | Reiffin |
| 6,330,605 B1 | 12/2001 | Christensen et al. |
| 6,333,936 B1 | 12/2001 | Johansson et al. |
| 6,334,114 B1 | 12/2001 | Jacobs et al. |
| 6,338,085 B1 | 1/2002 | Ramaswamy |
| 6,338,112 B1 | 1/2002 | Wipfel et al. |
| 6,339,717 B1 | 1/2002 | Baumgartl et al. |
| 6,343,311 B1 | 1/2002 | Nishida et al. |
| 6,343,488 B1 | 2/2002 | Hackfort |
| 6,345,287 B1 | 2/2002 | Fong et al. |
| 6,345,294 B1 | 2/2002 | O'Toole et al. |
| 6,349,295 B1 | 2/2002 | Tedesco |
| 6,351,775 B1 | 2/2002 | Yu |
| 6,353,844 B1 | 3/2002 | Bitar et al. |
| 6,363,434 B1 | 3/2002 | Eytchison |
| 6,363,488 B1 | 3/2002 | Ginter et al. |
| 6,366,945 B1 | 4/2002 | Fong et al. |
| 6,370,154 B1 | 4/2002 | Wickham |
| 6,370,584 B1 | 4/2002 | Bestavros et al. |
| 6,373,841 B1 | 4/2002 | Goh et al. |
| 6,374,254 B1 | 4/2002 | Cochran et al. |
| 6,374,297 B1 | 4/2002 | Wolf et al. |
| 6,384,842 B1 | 5/2002 | DeKoning |
| 6,385,302 B1 | 5/2002 | Antonucci et al. |
| 6,392,989 B1 | 5/2002 | Jardetzky et al. |
| 6,393,569 B1 | 5/2002 | Orenshteyn |
| 6,393,581 B1 | 5/2002 | Friedman et al. |
| 6,400,996 B1 | 6/2002 | Hoffberg et al. |
| 6,401,133 B1 | 6/2002 | York |
| 6,404,768 B1 | 6/2002 | Basak et al. |
| 6,405,212 B1 | 6/2002 | Samu |
| 6,405,234 B2 | 6/2002 | Ventrone |
| 6,418,459 B1 | 7/2002 | Gulick |
| 6,434,568 B1 | 8/2002 | Bowman-Amuah |
| 6,438,125 B1 | 8/2002 | Brothers |
| 6,438,134 B1 | 8/2002 | Chow et al. |
| 6,438,553 B1 | 8/2002 | Yamada |
| 6,438,594 B1 | 8/2002 | Bowman-Amuah |
| 6,438,652 B1 | 8/2002 | Jordan et al. |
| 6,442,137 B1 | 8/2002 | Yu et al. |
| 6,445,968 B1 | 9/2002 | Jalla |
| 6,446,192 B1 | 9/2002 | Narasimhan et al. |
| 6,446,206 B1 | 9/2002 | Feldbaum |
| 6,452,809 B1 | 9/2002 | Jackson et al. |
| 6,452,924 B1 | 9/2002 | Golden et al. |
| 6,453,349 B1 | 9/2002 | Kano et al. |
| 6,453,383 B1 | 9/2002 | Stoddard et al. |
| 6,460,082 B1 | 10/2002 | Lumelsky et al. |
| 6,463,454 B1 | 10/2002 | Lumelsky et al. |
| 6,464,261 B1 | 10/2002 | Dybevik et al. |
| 6,466,935 B1 | 10/2002 | Stuart |
| 6,466,965 B1 | 10/2002 | Chessell et al. |
| 6,466,980 B1 | 10/2002 | Lumelsky et al. |
| 6,477,575 B1 | 11/2002 | Koeppel |
| 6,477,580 B1 | 11/2002 | Bowman-Amuah |
| 6,487,390 B1 | 11/2002 | Virine et al. |
| 6,490,432 B1 | 12/2002 | Wegener et al. |
| 6,496,566 B1 | 12/2002 | Posthuma |
| 6,496,866 B2 | 12/2002 | Attanasio et al. |
| 6,496,872 B1 | 12/2002 | Katz et al. |
| 6,502,135 B1 | 12/2002 | Munger et al. |
| 6,505,228 B1 | 1/2003 | Schoening et al. |
| 6,507,586 B1 | 1/2003 | Satran et al. |
| 6,519,571 B1 | 2/2003 | Guheen et al. |
| 6,520,591 B1 | 2/2003 | Jun et al. |
| 6,526,442 B1 | 2/2003 | Stupek, Jr. et al. |
| 6,529,499 B1 | 3/2003 | Doshi et al. |
| 6,529,932 B1 | 3/2003 | Dadiomov et al. |
| 6,538,994 B1 | 3/2003 | Horspool |
| 6,549,940 B1 | 4/2003 | Allen et al. |
| 6,556,952 B1 | 4/2003 | Magro |
| 6,564,261 B1 | 5/2003 | Gudjonsson et al. |
| 6,571,215 B1 | 5/2003 | Mahapatro |
| 6,571,391 B1 | 5/2003 | Acharya et al. |
| 6,574,238 B1 | 6/2003 | Thrysoe |
| 6,574,632 B2 | 6/2003 | Fox et al. |
| 6,578,005 B1 | 6/2003 | Lesaint |
| 6,578,068 B1 | 6/2003 | Bowman-Amuah |
| 6,584,489 B1 | 6/2003 | Jones et al. |
| 6,584,499 B1 | 6/2003 | Jantz et al. |
| 6,587,469 B1 | 7/2003 | Bragg |
| 6,587,938 B1 | 7/2003 | Eilert et al. |
| 6,590,587 B1 | 7/2003 | Wichelman et al. |
| 6,600,898 B1 | 7/2003 | Bonet et al. |
| 6,601,234 B1 | 7/2003 | Bowman-Amuah |
| 6,606,660 B1 | 8/2003 | Bowman-Amuah |
| 6,618,820 B1 | 9/2003 | Krum |
| 6,622,168 B1 | 9/2003 | Datta |
| 6,626,077 B1 | 9/2003 | Gilbert |
| 6,628,649 B1 | 9/2003 | Raj et al. |
| 6,629,081 B1 | 9/2003 | Cornelius et al. |
| 6,629,148 B1 | 9/2003 | Ahmed et al. |
| 6,633,544 B1 | 10/2003 | Rexford et al. |
| 6,636,853 B1 | 10/2003 | Stephens, Jr. |
| 6,640,145 B2 | 10/2003 | Hoffberg et al. |
| 6,640,238 B1 | 10/2003 | Bowman-Amuah |
| 6,651,098 B1 | 11/2003 | Carroll et al. |
| 6,651,125 B2 | 11/2003 | Maergner |
| 6,661,671 B1 | 12/2003 | Franke et al. |
| 6,661,787 B1 | 12/2003 | O'Connell et al. |
| 6,662,202 B1 | 12/2003 | Krusche et al. |
| 6,662,219 B1 | 12/2003 | Nishanov et al. |
| 6,668,304 B1 | 12/2003 | Satran et al. |
| 6,678,065 B1 | 1/2004 | Hikawa |
| 6,687,257 B1 | 2/2004 | Balasubramanian |
| 6,690,400 B1 | 2/2004 | Moayyad et al. |
| 6,690,647 B1 | 2/2004 | Tang et al. |
| 6,701,318 B2 | 3/2004 | Fox et al. |
| 6,704,489 B1 | 3/2004 | Kurakake |
| 6,711,691 B1 | 3/2004 | Howard et al. |
| 6,714,778 B2 | 3/2004 | Nykanen et al. |
| 6,724,733 B1 | 4/2004 | Schuba et al. |
| 6,725,456 B1 | 4/2004 | Bruno et al. |
| 6,735,188 B1 | 5/2004 | Becker et al. |
| 6,735,630 B1 | 5/2004 | Gelvin et al. |
| 6,735,716 B1 | 5/2004 | Podanoffsky |
| 6,738,736 B1 | 5/2004 | Bond |
| 6,738,974 B1 | 5/2004 | Nageswaran |
| 6,745,246 B1 | 6/2004 | Erimli et al. |
| 6,745,262 B1 | 6/2004 | Benhase |

(56) References Cited

U.S. PATENT DOCUMENTS

| | | |
|---|---|---|
| 6,748,559 B1 | 6/2004 | Pfister |
| 6,757,723 B1 | 6/2004 | O'Toole et al. |
| 6,757,897 B1 | 6/2004 | Shi |
| 6,760,306 B1 | 7/2004 | Pan et al. |
| 6,763,519 B1 | 7/2004 | McColl et al. |
| 6,763,520 B1 | 7/2004 | Seeds |
| 6,766,389 B2 | 7/2004 | Hayter et al. |
| 6,771,661 B1 | 8/2004 | Chawla et al. |
| 6,772,211 B2 | 8/2004 | Lu et al. |
| 6,775,701 B1 | 8/2004 | Pan et al. |
| 6,779,016 B1 | 8/2004 | Aziz et al. |
| 6,781,990 B1 | 8/2004 | Puri et al. |
| 6,785,724 B1 | 8/2004 | Drainville et al. |
| 6,785,794 B2 | 8/2004 | Chase et al. |
| 6,813,676 B1 | 11/2004 | Henry et al. |
| 6,816,750 B1 | 11/2004 | Klaas |
| 6,816,903 B1 | 11/2004 | Rakoshitz et al. |
| 6,816,905 B1 | 11/2004 | Sheets et al. |
| 6,823,377 B1 | 11/2004 | Wu et al. |
| 6,826,607 B1 | 11/2004 | Gelvin et al. |
| 6,829,206 B1 | 12/2004 | Watanabe |
| 6,829,762 B2 | 12/2004 | Arimilli et al. |
| 6,832,251 B1 | 12/2004 | Gelvin et al. |
| 6,836,806 B1 | 12/2004 | Raciborski et al. |
| 6,842,430 B1 | 1/2005 | Melnik |
| 6,850,966 B2 | 2/2005 | Matsuura et al. |
| 6,857,020 B1 | 2/2005 | Chaar et al. |
| 6,857,026 B1 | 2/2005 | Cain |
| 6,857,938 B1 | 2/2005 | Smith et al. |
| 6,859,831 B1 | 2/2005 | Gelvin et al. |
| 6,859,927 B2 | 2/2005 | Moody et al. |
| 6,862,606 B1 | 3/2005 | Major et al. |
| 6,868,097 B1 | 3/2005 | Soda et al. |
| 6,874,031 B2 | 3/2005 | Corbeil |
| 6,882,718 B1 | 4/2005 | Smith |
| 6,894,792 B1 | 5/2005 | Abe |
| 6,904,460 B1 | 6/2005 | Raciborski et al. |
| 6,912,533 B1 | 6/2005 | Hornick |
| 6,922,664 B1 | 7/2005 | Fernandez et al. |
| 6,925,431 B1 | 8/2005 | Papaefstathiou |
| 6,928,471 B2 | 8/2005 | Pabari et al. |
| 6,931,640 B2 | 8/2005 | Asano et al. |
| 6,934,702 B2 | 8/2005 | Faybishenko et al. |
| 6,938,256 B2 | 8/2005 | Deng et al. |
| 6,947,982 B1 | 9/2005 | McGann et al. |
| 6,948,171 B2 | 9/2005 | Dan et al. |
| 6,950,821 B2 | 9/2005 | Faybishenko et al. |
| 6,950,833 B2 | 9/2005 | Costello et al. |
| 6,952,828 B2 | 10/2005 | Greene |
| 6,954,784 B2 | 10/2005 | Aiken et al. |
| 6,963,917 B1 | 11/2005 | Callis et al. |
| 6,963,926 B1 | 11/2005 | Robinson |
| 6,963,948 B1 | 11/2005 | Gulick |
| 6,965,930 B1 | 11/2005 | Arrowood et al. |
| 6,966,033 B1 | 11/2005 | Gasser et al. |
| 6,968,323 B1 | 11/2005 | Bansal et al. |
| 6,971,098 B2 | 11/2005 | Khare et al. |
| 6,975,609 B1 | 12/2005 | Khaleghi et al. |
| 6,977,939 B2 | 12/2005 | Joy et al. |
| 6,978,310 B1 | 12/2005 | Rodriguez et al. |
| 6,978,447 B1 | 12/2005 | Okmianski |
| 6,985,461 B2 | 1/2006 | Singh |
| 6,985,937 B1 | 1/2006 | Keshav et al. |
| 6,988,170 B2 | 1/2006 | Barroso et al. |
| 6,990,063 B1 | 1/2006 | Lenoski et al. |
| 6,990,677 B1 | 1/2006 | Pietraszak et al. |
| 6,996,821 B1 | 2/2006 | Butterworth |
| 6,996,822 B1 | 2/2006 | Willen |
| 7,003,414 B1 | 2/2006 | Wichelman et al. |
| 7,006,881 B1 | 2/2006 | Hoffberg et al. |
| 7,013,303 B2 | 3/2006 | Faybishenko et al. |
| 7,013,322 B2 | 3/2006 | Lahr |
| 7,017,186 B2 | 3/2006 | Day |
| 7,020,695 B1 | 3/2006 | Kundu et al. |
| 7,020,701 B1 | 3/2006 | Gelvin et al. |
| 7,020,719 B1 | 3/2006 | Grove et al. |
| 7,032,119 B2 | 4/2006 | Fung |
| 7,034,686 B2 | 4/2006 | Matsumura |
| 7,035,230 B1 | 4/2006 | Shaffer et al. |
| 7,035,240 B1 | 4/2006 | Balakrishnan et al. |
| 7,035,854 B2 | 4/2006 | Hsiao et al. |
| 7,035,911 B2 | 4/2006 | Lowery et al. |
| 7,043,605 B2 | 5/2006 | Suzuki |
| 7,058,070 B2 | 6/2006 | Tran et al. |
| 7,058,716 B1 | 6/2006 | Sundaresan et al. |
| 7,058,951 B2 | 6/2006 | Bril et al. |
| 7,065,579 B2 | 6/2006 | Traversat et al. |
| 7,065,764 B1 | 6/2006 | Prael et al. |
| 7,072,807 B2 | 7/2006 | Brown et al. |
| 7,076,717 B2 | 7/2006 | Grossman et al. |
| 7,080,078 B1 | 7/2006 | Slaughter et al. |
| 7,080,283 B1 | 7/2006 | Songer et al. |
| 7,080,285 B2 | 7/2006 | Kosugi |
| 7,080,378 B1 | 7/2006 | Noland et al. |
| 7,082,606 B2 | 7/2006 | Wood et al. |
| 7,085,825 B1 | 8/2006 | Pishevar et al. |
| 7,085,837 B2 | 8/2006 | Kimbrel et al. |
| 7,085,893 B2 | 8/2006 | Krissell et al. |
| 7,089,294 B1 | 8/2006 | Baskey et al. |
| 7,093,256 B2 | 8/2006 | Bloks |
| 7,095,738 B1 | 8/2006 | Desanti |
| 7,099,933 B1 | 8/2006 | Wallace et al. |
| 7,100,192 B1 | 8/2006 | Igawa et al. |
| 7,102,996 B1 | 9/2006 | Amdahl et al. |
| 7,103,625 B1 | 9/2006 | Hipp et al. |
| 7,103,664 B1 | 9/2006 | Novaes et al. |
| 7,107,578 B1 | 9/2006 | Alpern |
| 7,107,589 B1 | 9/2006 | Tal |
| 7,117,208 B2 | 10/2006 | Tamayo et al. |
| 7,117,273 B1 | 10/2006 | O'Toole et al. |
| 7,119,591 B1 | 10/2006 | Lin |
| 7,124,289 B1 | 10/2006 | Suorsa |
| 7,124,410 B2 | 10/2006 | Berg et al. |
| 7,126,913 B1 | 10/2006 | Patel et al. |
| 7,127,613 B2 | 10/2006 | Pabla et al. |
| 7,127,633 B1 | 10/2006 | Olson et al. |
| 7,136,927 B2 | 11/2006 | Traversal et al. |
| 7,140,020 B2 | 11/2006 | McCarthy et al. |
| 7,143,088 B2 | 11/2006 | Green et al. |
| 7,143,153 B1 | 11/2006 | Black et al. |
| 7,143,168 B1 | 11/2006 | DiBiasio et al. |
| 7,145,995 B2 | 12/2006 | Oltmanns et al. |
| 7,146,233 B2 | 12/2006 | Aziz et al. |
| 7,146,353 B2 | 12/2006 | Garg et al. |
| 7,146,416 B1 | 12/2006 | Yoo et al. |
| 7,150,044 B2 | 12/2006 | Hoefelmeyer et al. |
| 7,154,621 B2 | 12/2006 | Rodriguez et al. |
| 7,155,478 B2 | 12/2006 | Ims et al. |
| 7,155,502 B1 | 12/2006 | Galloway et al. |
| 7,165,107 B2 | 1/2007 | Pouyoul et al. |
| 7,165,120 B1 | 1/2007 | Giles et al. |
| 7,167,920 B2 | 1/2007 | Traversal et al. |
| 7,168,049 B2 | 1/2007 | Day |
| 7,170,315 B2 | 1/2007 | Bakker et al. |
| 7,171,415 B2 | 1/2007 | Kan et al. |
| 7,171,476 B2 | 1/2007 | Maeda et al. |
| 7,171,491 B1 | 1/2007 | O'Toole et al. |
| 7,171,593 B1 | 1/2007 | Whittaker |
| 7,177,823 B2 | 2/2007 | Lam et al. |
| 7,180,866 B1 | 2/2007 | Chartre et al. |
| 7,185,046 B2 | 2/2007 | Ferstl et al. |
| 7,185,073 B1 | 2/2007 | Gai et al. |
| 7,185,077 B1 | 2/2007 | O'Toole et al. |
| 7,188,145 B2 | 3/2007 | Lowery et al. |
| 7,188,174 B2 | 3/2007 | Rolia et al. |
| 7,191,244 B2 | 3/2007 | Jennings et al. |
| 7,197,071 B1 | 3/2007 | Weigand |
| 7,197,549 B1 | 3/2007 | Salama et al. |
| 7,197,559 B2 | 3/2007 | Goldstein et al. |
| 7,197,561 B1 | 3/2007 | Lovy et al. |
| 7,197,565 B2 | 3/2007 | Abdelaziz et al. |
| 7,200,716 B1 | 4/2007 | Aiello |
| 7,203,063 B2 | 4/2007 | Bash et al. |
| 7,203,746 B1 | 4/2007 | Harrop |

(56) References Cited

U.S. PATENT DOCUMENTS

| | | |
|---|---|---|
| 7,203,753 B2 | 4/2007 | Yeager et al. |
| 7,206,819 B2 | 4/2007 | Schmidt |
| 7,206,841 B2 | 4/2007 | Traversal et al. |
| 7,206,934 B2 | 4/2007 | Pabla et al. |
| 7,213,047 B2 | 5/2007 | Yeager et et al. |
| 7,213,050 B1 | 5/2007 | Shaffer et al. |
| 7,213,062 B1 | 5/2007 | Raciborski et al. |
| 7,213,065 B2 | 5/2007 | Watt |
| 7,216,173 B2 | 5/2007 | Clayton et al. |
| 7,222,187 B2 | 5/2007 | Yeager et al. |
| 7,222,343 B2 | 5/2007 | Heyrman et al. |
| 7,225,249 B1 | 5/2007 | Barry et al. |
| 7,225,442 B2 | 5/2007 | Dutta et al. |
| 7,228,350 B2 | 6/2007 | Hong et al. |
| 7,231,445 B1 | 6/2007 | Aweya et al. |
| 7,233,569 B1 | 6/2007 | Swallow |
| 7,233,669 B2 | 6/2007 | Candelore |
| 7,236,915 B2 | 6/2007 | Algieri et al. |
| 7,237,243 B2 | 6/2007 | Sutton et al. |
| 7,242,501 B2 | 7/2007 | Ishimoto |
| 7,243,351 B2 | 7/2007 | Kundu |
| 7,249,179 B1 | 7/2007 | Romero et al. |
| 7,251,222 B2 | 7/2007 | Chen et al. |
| 7,251,688 B2 | 7/2007 | Leighton et al. |
| 7,254,608 B2 | 8/2007 | Yeager et al. |
| 7,257,655 B1 | 8/2007 | Burney et al. |
| 7,260,846 B2 | 8/2007 | Day |
| 7,263,288 B1 | 8/2007 | Islam |
| 7,263,560 B2 | 8/2007 | Abdelaziz et al. |
| 7,263,596 B1 | 8/2007 | Wideman |
| 7,274,705 B2 | 9/2007 | Chang et al. |
| 7,275,018 B2 | 9/2007 | Abu-El-Zeet et al. |
| 7,275,102 B2 | 9/2007 | Yeager et al. |
| 7,275,249 B1 | 9/2007 | Miller et al. |
| 7,278,008 B1 | 10/2007 | Case et al. |
| 7,278,142 B2 | 10/2007 | Bandhole et al. |
| 7,278,582 B1 | 10/2007 | Siegel et al. |
| 7,281,045 B2 | 10/2007 | Aggarwal et al. |
| 7,283,838 B2 | 10/2007 | Lu |
| 7,284,109 B1 | 10/2007 | Paxie et al. |
| 7,289,619 B2 | 10/2007 | Vivadelli et al. |
| 7,289,985 B2 | 10/2007 | Zeng et al. |
| 7,293,092 B2 | 11/2007 | Sukegawa |
| 7,296,268 B2 | 11/2007 | Darling et al. |
| 7,299,294 B1 | 11/2007 | Bruck et al. |
| 7,305,464 B2 | 12/2007 | Phillipi et al. |
| 7,308,496 B2 | 12/2007 | Yeager et al. |
| 7,308,687 B2 | 12/2007 | Trossman et al. |
| 7,310,319 B2 | 12/2007 | Awsienko et al. |
| 7,313,793 B2 | 12/2007 | Traut et al. |
| 7,315,887 B1 | 1/2008 | Liang et al. |
| 7,320,025 B1 | 1/2008 | Steinberg et al. |
| 7,324,555 B1 | 1/2008 | Chen et al. |
| 7,325,050 B2 | 1/2008 | O'Connor et al. |
| 7,328,243 B2 | 2/2008 | Yeager et al. |
| 7,328,264 B2 | 2/2008 | Babka |
| 7,328,406 B2 | 2/2008 | Kalinoski et al. |
| 7,334,108 B1 | 2/2008 | Case et al. |
| 7,334,230 B2 | 2/2008 | Chung et al. |
| 7,337,333 B2 | 2/2008 | O'Conner et al. |
| 7,337,446 B2 | 2/2008 | Sankaranarayan et al. |
| 7,340,500 B2 | 3/2008 | Traversal et al. |
| 7,340,578 B1 | 3/2008 | Khanzode |
| 7,340,777 B1 | 3/2008 | Szor |
| 7,343,467 B2 | 3/2008 | Brown et al. |
| 7,349,348 B1 | 3/2008 | Johnson et al. |
| 7,350,186 B2 | 3/2008 | Coleman et al. |
| 7,353,276 B2 | 4/2008 | Bain et al. |
| 7,353,362 B2 | 4/2008 | Georgiou et al. |
| 7,353,495 B2 | 4/2008 | Somogyi |
| 7,356,655 B2 | 4/2008 | Allen et al. |
| 7,356,770 B1 | 4/2008 | Jackson |
| 7,363,346 B2 | 4/2008 | Groner et al. |
| 7,366,101 B1 | 4/2008 | Varier et al. |
| 7,366,719 B2 | 4/2008 | Shaw |
| 7,370,092 B2 | 5/2008 | Aderton et al. |
| 7,373,391 B2 | 5/2008 | Iinuma |
| 7,373,524 B2 | 5/2008 | Motsinger et al. |
| 7,376,693 B2 | 5/2008 | Neiman et al. |
| 7,380,039 B2 | 5/2008 | Miloushev et al. |
| 7,382,154 B2 | 6/2008 | Ramos et al. |
| 7,383,433 B2 | 6/2008 | Yeager et al. |
| 7,386,586 B1 | 6/2008 | Headley et al. |
| 7,386,611 B2 | 6/2008 | Dias et al. |
| 7,386,850 B2 | 6/2008 | Mullen |
| 7,386,888 B2 | 6/2008 | Liang et al. |
| 7,389,310 B1 | 6/2008 | Bhagwan et al. |
| 7,392,325 B2 | 6/2008 | Grove et al. |
| 7,392,360 B1 | 6/2008 | Aharoni |
| 7,395,536 B2 | 7/2008 | Verbeke et al. |
| 7,395,537 B1 | 7/2008 | Brown |
| 7,398,216 B2 | 7/2008 | Barnett et al. |
| 7,398,471 B1 | 7/2008 | Rambacher |
| 7,398,525 B2 | 7/2008 | Leymann |
| 7,401,114 B1 | 7/2008 | Block et al. |
| 7,401,152 B2 | 7/2008 | Traversal et al. |
| 7,401,153 B2 | 7/2008 | Traversal et al. |
| 7,401,355 B2 | 7/2008 | Supnik et al. |
| 7,403,994 B1 | 7/2008 | Vogl et al. |
| 7,409,433 B2 | 8/2008 | Lowery et al. |
| 7,412,492 B1 | 8/2008 | Waldspurger |
| 7,412,703 B2 | 8/2008 | Cleary et al. |
| 7,415,709 B2 | 8/2008 | Hipp et al. |
| 7,418,518 B2 | 8/2008 | Grove et al. |
| 7,418,534 B2 | 8/2008 | Hayter et al. |
| 7,421,402 B2 | 9/2008 | Chang et al. |
| 7,421,500 B2 | 9/2008 | Talwar et al. |
| 7,423,971 B1 | 9/2008 | Mohaban et al. |
| 7,426,489 B2 | 9/2008 | Van Soestbergen et al. |
| 7,426,546 B2 | 9/2008 | Breiter et al. |
| 7,428,540 B1 | 9/2008 | Coates et al. |
| 7,433,304 B1 | 10/2008 | Galloway et al. |
| 7,437,460 B2 | 10/2008 | Chidambaran et al. |
| 7,437,540 B2 | 10/2008 | Paolucci et al. |
| 7,437,730 B2 | 10/2008 | Goyal |
| 7,441,261 B2 | 10/2008 | Slater et al. |
| 7,447,147 B2 | 11/2008 | Nguyen et al. |
| 7,447,197 B2 | 11/2008 | Terrell et al. |
| 7,451,197 B2 | 11/2008 | Davis |
| 7,451,199 B2 | 11/2008 | Kandefer et al. |
| 7,451,201 B2 | 11/2008 | Alex et al. |
| 7,454,467 B2 | 11/2008 | Girouard et al. |
| 7,461,134 B2 | 12/2008 | Ambrose |
| 7,463,587 B2 | 12/2008 | Rajsic et al. |
| 7,464,159 B2 | 12/2008 | Luoffo et al. |
| 7,464,160 B2 | 12/2008 | Iszlai et al. |
| 7,466,712 B2 | 12/2008 | Makishima et al. |
| 7,466,810 B1 | 12/2008 | Quon et al. |
| 7,467,225 B2 | 12/2008 | Anerousis et al. |
| 7,467,306 B2 | 12/2008 | Cartes et al. |
| 7,467,358 B2 | 12/2008 | Kang et al. |
| 7,475,419 B1 | 1/2009 | Basu et al. |
| 7,483,945 B2 | 1/2009 | Blumofe |
| 7,484,008 B1 | 1/2009 | Gelvin et al. |
| 7,484,225 B2 | 1/2009 | Hugly et al. |
| 7,487,254 B2 | 2/2009 | Walsh et al. |
| 7,487,509 B2 | 2/2009 | Hugly et al. |
| 7,492,720 B2 | 2/2009 | Pruthi et al. |
| 7,496,494 B2 | 2/2009 | Altman |
| 7,502,747 B1 | 3/2009 | Pardo et al. |
| 7,502,884 B1 | 3/2009 | Shah et al. |
| 7,503,045 B1 | 3/2009 | Aziz et al. |
| 7,505,463 B2 | 3/2009 | Schuba |
| 7,512,649 B2 | 3/2009 | Faybishenko et al. |
| 7,512,894 B1 | 3/2009 | Hintermeister |
| 7,516,221 B2 | 4/2009 | Souder et al. |
| 7,516,455 B2 | 4/2009 | Matheson et al. |
| 7,519,677 B2 | 4/2009 | Lowery et al. |
| 7,519,843 B1 | 4/2009 | Buterbaugh et al. |
| 7,526,479 B2 | 4/2009 | Zenz |
| 7,529,835 B1 | 5/2009 | Agronow et al. |
| 7,533,141 B2 | 5/2009 | Nadgir et al. |
| 7,533,161 B2 | 5/2009 | Hugly et al. |
| 7,533,172 B2 | 5/2009 | Traversal et al. |

(56) References Cited

U.S. PATENT DOCUMENTS

| | | |
|---|---|---|
| 7,533,385 B1 | 5/2009 | Barnes |
| 7,536,541 B2 | 5/2009 | Isaacson |
| 7,543,052 B1 | 6/2009 | Klein |
| 7,546,553 B2 | 6/2009 | Bozak et al. |
| 7,551,614 B2 | 6/2009 | Teisberg et al. |
| 7,554,930 B2 | 6/2009 | Gaddis et al. |
| 7,555,666 B2 | 6/2009 | Brundridge et al. |
| 7,562,143 B2 | 7/2009 | Fellenstein et al. |
| 7,568,199 B2 | 7/2009 | Bozak et al. |
| 7,570,943 B2 | 8/2009 | Sorvari et al. |
| 7,571,438 B2 | 8/2009 | Jones et al. |
| 7,574,523 B2 | 8/2009 | Traversal et al. |
| 7,577,722 B1 | 8/2009 | Khandekar et al. |
| 7,577,834 B1 | 8/2009 | Traversat et al. |
| 7,577,959 B2 | 8/2009 | Nguyen et al. |
| 7,580,382 B1 | 8/2009 | Amis et al. |
| 7,580,919 B1 | 8/2009 | Hannel |
| 7,583,607 B2 | 9/2009 | Steele et al. |
| 7,583,661 B2 | 9/2009 | Chaudhuri |
| 7,584,274 B2 | 9/2009 | Bond et al. |
| 7,586,841 B2 | 9/2009 | Vasseur |
| 7,590,746 B2 | 9/2009 | Slater et al. |
| 7,590,747 B2 | 9/2009 | Coates et al. |
| 7,594,011 B2 | 9/2009 | Chandra |
| 7,594,015 B2 | 9/2009 | Bozak et al. |
| 7,596,144 B2 | 9/2009 | Pong |
| 7,596,784 B2 | 9/2009 | Abrams et al. |
| 7,599,360 B2 | 10/2009 | Edsall et al. |
| 7,606,225 B2 | 10/2009 | Xie et al. |
| 7,606,245 B2 | 10/2009 | Ma et al. |
| 7,610,266 B2 | 10/2009 | Cascaval |
| 7,610,289 B2 | 10/2009 | Muret et al. |
| 7,613,796 B2 | 11/2009 | Harvey et al. |
| 7,616,646 B1 | 11/2009 | Ma et al. |
| 7,620,057 B1 | 11/2009 | Aloni et al. |
| 7,620,635 B2 | 11/2009 | Hornick |
| 7,620,706 B2 | 11/2009 | Jackson |
| 7,624,118 B2 | 11/2009 | Schipunov et al. |
| 7,624,194 B2 | 11/2009 | Kakivaya et al. |
| 7,627,691 B1 | 12/2009 | Buchsbaum et al. |
| 7,631,066 B1 | 12/2009 | Schatz et al. |
| 7,631,307 B2 | 12/2009 | Wang et al. |
| 7,640,353 B2 | 12/2009 | Shen et al. |
| 7,640,547 B2 | 12/2009 | Neiman et al. |
| 7,644,215 B2 | 1/2010 | Wallace et al. |
| 7,657,535 B2 | 2/2010 | Moyaux et al. |
| 7,657,597 B2 | 2/2010 | Arora et al. |
| 7,657,626 B1 | 2/2010 | Zwicky |
| 7,657,677 B2 | 2/2010 | Huang et al. |
| 7,657,756 B2 | 2/2010 | Hall |
| 7,657,779 B2 | 2/2010 | Kaminsky |
| 7,660,887 B2 | 2/2010 | Reedy et al. |
| 7,660,922 B2 | 2/2010 | Harriman |
| 7,664,110 B1 | 2/2010 | Lovett et al. |
| 7,665,090 B1 | 2/2010 | Tormasov et al. |
| 7,668,809 B1 | 2/2010 | Kelly et al. |
| 7,673,164 B1 | 3/2010 | Agarwal |
| 7,680,933 B2 | 3/2010 | Fatula, Jr. |
| 7,685,281 B1 | 3/2010 | Saraiya et al. |
| 7,685,599 B2 | 3/2010 | Kanai et al. |
| 7,685,602 B1 | 3/2010 | Tran et al. |
| 7,689,661 B2 | 3/2010 | Lowery et al. |
| 7,693,976 B2 | 4/2010 | Perry et al. |
| 7,693,993 B2 | 4/2010 | Sheets et al. |
| 7,694,076 B2 | 4/2010 | Lowery et al. |
| 7,694,305 B2 | 4/2010 | Karlsson et al. |
| 7,698,386 B2 | 4/2010 | Amidon et al. |
| 7,698,398 B1 | 4/2010 | Lai |
| 7,698,430 B2 | 4/2010 | Jackson |
| 7,701,948 B2 | 4/2010 | Rabie et al. |
| 7,702,779 B1 | 4/2010 | Gupta et al. |
| 7,707,088 B2 | 4/2010 | Schmelzer |
| 7,707,185 B1 | 4/2010 | Czezatke |
| 7,710,936 B2 | 5/2010 | Morales Barroso |
| 7,711,652 B2 | 5/2010 | Schmelzer |
| 7,716,193 B2 | 5/2010 | Krishnamoorthy |
| 7,716,334 B2 | 5/2010 | Rao et al. |
| 7,719,834 B2 | 5/2010 | Miyamoto et al. |
| 7,721,125 B2 | 5/2010 | Fung |
| 7,725,583 B2 | 5/2010 | Jackson |
| 7,730,220 B2 | 6/2010 | Hasha et al. |
| 7,730,262 B2 | 6/2010 | Lowery et al. |
| 7,730,488 B2 | 6/2010 | Ilzuka et al. |
| 7,739,308 B2 | 6/2010 | Baffler et al. |
| 7,739,541 B1 | 6/2010 | Rao et al. |
| 7,742,425 B2 | 6/2010 | El-Damhougy |
| 7,742,476 B2 | 6/2010 | Branda et al. |
| 7,743,147 B2 | 6/2010 | Suorsa et al. |
| 7,747,451 B2 | 6/2010 | Keohane et al. |
| RE41,440 E | 7/2010 | Briscoe et al. |
| 7,751,433 B2 | 7/2010 | Dollo et al. |
| 7,752,258 B2 | 7/2010 | Lewin et al. |
| 7,752,624 B2 | 7/2010 | Crawford, Jr. et al. |
| 7,756,658 B2 | 7/2010 | Kulkarni et al. |
| 7,757,236 B1 | 7/2010 | Singh |
| 7,760,720 B2 | 7/2010 | Pullela et al. |
| 7,761,557 B2 | 7/2010 | Fellenstein et al. |
| 7,761,687 B2 | 7/2010 | Blumrich et al. |
| 7,765,288 B2 | 7/2010 | Bainbridge et al. |
| 7,765,299 B2 | 7/2010 | Romero |
| 7,769,620 B1 | 8/2010 | Fernandez et al. |
| 7,769,803 B2 | 8/2010 | Birdwell et al. |
| 7,770,120 B2 | 8/2010 | Baudisch |
| 7,774,331 B2 | 8/2010 | Barth et al. |
| 7,774,495 B2 | 8/2010 | Pabla et al. |
| 7,778,234 B2 | 8/2010 | Cooke et al. |
| 7,782,813 B2 | 8/2010 | Wheeler et al. |
| 7,783,777 B1 | 8/2010 | Pabla et al. |
| 7,783,786 B1 | 8/2010 | Lauterbach |
| 7,783,910 B2 | 8/2010 | Felter et al. |
| 7,788,403 B2 | 8/2010 | Darugar et al. |
| 7,788,477 B1 | 8/2010 | Huang et al. |
| 7,791,894 B2 | 9/2010 | Bechtolsheim |
| 7,792,113 B1 | 9/2010 | Foschiano et al. |
| 7,793,288 B2 | 9/2010 | Sameske |
| 7,796,399 B2 | 9/2010 | Clayton et al. |
| 7,796,619 B1 | 9/2010 | Feldmann et al. |
| 7,797,367 B1 | 9/2010 | Gelvin et al. |
| 7,797,393 B2 | 9/2010 | Qiu et al. |
| 7,801,132 B2 | 9/2010 | Ofek et al. |
| 7,802,017 B2 | 9/2010 | Uemura et al. |
| 7,805,448 B2 | 9/2010 | Andrzejak et al. |
| 7,805,575 B1 | 9/2010 | Agarwal et al. |
| 7,810,090 B2 | 10/2010 | Gebhart |
| 7,813,822 B1 | 10/2010 | Hoffberg |
| 7,827,361 B1 | 11/2010 | Karlsson et al. |
| 7,830,820 B2 | 11/2010 | Duke et al. |
| 7,831,839 B2 | 11/2010 | Hatakeyama |
| 7,840,353 B2 | 11/2010 | Ouksel et al. |
| 7,840,703 B2 | 11/2010 | Arimilli et al. |
| 7,840,810 B2 | 11/2010 | Eastham |
| 7,844,687 B1 | 11/2010 | Gelvin et al. |
| 7,844,787 B2 | 11/2010 | Ranganathan et al. |
| 7,848,262 B2 | 12/2010 | El-Damhougy |
| 7,849,139 B2 | 12/2010 | Wolfson et al. |
| 7,849,140 B2 | 12/2010 | Abdel-Aziz et al. |
| 7,853,880 B2 | 12/2010 | Porter |
| 7,860,999 B1 | 12/2010 | Subramanian et al. |
| 7,865,614 B2 | 1/2011 | Lu et al. |
| 7,886,023 B1 | 2/2011 | Johnson |
| 7,889,675 B2 | 2/2011 | Mack-Crane et al. |
| 7,890,571 B1 | 2/2011 | Kriegsman |
| 7,890,701 B2 | 2/2011 | Lowery et al. |
| 7,891,004 B1 | 2/2011 | Gelvin et al. |
| RE42,262 E | 3/2011 | Stephens, Jr. |
| 7,899,047 B2 | 3/2011 | Cabrera et al. |
| 7,899,864 B2 | 3/2011 | Margulis |
| 7,900,206 B1 | 3/2011 | Joshi et al. |
| 7,904,569 B1 | 3/2011 | Gelvin et al. |
| 7,921,169 B2 | 4/2011 | Jacobs |
| 7,925,795 B2 | 4/2011 | Tamir et al. |
| 7,930,397 B2 | 4/2011 | Midgley |
| 7,934,005 B2 | 4/2011 | Fascenda |
| 7,958,262 B2 | 6/2011 | Hasha et al. |

(56) References Cited

U.S. PATENT DOCUMENTS

| | | |
|---|---|---|
| 7,970,830 B2 | 6/2011 | Staggs |
| 7,970,929 B1 | 6/2011 | Mahalingaiah |
| 7,971,204 B2 | 6/2011 | Jackson |
| 7,975,032 B2 | 7/2011 | Lowery et al. |
| 7,975,035 B2 | 7/2011 | Popescu et al. |
| 7,975,110 B1 | 7/2011 | Spaur et al. |
| 7,984,137 B2 | 7/2011 | O'Toole, Jr. et al. |
| 7,984,183 B2 | 7/2011 | Andersen et al. |
| 7,991,817 B2 | 8/2011 | Dehon et al. |
| 7,991,922 B2 | 8/2011 | Hayter et al. |
| 7,992,151 B2 | 8/2011 | Warrier et al. |
| 7,992,983 B2 | 8/2011 | Nanjo |
| 7,995,501 B2 | 8/2011 | Jetcheva et al. |
| 7,996,510 B2 | 8/2011 | Vicente |
| 8,000,288 B2 | 8/2011 | Wheeler et al. |
| 8,014,408 B2 | 9/2011 | Habetha et al. |
| 8,018,860 B1 | 9/2011 | Cook |
| 8,019,832 B2 | 9/2011 | De Sousa et al. |
| 8,032,634 B1 | 10/2011 | Eppstein |
| 8,037,202 B2 | 10/2011 | Yeager et al. |
| 8,037,475 B1 | 10/2011 | Jackson |
| 8,041,773 B2 | 10/2011 | Abu-Ghazaleh et al. |
| 8,055,788 B1 | 11/2011 | Chan et al. |
| 8,060,552 B2 | 11/2011 | Hinni et al. |
| 8,060,619 B1 | 11/2011 | Saulpaugh |
| 8,060,760 B2 | 11/2011 | Shetty et al. |
| 8,060,775 B1 | 11/2011 | Sharma et al. |
| 8,073,978 B2 | 12/2011 | Sengupta et al. |
| 8,078,708 B1 | 12/2011 | Wang et al. |
| 8,079,118 B2 | 12/2011 | Gelvin et al. |
| 8,082,400 B1 | 12/2011 | Chang et al. |
| 8,090,880 B2 | 1/2012 | Hasha et al. |
| 8,095,600 B2 | 1/2012 | Hasha et al. |
| 8,095,601 B2 | 1/2012 | Hasha et al. |
| 8,103,543 B1 | 1/2012 | Zwicky |
| 8,108,455 B2 | 1/2012 | Yeager et al. |
| 8,108,508 B1 | 1/2012 | Goh et al. |
| 8,108,512 B2 | 1/2012 | Howard et al. |
| 8,108,930 B2 | 1/2012 | Hoefelmeyer et al. |
| 8,122,269 B2 | 2/2012 | Houlihan et al. |
| 8,132,034 B2 | 3/2012 | Lambert et al. |
| 8,135,812 B2 | 3/2012 | Lowery et al. |
| 8,140,658 B1 | 3/2012 | Gelvin et al. |
| 8,151,103 B2 | 4/2012 | Jackson |
| 8,155,113 B1 | 4/2012 | Agarwal |
| 8,156,362 B2 | 4/2012 | Branover et al. |
| 8,160,077 B2 | 4/2012 | Traversal et al. |
| 8,161,391 B2 | 4/2012 | McCleiland et al. |
| 8,165,120 B2 | 4/2012 | Maruccia et al. |
| 8,166,063 B2 | 4/2012 | Andersen et al. |
| 8,166,204 B2 | 4/2012 | Basu et al. |
| 8,170,040 B2 | 5/2012 | Konda |
| 8,171,136 B2 | 5/2012 | Petite |
| 8,176,189 B2 | 5/2012 | Traversal et al. |
| 8,176,490 B1 | 5/2012 | Jackson |
| 8,180,996 B2 | 5/2012 | Fullerton et al. |
| 8,185,776 B1 | 5/2012 | Gentes et al. |
| 8,189,612 B2 | 5/2012 | Lemaire et al. |
| 8,194,659 B2 | 6/2012 | Ban |
| 8,196,133 B2 | 6/2012 | Kakumani et al. |
| 8,199,636 B1 | 6/2012 | Rouyer et al. |
| 8,204,992 B2 | 6/2012 | Arora et al. |
| 8,205,044 B2 | 6/2012 | Lowery et al. |
| 8,205,103 B2 | 6/2012 | Kazama et al. |
| 8,205,210 B2 | 6/2012 | Cleary et al. |
| 8,244,671 B2 | 8/2012 | Chen et al. |
| 8,260,893 B1 | 9/2012 | Bandhole et al. |
| 8,261,349 B2 | 9/2012 | Peng |
| 8,266,321 B2 | 9/2012 | Johnston-Watt et al. |
| 8,271,628 B2 | 9/2012 | Lowery et al. |
| 8,271,980 B2 | 9/2012 | Jackson |
| 8,275,881 B2 | 9/2012 | Fellenstein et al. |
| 8,302,100 B2 | 10/2012 | Deng et al. |
| 8,321,048 B1 | 11/2012 | Coss et al. |
| 8,346,591 B2 | 1/2013 | Fellenstein et al. |
| 8,346,908 B1 | 1/2013 | Vanyukhin et al. |
| 8,359,397 B2 | 1/2013 | Traversal et al. |
| 8,370,898 B1 | 2/2013 | Jackson |
| 8,379,425 B2 | 2/2013 | Fukuoka et al. |
| 8,380,846 B1 | 2/2013 | Abu-Ghazaleh et al. |
| 8,386,622 B2 | 2/2013 | Jacobson |
| 8,392,515 B2 | 3/2013 | Kakivaya et al. |
| 8,396,757 B2 | 3/2013 | Fellenstein et al. |
| 8,397,092 B2 | 3/2013 | Karnowski |
| 8,402,540 B2 | 3/2013 | Kapoor et al. |
| 8,407,428 B2 | 3/2013 | Cheriton et al. |
| 8,413,155 B2 | 4/2013 | Jackson |
| 8,417,715 B1 | 4/2013 | Bruckhaus et al. |
| 8,417,813 B2 | 4/2013 | Kakivaya et al. |
| 8,458,333 B1 | 6/2013 | Stoica et al. |
| 8,463,867 B2 | 6/2013 | Robertson et al. |
| 8,464,250 B1 | 6/2013 | Ansel |
| 8,484,382 B2 | 7/2013 | Das et al. |
| 8,495,201 B2 | 7/2013 | Klincewicz |
| 8,504,663 B2 | 8/2013 | Lowery et al. |
| 8,504,791 B2 | 8/2013 | Cheriton et al. |
| 8,516,470 B1 | 8/2013 | van Rietschote |
| 8,544,017 B1 | 9/2013 | Prael et al. |
| 8,554,920 B2 | 10/2013 | Chen et al. |
| 8,560,639 B2 | 10/2013 | Murphy et al. |
| 8,572,326 B2 | 10/2013 | Lowery et al. |
| RE44,610 E | 11/2013 | Krakirian et al. |
| 8,578,130 B2 | 11/2013 | DeSota et al. |
| 8,584,129 B1 | 11/2013 | Czajkowski |
| 8,589,517 B2 | 11/2013 | Hoefelmeyer et al. |
| 8,599,863 B2 | 12/2013 | Davis |
| 8,601,595 B2 | 12/2013 | Gelvin et al. |
| 8,606,800 B2 | 12/2013 | Lagad et al. |
| 8,615,602 B2 | 12/2013 | Li et al. |
| 8,626,820 B1 | 1/2014 | Levy |
| 8,631,130 B2 | 1/2014 | Jackson |
| 8,684,802 B1 | 4/2014 | Gross et al. |
| 8,701,121 B2 | 4/2014 | Saffre |
| 8,726,278 B1 | 5/2014 | Shawver et al. |
| 8,737,410 B2 | 5/2014 | Davis |
| 8,738,860 B1 | 5/2014 | Griffin et al. |
| 8,745,275 B2 | 6/2014 | Ikeya et al. |
| 8,745,302 B2 | 6/2014 | Davis et al. |
| 8,782,120 B2 | 7/2014 | Jackson |
| 8,782,231 B2 | 7/2014 | Jackson |
| 8,782,321 B2 | 7/2014 | Harriman et al. |
| 8,782,654 B2 | 7/2014 | Jackson |
| 8,812,400 B2 | 8/2014 | Faraboschi et al. |
| 8,824,485 B2 | 9/2014 | Biswas et al. |
| 8,826,270 B1 | 9/2014 | Lewis |
| 8,854,831 B2 | 10/2014 | Arnouse |
| 8,863,143 B2 | 10/2014 | Jackson |
| 8,903,964 B2 | 12/2014 | Breslin |
| 8,924,560 B2 | 12/2014 | Pang |
| 8,930,536 B2 | 1/2015 | Jackson |
| 8,954,584 B1 | 2/2015 | Subbarayan et al. |
| 9,008,079 B2 | 4/2015 | Davis et al. |
| 9,038,078 B2 | 5/2015 | Jackson |
| 9,054,990 B2 | 6/2015 | Davis |
| 9,060,060 B2 | 6/2015 | Lobig |
| 9,069,611 B2 | 6/2015 | Jackson |
| 9,069,929 B2 | 6/2015 | Borland |
| 9,075,655 B2 | 7/2015 | Davis et al. |
| 9,075,657 B2 | 7/2015 | Jackson |
| 9,077,654 B2 | 7/2015 | Davis |
| 9,092,594 B2 | 7/2015 | Borland |
| 9,112,813 B2 | 8/2015 | Jackson |
| 9,116,755 B2 | 8/2015 | Jackson |
| 9,128,767 B2 | 9/2015 | Jackson |
| 9,152,455 B2 | 10/2015 | Jackson |
| 9,176,785 B2 | 11/2015 | Jackson |
| 9,231,886 B2 | 1/2016 | Jackson |
| 9,258,276 B2 | 2/2016 | Dalal et al. |
| 9,262,225 B2 | 2/2016 | Davis |
| 9,268,607 B2 | 2/2016 | Jackson |
| 9,288,147 B2 | 3/2016 | Kern |
| 9,304,896 B2 | 4/2016 | Chandra et al. |
| 9,311,269 B2 | 4/2016 | Davis |
| 9,367,802 B2 | 6/2016 | Arndt et al. |

(56) References Cited

U.S. PATENT DOCUMENTS

| | | |
|---|---|---|
| 9,405,584 B2 | 8/2016 | Davis |
| 9,413,687 B2 | 8/2016 | Jackson |
| 9,450,875 B1 | 9/2016 | Tong |
| 9,454,403 B2 | 9/2016 | Davis |
| 9,465,771 B2 | 10/2016 | Davis et al. |
| 9,479,463 B2 | 10/2016 | Davis |
| 9,491,064 B2 | 11/2016 | Jackson |
| 9,509,552 B2 | 11/2016 | Davis |
| 9,575,805 B2 | 2/2017 | Jackson |
| 9,585,281 B2 | 2/2017 | Schnell |
| 9,602,573 B1 | 3/2017 | Abu-Ghazaleh et al. |
| 9,619,296 B2 | 4/2017 | Jackson |
| 9,648,102 B1 | 5/2017 | Davis et al. |
| 9,680,770 B2 | 6/2017 | Davis |
| 9,749,326 B2 | 8/2017 | Davis |
| 9,778,959 B2 | 10/2017 | Jackson |
| 9,785,479 B2 | 10/2017 | Jackson |
| 9,792,249 B2 | 10/2017 | Borland |
| 9,825,860 B2 | 11/2017 | Azgin |
| 9,866,477 B2 | 1/2018 | Davis |
| 9,876,735 B2 | 1/2018 | Davis |
| 9,886,322 B2 | 2/2018 | Jackson |
| 9,929,976 B2 | 3/2018 | Davis |
| 9,959,140 B2 | 5/2018 | Jackson |
| 9,959,141 B2 | 5/2018 | Jackson |
| 9,961,013 B2 | 5/2018 | Jackson |
| 9,965,442 B2 | 5/2018 | Borland |
| 9,977,763 B2 | 5/2018 | Davis |
| 9,979,672 B2 | 5/2018 | Jackson |
| 10,021,806 B2 | 7/2018 | Schnell |
| 10,050,970 B2 | 8/2018 | Davis |
| 10,135,731 B2 | 11/2018 | Davis |
| 10,140,245 B2 | 11/2018 | Davis et al. |
| 10,212,092 B2 | 2/2019 | Dalal et al. |
| 10,277,531 B2 | 4/2019 | Jackson |
| 10,311,014 B2 | 6/2019 | Dalton |
| 10,333,862 B2 | 6/2019 | Jackson |
| 10,379,909 B2 | 8/2019 | Jackson |
| 10,445,146 B2 | 10/2019 | Jackson |
| 10,445,148 B2 | 10/2019 | Jackson |
| 10,585,704 B2 | 3/2020 | Jackson |
| 10,608,949 B2 | 3/2020 | Jackson |
| 10,733,028 B2 | 8/2020 | Jackson |
| 10,735,505 B2 | 8/2020 | Abu-Ghazaleh et al. |
| 10,871,999 B2 | 12/2020 | Jackson |
| 10,951,487 B2 | 3/2021 | Jackson |
| 10,977,090 B2 | 4/2021 | Jackson |
| 11,132,277 B2 | 9/2021 | Dalton |
| 11,134,022 B2 | 9/2021 | Jackson |
| 11,144,355 B2 | 10/2021 | Jackson |
| 11,356,385 B2 | 6/2022 | Jackson |
| 11,467,883 B2 | 10/2022 | Jackson |
| 11,494,235 B2 | 11/2022 | Jackson |
| 11,496,415 B2 | 11/2022 | Jackson |
| 11,522,811 B2 | 12/2022 | Jackson |
| 11,522,952 B2 | 12/2022 | Abu-Ghazaleh |
| 11,526,304 B2 | 12/2022 | Davis et al. |
| 11,533,274 B2 | 12/2022 | Jackson |
| 11,537,434 B2 | 12/2022 | Jackson |
| 11,537,435 B2 | 12/2022 | Jackson |
| 11,630,704 B2 | 4/2023 | Jackson |
| 11,650,857 B2 | 5/2023 | Jackson |
| 11,652,706 B2 | 5/2023 | Jackson |
| 11,656,907 B2 | 5/2023 | Jackson |
| 11,658,916 B2 | 5/2023 | Jackson |
| 11,709,709 B2 | 7/2023 | Jackson |
| 11,720,290 B2 | 8/2023 | Davis |
| 2001/0015733 A1 | 8/2001 | Sklar |
| 2001/0023431 A1 | 9/2001 | Horiguchi |
| 2001/0032109 A1 | 10/2001 | Gonyea |
| 2001/0034752 A1 | 10/2001 | Kremien |
| 2001/0037311 A1 | 11/2001 | McCoy et al. |
| 2001/0044667 A1 | 11/2001 | Nakano |
| 2001/0044759 A1 | 11/2001 | Kutsumi |
| 2001/0046227 A1 | 11/2001 | Matsuhira et al. |
| 2001/0051929 A1 | 12/2001 | Suzuki |
| 2001/0052016 A1 | 12/2001 | Skene et al. |
| 2001/0052108 A1 | 12/2001 | Bowman-Amuah |
| 2002/0002578 A1 | 1/2002 | Yamashita |
| 2002/0002636 A1 | 1/2002 | Vange et al. |
| 2002/0004833 A1 | 1/2002 | Tonouchi |
| 2002/0004912 A1 | 1/2002 | Fung |
| 2002/0007389 A1 | 1/2002 | Jones et al. |
| 2002/0010783 A1 | 1/2002 | Primak et al. |
| 2002/0016809 A1 | 2/2002 | Foulger |
| 2002/0018481 A1 | 2/2002 | Mor et al. |
| 2002/0031364 A1 | 3/2002 | Suzuki et al. |
| 2002/0032716 A1 | 3/2002 | Nagato |
| 2002/0035605 A1 | 3/2002 | Kenton |
| 2002/0040391 A1 | 4/2002 | Chaiken et al. |
| 2002/0049608 A1 | 4/2002 | Hartsell et al. |
| 2002/0052909 A1 | 5/2002 | Seeds |
| 2002/0052961 A1 | 5/2002 | Yoshimine et al. |
| 2002/0059094 A1 | 5/2002 | Hosea et al. |
| 2002/0059274 A1 | 5/2002 | Hartsell et al. |
| 2002/0062377 A1 | 5/2002 | Hillman et al. |
| 2002/0062451 A1 | 5/2002 | Scheidt et al. |
| 2002/0062465 A1 | 5/2002 | Goto |
| 2002/0065864 A1 | 5/2002 | Hartsell et al. |
| 2002/0083299 A1 | 6/2002 | Van Huben et al. |
| 2002/0083352 A1 | 6/2002 | Fujimoto et al. |
| 2002/0087611 A1 | 7/2002 | Tanaka et al. |
| 2002/0087699 A1 | 7/2002 | Karagiannis et al. |
| 2002/0090075 A1 | 7/2002 | Gabriel |
| 2002/0091786 A1 | 7/2002 | Yamaguchi et al. |
| 2002/0093915 A1 | 7/2002 | Larson |
| 2002/0097732 A1 | 7/2002 | Worster et al. |
| 2002/0099842 A1 | 7/2002 | Jennings et al. |
| 2002/0103886 A1 | 8/2002 | Rawson, III |
| 2002/0107903 A1 | 8/2002 | Richter et al. |
| 2002/0107962 A1 | 8/2002 | Richter et al. |
| 2002/0116234 A1 | 8/2002 | Nagasawa |
| 2002/0116721 A1 | 8/2002 | Dobes et al. |
| 2002/0120741 A1 | 8/2002 | Webb et al. |
| 2002/0124128 A1 | 9/2002 | Qiu |
| 2002/0129160 A1 | 9/2002 | Habetha |
| 2002/0129274 A1 | 9/2002 | Baskey et al. |
| 2002/0133537 A1 | 9/2002 | Lau et al. |
| 2002/0133821 A1 | 9/2002 | Shteyn |
| 2002/0137565 A1 | 9/2002 | Blanco |
| 2002/0138459 A1 | 9/2002 | Mandal |
| 2002/0138635 A1 | 9/2002 | Redlich et al. |
| 2002/0143855 A1 | 10/2002 | Traversat |
| 2002/0143944 A1 | 10/2002 | Traversal et al. |
| 2002/0147663 A1 | 10/2002 | Walker et al. |
| 2002/0147771 A1 | 10/2002 | Traversal et al. |
| 2002/0147810 A1 | 10/2002 | Traversal et al. |
| 2002/0151271 A1 | 10/2002 | Tatsuji |
| 2002/0152299 A1 | 10/2002 | Traversal et al. |
| 2002/0152305 A1 | 10/2002 | Jackson et al. |
| 2002/0156675 A1 | 10/2002 | Pedone |
| 2002/0156699 A1 | 10/2002 | Gray et al. |
| 2002/0156891 A1 | 10/2002 | Ulrich et al. |
| 2002/0156893 A1 | 10/2002 | Pouyoul et al. |
| 2002/0156904 A1 | 10/2002 | Gullotta et al. |
| 2002/0156984 A1 | 10/2002 | Padovano |
| 2002/0159452 A1 | 10/2002 | Foster et al. |
| 2002/0161869 A1 | 10/2002 | Griffin et al. |
| 2002/0161917 A1 | 10/2002 | Shapiro et al. |
| 2002/0166110 A1 | 11/2002 | Powell |
| 2002/0166117 A1 | 11/2002 | Abrams et al. |
| 2002/0172205 A1 | 11/2002 | Tagore-Brage et al. |
| 2002/0173984 A1 | 11/2002 | Robertson et al. |
| 2002/0174165 A1 | 11/2002 | Kawaguchi |
| 2002/0174227 A1 | 11/2002 | Hartsell et al. |
| 2002/0184129 A1 | 12/2002 | Arena |
| 2002/0184310 A1 | 12/2002 | Traversal et al. |
| 2002/0184311 A1 | 12/2002 | Traversal et al. |
| 2002/0184357 A1 | 12/2002 | Traversal et al. |
| 2002/0184358 A1 | 12/2002 | Traversal et al. |
| 2002/0186656 A1 | 12/2002 | Vu |
| 2002/0188657 A1 | 12/2002 | Traversal et al. |
| 2002/0194242 A1 | 12/2002 | Chandrasekaran |
| 2002/0194384 A1 | 12/2002 | Habetha |

(56) References Cited

U.S. PATENT DOCUMENTS

| | | |
|---|---|---|
| 2002/0194412 A1 | 12/2002 | Bottom |
| 2002/0196611 A1 | 12/2002 | Ho et al. |
| 2002/0196734 A1 | 12/2002 | Tanaka et al. |
| 2002/0198734 A1 | 12/2002 | Greene et al. |
| 2002/0198923 A1 | 12/2002 | Hayes |
| 2003/0004772 A1 | 1/2003 | Dutta et al. |
| 2003/0005130 A1 | 1/2003 | Cheng |
| 2003/0005162 A1 | 1/2003 | Habelha |
| 2003/0007493 A1 | 1/2003 | Oi et al. |
| 2003/0009506 A1 | 1/2003 | Bril et al. |
| 2003/0014503 A1 | 1/2003 | Legout et al. |
| 2003/0014524 A1 | 1/2003 | Tormasov |
| 2003/0014539 A1 | 1/2003 | Reznick |
| 2003/0014613 A1 | 1/2003 | Soni |
| 2003/0018573 A1 | 1/2003 | Comas |
| 2003/0018766 A1 | 1/2003 | Duvvuru |
| 2003/0018803 A1 | 1/2003 | El Batt et al. |
| 2003/0028585 A1 | 2/2003 | Yeager et al. |
| 2003/0028642 A1 | 2/2003 | Agarwal et al. |
| 2003/0028645 A1 | 2/2003 | Romagnoli |
| 2003/0028656 A1 | 2/2003 | Babka |
| 2003/0033547 A1 | 2/2003 | Larson et al. |
| 2003/0036820 A1 | 2/2003 | Yellepeddy et al. |
| 2003/0039246 A1 | 2/2003 | Guo et al. |
| 2003/0041141 A1 | 2/2003 | Abdelaziz et al. |
| 2003/0041238 A1 | 2/2003 | French |
| 2003/0041266 A1 | 2/2003 | Ke et al. |
| 2003/0041308 A1 | 2/2003 | Ganesan et al. |
| 2003/0046330 A1 | 3/2003 | Hayes |
| 2003/0050924 A1 | 3/2003 | Faybishenko et al. |
| 2003/0050959 A1 | 3/2003 | Faybishenko et al. |
| 2003/0050989 A1 | 3/2003 | Marinescu et al. |
| 2003/0051127 A1 | 3/2003 | Miwa |
| 2003/0055894 A1 | 3/2003 | Yeager et al. |
| 2003/0055898 A1 | 3/2003 | Yeager et al. |
| 2003/0058277 A1 | 3/2003 | Bowman-Amuah |
| 2003/0061260 A1 | 3/2003 | Rajkumar |
| 2003/0061261 A1 | 3/2003 | Greene |
| 2003/0061262 A1 | 3/2003 | Hahn et al. |
| 2003/0065703 A1 | 4/2003 | Aborn |
| 2003/0065784 A1 | 4/2003 | Herrod |
| 2003/0069828 A1 | 4/2003 | Blazey |
| 2003/0069918 A1 | 4/2003 | Lu et al. |
| 2003/0069949 A1 | 4/2003 | Chan et al. |
| 2003/0072263 A1 | 4/2003 | Peterson |
| 2003/0074090 A1 | 4/2003 | Becka |
| 2003/0076832 A1 | 4/2003 | Ni |
| 2003/0084435 A1 | 5/2003 | Messer |
| 2003/0088457 A1 | 5/2003 | Keil et al. |
| 2003/0093255 A1 | 5/2003 | Freyensee et al. |
| 2003/0093624 A1 | 5/2003 | Arimilli et al. |
| 2003/0097284 A1 | 5/2003 | Shinozaki |
| 2003/0097429 A1 | 5/2003 | Wu et al. |
| 2003/0097439 A1 | 5/2003 | Strayer et al. |
| 2003/0101084 A1 | 5/2003 | Perez |
| 2003/0103413 A1 | 6/2003 | Mandava et al. |
| 2003/0105655 A1 | 6/2003 | Kimbrel et al. |
| 2003/0105721 A1 | 6/2003 | Ginter et al. |
| 2003/0110262 A1 | 6/2003 | Hasan et al. |
| 2003/0112792 A1 | 6/2003 | Cranor et al. |
| 2003/0115562 A1 | 6/2003 | Martin |
| 2003/0120472 A1 | 6/2003 | Lind |
| 2003/0120701 A1 | 6/2003 | Pulsipher et al. |
| 2003/0120704 A1 | 6/2003 | Tran et al. |
| 2003/0120710 A1 | 6/2003 | Pulsipher et al. |
| 2003/0120780 A1 | 6/2003 | Zhu |
| 2003/0126013 A1 | 7/2003 | Shand |
| 2003/0126200 A1 | 7/2003 | Wolff |
| 2003/0126202 A1 | 7/2003 | Watt |
| 2003/0126265 A1 | 7/2003 | Aziz et al. |
| 2003/0126283 A1 | 7/2003 | Prakash et al. |
| 2003/0131043 A1 | 7/2003 | Berg et al. |
| 2003/0131209 A1 | 7/2003 | Lee |
| 2003/0135509 A1 | 7/2003 | Davis |
| 2003/0135615 A1 | 7/2003 | Wyatt |
| 2003/0135621 A1 | 7/2003 | Romagnoli |
| 2003/0140190 A1 | 7/2003 | Mahony et al. |
| 2003/0144894 A1 | 7/2003 | Robertson et al. |
| 2003/0149685 A1 | 8/2003 | Trossman et al. |
| 2003/0154112 A1 | 8/2003 | Neiman et al. |
| 2003/0158884 A1 | 8/2003 | Alford |
| 2003/0158940 A1 | 8/2003 | Leigh |
| 2003/0159083 A1 | 8/2003 | Fukuhara et al. |
| 2003/0169269 A1 | 9/2003 | Sasaki et al. |
| 2003/0172191 A1 | 9/2003 | Williams |
| 2003/0177050 A1 | 9/2003 | Crampton |
| 2003/0177121 A1 | 9/2003 | Moona et al. |
| 2003/0177334 A1 | 9/2003 | King et al. |
| 2003/0182421 A1 | 9/2003 | Faybishenko et al. |
| 2003/0182425 A1 | 9/2003 | Kurakake |
| 2003/0182429 A1 | 9/2003 | Jagels |
| 2003/0182496 A1 | 9/2003 | Yoo |
| 2003/0185229 A1 | 10/2003 | Shachar et al. |
| 2003/0187907 A1 | 10/2003 | Ito |
| 2003/0188083 A1 | 10/2003 | Kumar et al. |
| 2003/0191795 A1 | 10/2003 | Bernardin et al. |
| 2003/0191857 A1 | 10/2003 | Terrell et al. |
| 2003/0193402 A1 | 10/2003 | Post et al. |
| 2003/0195931 A1 | 10/2003 | Dauger |
| 2003/0200109 A1 | 10/2003 | Honda et al. |
| 2003/0200258 A1 | 10/2003 | Hayashi |
| 2003/0202520 A1 | 10/2003 | Witkowski et al. |
| 2003/0202709 A1 | 10/2003 | Simard et al. |
| 2003/0204709 A1 | 10/2003 | Rich |
| 2003/0204773 A1 | 10/2003 | Petersen et al. |
| 2003/0204786 A1 | 10/2003 | Dinker |
| 2003/0210694 A1 | 11/2003 | Jayaraman et al. |
| 2003/0212738 A1 | 11/2003 | Wookey et al. |
| 2003/0212792 A1 | 11/2003 | Raymond |
| 2003/0216927 A1 | 11/2003 | Sridhar |
| 2003/0216951 A1 | 11/2003 | Ginis et al. |
| 2003/0217129 A1 | 11/2003 | Knittel et al. |
| 2003/0227934 A1 | 12/2003 | White |
| 2003/0231624 A1 | 12/2003 | Alappat et al. |
| 2003/0231647 A1 | 12/2003 | Petrovykh |
| 2003/0233378 A1 | 12/2003 | Butler et al. |
| 2003/0233446 A1 | 12/2003 | Earl |
| 2003/0236745 A1 | 12/2003 | Hartsell et al. |
| 2004/0003077 A1 | 1/2004 | Bantz et al. |
| 2004/0003086 A1 | 1/2004 | Parham et al. |
| 2004/0009751 A1 | 1/2004 | Michaelis |
| 2004/0010544 A1 | 1/2004 | Slater et al. |
| 2004/0010550 A1 | 1/2004 | Gopinath |
| 2004/0010592 A1 | 1/2004 | Carver et al. |
| 2004/0011761 A1 | 1/2004 | Dewa |
| 2004/0013113 A1 | 1/2004 | Singh et al. |
| 2004/0015579 A1 | 1/2004 | Cooper et al. |
| 2004/0015973 A1 | 1/2004 | Skovira |
| 2004/0017806 A1 | 1/2004 | Yazdy et al. |
| 2004/0017808 A1 | 1/2004 | Forbes et al. |
| 2004/0024853 A1 | 2/2004 | Cates |
| 2004/0030741 A1 | 2/2004 | Wolton et al. |
| 2004/0030743 A1 | 2/2004 | Hugly et al. |
| 2004/0030794 A1 | 2/2004 | Hugly et al. |
| 2004/0030938 A1 | 2/2004 | Barr et al. |
| 2004/0034873 A1 | 2/2004 | Zenoni |
| 2004/0039815 A1 | 2/2004 | Evans et al. |
| 2004/0042487 A1 | 3/2004 | Ossman |
| 2004/0043755 A1 | 3/2004 | Shimooka |
| 2004/0044718 A1 | 3/2004 | Ferstl et al. |
| 2004/0044727 A1 | 3/2004 | Abdelaziz et al. |
| 2004/0054630 A1 | 3/2004 | Ginter et al. |
| 2004/0054777 A1 | 3/2004 | Ackaouy et al. |
| 2004/0054780 A1 | 3/2004 | Romero |
| 2004/0054807 A1 | 3/2004 | Harvey et al. |
| 2004/0054999 A1 | 3/2004 | Willen |
| 2004/0064511 A1 | 4/2004 | Abdel-Aziz et al. |
| 2004/0064512 A1 | 4/2004 | Arora et al. |
| 2004/0064568 A1 | 4/2004 | Arora et al. |
| 2004/0064817 A1 | 4/2004 | Shibayama et al. |
| 2004/0066782 A1 | 4/2004 | Nassar |
| 2004/0068676 A1 | 4/2004 | Larson et al. |
| 2004/0068730 A1 | 4/2004 | Miller et al. |
| 2004/0071147 A1 | 4/2004 | Roadknight et al. |

(56) References Cited

U.S. PATENT DOCUMENTS

| | | |
|---|---|---|
| 2004/0073650 A1 | 4/2004 | Nakamura |
| 2004/0073854 A1 | 4/2004 | Windl |
| 2004/0073908 A1 | 4/2004 | Benejam et al. |
| 2004/0081148 A1 | 4/2004 | Yamada |
| 2004/0083287 A1 | 4/2004 | Gao et al. |
| 2004/0088347 A1 | 5/2004 | Yeager et al. |
| 2004/0088348 A1 | 5/2004 | Yeager et al. |
| 2004/0088369 A1 | 5/2004 | Yeager et al. |
| 2004/0098391 A1 | 5/2004 | Robertson et al. |
| 2004/0098424 A1 | 5/2004 | Seidenberg |
| 2004/0098447 A1 | 5/2004 | Verbeke et al. |
| 2004/0103078 A1 | 5/2004 | Smedberg et al. |
| 2004/0103305 A1 | 5/2004 | Ginter et al. |
| 2004/0103339 A1 | 5/2004 | Chalasani et al. |
| 2004/0103413 A1 | 5/2004 | Mandava et al. |
| 2004/0107123 A1 | 6/2004 | Haffner |
| 2004/0107273 A1 | 6/2004 | Biran et al. |
| 2004/0107281 A1 | 6/2004 | Bose et al. |
| 2004/0109428 A1 | 6/2004 | Krishnamurthy |
| 2004/0111307 A1 | 6/2004 | Demsky et al. |
| 2004/0111612 A1 | 6/2004 | Choi et al. |
| 2004/0117610 A1 | 6/2004 | Hensley |
| 2004/0117768 A1 | 6/2004 | Chang et al. |
| 2004/0121777 A1 | 6/2004 | Schwarz et al. |
| 2004/0122970 A1 | 6/2004 | Kawaguchi et al. |
| 2004/0128495 A1 | 7/2004 | Hensley |
| 2004/0128670 A1 | 7/2004 | Robinson et al. |
| 2004/0133620 A1 | 7/2004 | Habetha |
| 2004/0133640 A1 | 7/2004 | Yeager et al. |
| 2004/0133665 A1 | 7/2004 | Deboer et al. |
| 2004/0133703 A1 | 7/2004 | Habelha |
| 2004/0135780 A1 | 7/2004 | Nims |
| 2004/0139202 A1 | 7/2004 | Talwar et al. |
| 2004/0139464 A1 | 7/2004 | Ellis et al. |
| 2004/0141521 A1 | 7/2004 | George |
| 2004/0143664 A1 | 7/2004 | Usa et al. |
| 2004/0148326 A1 | 7/2004 | Nadgir |
| 2004/0148390 A1 | 7/2004 | Cleary et al. |
| 2004/0150664 A1 | 8/2004 | Baudisch |
| 2004/0151181 A1 | 8/2004 | Chu |
| 2004/0153563 A1 | 8/2004 | Shay et al. |
| 2004/0158637 A1 | 8/2004 | Lee |
| 2004/0162871 A1 | 8/2004 | Pabla et al. |
| 2004/0165588 A1 | 8/2004 | Pandya |
| 2004/0172464 A1 | 9/2004 | Nag |
| 2004/0179528 A1 | 9/2004 | Powers et al. |
| 2004/0181370 A1 | 9/2004 | Froehlich et al. |
| 2004/0181476 A1 | 9/2004 | Smith et al. |
| 2004/0189677 A1 | 9/2004 | Amann et al. |
| 2004/0193674 A1 | 9/2004 | Kurosawa et al. |
| 2004/0194061 A1 | 9/2004 | Fujino |
| 2004/0194098 A1 | 9/2004 | Chung et al. |
| 2004/0196308 A1 | 10/2004 | Blomquist |
| 2004/0199566 A1 | 10/2004 | Carlson |
| 2004/0199621 A1 | 10/2004 | Lau |
| 2004/0199646 A1 | 10/2004 | Susai et al. |
| 2004/0199918 A1 | 10/2004 | Skovira |
| 2004/0203670 A1 | 10/2004 | King et al. |
| 2004/0204978 A1 | 10/2004 | Rayrole |
| 2004/0205101 A1 | 10/2004 | Radhakrishnan |
| 2004/0205206 A1 | 10/2004 | Naik et al. |
| 2004/0210624 A1 | 10/2004 | Andrzejak et al. |
| 2004/0210632 A1 | 10/2004 | Carlson |
| 2004/0210663 A1 | 10/2004 | Phillips |
| 2004/0210693 A1 | 10/2004 | Zeitler et al. |
| 2004/0213395 A1 | 10/2004 | Ishii et al. |
| 2004/0215780 A1 | 10/2004 | Kawato |
| 2004/0215858 A1 | 10/2004 | Armstrong |
| 2004/0215864 A1 | 10/2004 | Arimilli et al. |
| 2004/0215991 A1 | 10/2004 | McAfee et al. |
| 2004/0216121 A1 | 10/2004 | Jones et al. |
| 2004/0218615 A1 | 11/2004 | Griffin et al. |
| 2004/0221038 A1 | 11/2004 | Clarke et al. |
| 2004/0236852 A1 | 11/2004 | Birkestrand et al. |
| 2004/0243378 A1 | 12/2004 | Schnatterly et al. |
| 2004/0243466 A1 | 12/2004 | Trzybinski et al. |
| 2004/0244006 A1 | 12/2004 | Kaufman et al. |
| 2004/0246900 A1 | 12/2004 | Zhang et al. |
| 2004/0248576 A1 | 12/2004 | Ghiglino |
| 2004/0260701 A1 | 12/2004 | Lehikoinen |
| 2004/0260746 A1 | 12/2004 | Brown et al. |
| 2004/0267486 A1 | 12/2004 | Percer et al. |
| 2004/0267897 A1 | 12/2004 | Hill et al. |
| 2004/0267901 A1 | 12/2004 | Gomez |
| 2004/0268035 A1 | 12/2004 | Ueno |
| 2004/0268315 A1 | 12/2004 | Gouriou |
| 2005/0005200 A1 | 1/2005 | Matena |
| 2005/0010465 A1 | 1/2005 | Drew et al. |
| 2005/0010608 A1 | 1/2005 | Horikawa |
| 2005/0015378 A1 | 1/2005 | Gammel et al. |
| 2005/0015621 A1 | 1/2005 | Ashley et al. |
| 2005/0018604 A1 | 1/2005 | Dropps et al. |
| 2005/0018606 A1 | 1/2005 | Dropps et al. |
| 2005/0018663 A1 | 1/2005 | Dropps et al. |
| 2005/0021291 A1 | 1/2005 | Retlich |
| 2005/0021371 A1 | 1/2005 | Basone et al. |
| 2005/0021606 A1 | 1/2005 | Davies et al. |
| 2005/0021728 A1 | 1/2005 | Sugimoto |
| 2005/0021759 A1 | 1/2005 | Gupta et al. |
| 2005/0021862 A1 | 1/2005 | Schroeder et al. |
| 2005/0022188 A1 | 1/2005 | Tameshige et al. |
| 2005/0027863 A1 | 2/2005 | Talwar et al. |
| 2005/0027864 A1 | 2/2005 | Bozak et al. |
| 2005/0027865 A1 | 2/2005 | Bozak et al. |
| 2005/0027870 A1 | 2/2005 | Trebes et al. |
| 2005/0030954 A1 | 2/2005 | Dropps et al. |
| 2005/0033742 A1 | 2/2005 | Kamvar et al. |
| 2005/0033890 A1 | 2/2005 | Lee |
| 2005/0034070 A1 | 2/2005 | Meir et al. |
| 2005/0038808 A1 | 2/2005 | Kutch |
| 2005/0038835 A1 | 2/2005 | Chidambaran et al. |
| 2005/0044195 A1 | 2/2005 | Westfall |
| 2005/0044205 A1 | 2/2005 | Sankaranarayan et al. |
| 2005/0044226 A1 | 2/2005 | McDermott et al. |
| 2005/0044228 A1 | 2/2005 | Birkestrand et al. |
| 2005/0049884 A1 | 3/2005 | Hunt et al. |
| 2005/0050057 A1 | 3/2005 | Mital et al. |
| 2005/0050200 A1 | 3/2005 | Mizoguchi |
| 2005/0050270 A1 | 3/2005 | Horn et al. |
| 2005/0054354 A1 | 3/2005 | Roman et al. |
| 2005/0055322 A1 | 3/2005 | Masters et al. |
| 2005/0055442 A1 | 3/2005 | Reeves |
| 2005/0055694 A1 | 3/2005 | Lee |
| 2005/0055697 A1 | 3/2005 | Buco |
| 2005/0055698 A1 | 3/2005 | Sasaki et al. |
| 2005/0060360 A1 | 3/2005 | Doyle et al. |
| 2005/0060608 A1 | 3/2005 | Marchand |
| 2005/0065826 A1 | 3/2005 | Baker et al. |
| 2005/0066302 A1 | 3/2005 | Kanade |
| 2005/0066358 A1 | 3/2005 | Anderson et al. |
| 2005/0071843 A1 | 3/2005 | Guo et al. |
| 2005/0076145 A1 | 4/2005 | Ben-Zvi et al. |
| 2005/0077921 A1 | 4/2005 | Percer et al. |
| 2005/0080845 A1 | 4/2005 | Gopinath |
| 2005/0080891 A1 | 4/2005 | Cauthron |
| 2005/0080930 A1 | 4/2005 | Joseph |
| 2005/0081210 A1 | 4/2005 | Day |
| 2005/0086300 A1 | 4/2005 | Yeager et al. |
| 2005/0086356 A1 | 4/2005 | Shah |
| 2005/0091505 A1 | 4/2005 | Riley et al. |
| 2005/0097560 A1 | 5/2005 | Rolia et al. |
| 2005/0102396 A1 | 5/2005 | Hipp |
| 2005/0102400 A1 | 5/2005 | Nakahara |
| 2005/0102683 A1 | 5/2005 | Branson |
| 2005/0105538 A1 | 5/2005 | Perera et al. |
| 2005/0108407 A1 | 5/2005 | Johnson et al. |
| 2005/0108703 A1 | 5/2005 | Hellier |
| 2005/0113203 A1 | 5/2005 | Mueller et al. |
| 2005/0114478 A1 | 5/2005 | Popescu et al. |
| 2005/0114551 A1 | 5/2005 | Basu et al. |
| 2005/0114862 A1 | 5/2005 | Bisdikian et al. |
| 2005/0120160 A1 | 6/2005 | Plouffe et al. |
| 2005/0125213 A1 | 6/2005 | Chen et al. |
| 2005/0125537 A1 | 6/2005 | Martins et al. |

(56) References Cited

U.S. PATENT DOCUMENTS

| | | |
|---|---|---|
| 2005/0125538 A1 | 6/2005 | Tawil |
| 2005/0131898 A1 | 6/2005 | Fatula, Jr. |
| 2005/0132378 A1 | 6/2005 | Horvitz et al. |
| 2005/0132379 A1 | 6/2005 | Sankaran et al. |
| 2005/0138618 A1 | 6/2005 | Gebhart |
| 2005/0141424 A1 | 6/2005 | Lim et al. |
| 2005/0144315 A1 | 6/2005 | George et al. |
| 2005/0149940 A1 | 7/2005 | Calinescu et al. |
| 2005/0154861 A1 | 7/2005 | Arimilli et al. |
| 2005/0155033 A1 | 7/2005 | Luoffo et al. |
| 2005/0156732 A1 | 7/2005 | Matsumura |
| 2005/0160137 A1 | 7/2005 | Ishikawa et al. |
| 2005/0160413 A1 | 7/2005 | Broussard |
| 2005/0160424 A1 | 7/2005 | Broussard |
| 2005/0163143 A1 | 7/2005 | Kalantar et al. |
| 2005/0165925 A1 | 7/2005 | Dan et al. |
| 2005/0169179 A1 | 8/2005 | Antal |
| 2005/0172291 A1 | 8/2005 | Das et al. |
| 2005/0177600 A1 | 8/2005 | Eilam et al. |
| 2005/0187866 A1 | 8/2005 | Lee |
| 2005/0188088 A1 | 8/2005 | Fellenstein et al. |
| 2005/0188089 A1 | 8/2005 | Lichtenstein et al. |
| 2005/0188091 A1 | 8/2005 | Szabo et al. |
| 2005/0190236 A1 | 9/2005 | Ishimoto |
| 2005/0192771 A1 | 9/2005 | Fischer et al. |
| 2005/0193103 A1 | 9/2005 | Drabik |
| 2005/0193225 A1 | 9/2005 | Macbeth |
| 2005/0193231 A1 | 9/2005 | Scheuren |
| 2005/0195075 A1 | 9/2005 | McGraw |
| 2005/0197877 A1 | 9/2005 | Kalinoski |
| 2005/0198200 A1 | 9/2005 | Subramanian et al. |
| 2005/0202922 A1 | 9/2005 | Thomas |
| 2005/0203761 A1 | 9/2005 | Barr |
| 2005/0204040 A1 | 9/2005 | Ferri et al. |
| 2005/0206917 A1 | 9/2005 | Ferlitsch |
| 2005/0209892 A1 | 9/2005 | Miller |
| 2005/0210470 A1 | 9/2005 | Chung et al. |
| 2005/0213507 A1 | 9/2005 | Banerjee et al. |
| 2005/0213560 A1 | 9/2005 | Duvvury |
| 2005/0222885 A1 | 10/2005 | Chen et al. |
| 2005/0228852 A1 | 10/2005 | Santos et al. |
| 2005/0228856 A1 | 10/2005 | Swildens |
| 2005/0228892 A1 | 10/2005 | Riley et al. |
| 2005/0234846 A1 | 10/2005 | Davidson et al. |
| 2005/0235137 A1 | 10/2005 | Barr et al. |
| 2005/0235150 A1 | 10/2005 | Kaler et al. |
| 2005/0240688 A1 | 10/2005 | Moerman et al. |
| 2005/0243867 A1 | 11/2005 | Petite |
| 2005/0246705 A1 | 11/2005 | Etelson et al. |
| 2005/0249341 A1 | 11/2005 | Mahone et al. |
| 2005/0256942 A1 | 11/2005 | McCardle et al. |
| 2005/0256946 A1 | 11/2005 | Childress et al. |
| 2005/0259397 A1 | 11/2005 | Bash et al. |
| 2005/0259683 A1 | 11/2005 | Bishop et al. |
| 2005/0262495 A1 | 11/2005 | Fung et al. |
| 2005/0262508 A1 | 11/2005 | Asano et al. |
| 2005/0267948 A1 | 12/2005 | Mckinley et al. |
| 2005/0268063 A1 | 12/2005 | Diao et al. |
| 2005/0278392 A1 | 12/2005 | Hansen et al. |
| 2005/0278760 A1 | 12/2005 | Dewar et al. |
| 2005/0283534 A1 | 12/2005 | Bigagli et al. |
| 2005/0283782 A1 | 12/2005 | Lu et al. |
| 2005/0283822 A1 | 12/2005 | Appleby et al. |
| 2005/0288961 A1 | 12/2005 | Tabrizi |
| 2005/0289540 A1 | 12/2005 | Nguyen et al. |
| 2006/0002311 A1 | 1/2006 | Iwanaga et al. |
| 2006/0008256 A1 | 1/2006 | Khedouri et al. |
| 2006/0010445 A1 | 1/2006 | Petersen et al. |
| 2006/0013132 A1 | 1/2006 | Garnett et al. |
| 2006/0013218 A1 | 1/2006 | Shore et al. |
| 2006/0015555 A1 | 1/2006 | Douglass et al. |
| 2006/0015637 A1 | 1/2006 | Chung |
| 2006/0015651 A1 | 1/2006 | Freimuth |
| 2006/0015773 A1 | 1/2006 | Singh et al. |
| 2006/0023245 A1 | 2/2006 | Sato et al. |
| 2006/0028991 A1 | 2/2006 | Tan et al. |
| 2006/0029053 A1 | 2/2006 | Roberts et al. |
| 2006/0031379 A1 | 2/2006 | Kasriel et al. |
| 2006/0031547 A1 | 2/2006 | Tsui et al. |
| 2006/0031813 A1 | 2/2006 | Bishop et al. |
| 2006/0036743 A1 | 2/2006 | Deng et al. |
| 2006/0037016 A1 | 2/2006 | Saha et al. |
| 2006/0039246 A1 | 2/2006 | King et al. |
| 2006/0041444 A1 | 2/2006 | Flores et al. |
| 2006/0047920 A1 | 3/2006 | Moore et al. |
| 2006/0048157 A1 | 3/2006 | Dawson et al. |
| 2006/0053215 A1 | 3/2006 | Sharma |
| 2006/0053216 A1 | 3/2006 | Deokar et al. |
| 2006/0056291 A1 | 3/2006 | Baker et al. |
| 2006/0059253 A1 | 3/2006 | Goodman et al. |
| 2006/0063690 A1 | 3/2006 | Billiauw et al. |
| 2006/0069261 A1 | 3/2006 | Bonneau |
| 2006/0069671 A1 | 3/2006 | Conley et al. |
| 2006/0069774 A1 | 3/2006 | Chen et al. |
| 2006/0069926 A1 | 3/2006 | Ginter et al. |
| 2006/0074925 A1 | 4/2006 | Bixby |
| 2006/0074940 A1 | 4/2006 | Craft et al. |
| 2006/0088015 A1 | 4/2006 | Kakivaya et al. |
| 2006/0089894 A1 | 4/2006 | Balk et al. |
| 2006/0090003 A1 | 4/2006 | Kakivaya et al. |
| 2006/0090025 A1 | 4/2006 | Tufford et al. |
| 2006/0090136 A1 | 4/2006 | Miller et al. |
| 2006/0092942 A1 | 5/2006 | Newson |
| 2006/0095917 A1 | 5/2006 | Black-Ziegelbein et al. |
| 2006/0097863 A1 | 5/2006 | Horowitz et al. |
| 2006/0112184 A1 | 5/2006 | Kuo |
| 2006/0112308 A1 | 5/2006 | Crawford |
| 2006/0117208 A1 | 6/2006 | Davidson |
| 2006/0117317 A1 | 6/2006 | Crawford et al. |
| 2006/0120322 A1 | 6/2006 | Lindskog |
| 2006/0120411 A1 | 6/2006 | Basu |
| 2006/0126619 A1 | 6/2006 | Teisberg et al. |
| 2006/0126667 A1 | 6/2006 | Smith et al. |
| 2006/0129667 A1 | 6/2006 | Anderson |
| 2006/0129687 A1 | 6/2006 | Goldszmidt et al. |
| 2006/0136235 A1 | 6/2006 | Keohane et al. |
| 2006/0136570 A1 | 6/2006 | Pandya |
| 2006/0136908 A1 | 6/2006 | Gebhart et al. |
| 2006/0136928 A1 | 6/2006 | Crawford et al. |
| 2006/0136929 A1 | 6/2006 | Miller et al. |
| 2006/0140211 A1 | 6/2006 | Huang et al. |
| 2006/0143350 A1 | 6/2006 | Miloushev et al. |
| 2006/0149695 A1 | 7/2006 | Bossman et al. |
| 2006/0153191 A1 | 7/2006 | Rajsic et al. |
| 2006/0155740 A1 | 7/2006 | Chen et al. |
| 2006/0155912 A1 | 7/2006 | Singh et al. |
| 2006/0156273 A1 | 7/2006 | Narayan et al. |
| 2006/0159088 A1 | 7/2006 | Aghvami et al. |
| 2006/0161466 A1 | 7/2006 | Trinon et al. |
| 2006/0161585 A1 | 7/2006 | Clarke et al. |
| 2006/0165040 A1 | 7/2006 | Rathod |
| 2006/0168107 A1 | 7/2006 | Balan et al. |
| 2006/0168224 A1 | 7/2006 | Midgley |
| 2006/0173730 A1 | 8/2006 | Birkestrand |
| 2006/0174342 A1 | 8/2006 | Zaheer et al. |
| 2006/0179241 A1 | 8/2006 | Clark et al. |
| 2006/0184939 A1 | 8/2006 | Sahoo |
| 2006/0189349 A1 | 8/2006 | Montulli et al. |
| 2006/0190775 A1 | 8/2006 | Aggarwal et al. |
| 2006/0190975 A1 | 8/2006 | Gonzalez |
| 2006/0200773 A1 | 9/2006 | Nocera et al. |
| 2006/0206621 A1 | 9/2006 | Toebes |
| 2006/0208870 A1 | 9/2006 | Dousson |
| 2006/0212332 A1 | 9/2006 | Jackson |
| 2006/0212333 A1 | 9/2006 | Jackson |
| 2006/0212334 A1 | 9/2006 | Jackson |
| 2006/0212740 A1 | 9/2006 | Jackson |
| 2006/0218301 A1 | 9/2006 | O'Toole et al. |
| 2006/0224725 A1 | 10/2006 | Bali et al. |
| 2006/0224740 A1 | 10/2006 | Sievers-Tostes |
| 2006/0224741 A1 | 10/2006 | Jackson |
| 2006/0227810 A1 | 10/2006 | Childress et al. |
| 2006/0229920 A1 | 10/2006 | Favorel et al. |
| 2006/0230140 A1 | 10/2006 | Aoyama et al. |

(56) References Cited

U.S. PATENT DOCUMENTS

| | | |
|---|---|---|
| 2006/0230149 A1 | 10/2006 | Jackson |
| 2006/0236368 A1 | 10/2006 | Raja et al. |
| 2006/0236371 A1 | 10/2006 | Fish |
| 2006/0248141 A1 | 11/2006 | Mukherjee |
| 2006/0248197 A1 | 11/2006 | Evans et al. |
| 2006/0248359 A1 | 11/2006 | Fung |
| 2006/0250971 A1 | 11/2006 | Gammenthaler et al. |
| 2006/0251419 A1 | 11/2006 | Zadikian et al. |
| 2006/0253570 A1 | 11/2006 | Biswas et al. |
| 2006/0259734 A1 | 11/2006 | Sheu et al. |
| 2006/0265508 A1 | 11/2006 | Angel et al. |
| 2006/0265609 A1 | 11/2006 | Fung |
| 2006/0268742 A1 | 11/2006 | Chu |
| 2006/0271552 A1 | 11/2006 | McChesney et al. |
| 2006/0271928 A1 | 11/2006 | Gao et al. |
| 2006/0277278 A1 | 12/2006 | Hegde |
| 2006/0282505 A1 | 12/2006 | Hasha et al. |
| 2006/0282547 A1 | 12/2006 | Hasha et al. |
| 2006/0294219 A1 | 12/2006 | Ogawa |
| 2006/0294238 A1 | 12/2006 | Naik et al. |
| 2007/0003051 A1 | 1/2007 | Kiss et al. |
| 2007/0006001 A1 | 1/2007 | Isobe et al. |
| 2007/0011224 A1 | 1/2007 | Mena et al. |
| 2007/0011302 A1 | 1/2007 | Groner et al. |
| 2007/0022425 A1 | 1/2007 | Jackson |
| 2007/0028244 A1 | 2/2007 | Landis et al. |
| 2007/0033292 A1 | 2/2007 | Sull et al. |
| 2007/0033533 A1 | 2/2007 | Sull et al. |
| 2007/0041335 A1 | 2/2007 | Znamova et al. |
| 2007/0043591 A1 | 2/2007 | Meretei |
| 2007/0044010 A1 | 2/2007 | Sull et al. |
| 2007/0047195 A1 | 3/2007 | Merkin et al. |
| 2007/0050777 A1 | 3/2007 | Hutchinson et al. |
| 2007/0061441 A1 | 3/2007 | Landis et al. |
| 2007/0067366 A1 | 3/2007 | Landis |
| 2007/0067435 A1 | 3/2007 | Landis et al. |
| 2007/0067766 A1 | 3/2007 | Tal |
| 2007/0076653 A1 | 4/2007 | Park et al. |
| 2007/0081315 A1 | 4/2007 | Mondor et al. |
| 2007/0083899 A1 | 4/2007 | Compton et al. |
| 2007/0088822 A1 | 4/2007 | Coile et al. |
| 2007/0094002 A1 | 4/2007 | Berstis |
| 2007/0094486 A1 | 4/2007 | Moore et al. |
| 2007/0094665 A1 | 4/2007 | Jackson |
| 2007/0094691 A1 | 4/2007 | Gazdzinski |
| 2007/0109968 A1 | 5/2007 | Hussain et al. |
| 2007/0118496 A1 | 5/2007 | Bornhoevd |
| 2007/0124344 A1 | 5/2007 | Rajakannimariyan et al. |
| 2007/0130397 A1 | 6/2007 | Tsu |
| 2007/0143824 A1 | 6/2007 | Shahbazi |
| 2007/0150426 A1 | 6/2007 | Asher et al. |
| 2007/0150444 A1 | 6/2007 | Chesnais et al. |
| 2007/0155406 A1 | 7/2007 | Dowling et al. |
| 2007/0174390 A1 | 7/2007 | Silvain et al. |
| 2007/0180310 A1 | 8/2007 | Johnson et al. |
| 2007/0180380 A1 | 8/2007 | Khavari et al. |
| 2007/0204036 A1 | 8/2007 | Mohaban et al. |
| 2007/0209072 A1 | 9/2007 | Chen |
| 2007/0220520 A1 | 9/2007 | Tajima |
| 2007/0226313 A1 | 9/2007 | Li et al. |
| 2007/0226795 A1 | 9/2007 | Conti et al. |
| 2007/0233828 A1 | 10/2007 | Gilbert et al. |
| 2007/0237115 A1 | 10/2007 | Bae |
| 2007/0240162 A1 | 10/2007 | Coleman et al. |
| 2007/0253017 A1 | 11/2007 | Czyszczewski et al. |
| 2007/0260716 A1 | 11/2007 | Gnanasambandam et al. |
| 2007/0264986 A1 | 11/2007 | Warrillow et al. |
| 2007/0266136 A1 | 11/2007 | Esfahany et al. |
| 2007/0268909 A1 | 11/2007 | Chen |
| 2007/0271375 A1 | 11/2007 | Hwang |
| 2007/0280230 A1 | 12/2007 | Park |
| 2007/0286009 A1 | 12/2007 | Norman |
| 2007/0288585 A1 | 12/2007 | Sekiguchi et al. |
| 2007/0297350 A1 | 12/2007 | Eilam et al. |
| 2007/0299946 A1 | 12/2007 | El-Damhougy et al. |
| 2007/0299947 A1 | 12/2007 | El-Damhougy et al. |
| 2007/0299950 A1 | 12/2007 | Kulkarni et al. |
| 2008/0013453 A1 | 1/2008 | Chiang et al. |
| 2008/0016198 A1 | 1/2008 | Johnston-Watt et al. |
| 2008/0034082 A1 | 2/2008 | McKinney |
| 2008/0040463 A1 | 2/2008 | Brown et al. |
| 2008/0052437 A1 | 2/2008 | Loffink et al. |
| 2008/0059782 A1 | 3/2008 | Kruse et al. |
| 2008/0065835 A1 | 3/2008 | Lacobovici |
| 2008/0075089 A1 | 3/2008 | Evans et al. |
| 2008/0082663 A1 | 4/2008 | Mouli et al. |
| 2008/0089358 A1 | 4/2008 | Basso et al. |
| 2008/0104231 A1 | 5/2008 | Dey et al. |
| 2008/0104264 A1 | 5/2008 | Duerk et al. |
| 2008/0126523 A1 | 5/2008 | Tantrum |
| 2008/0140771 A1 | 6/2008 | Vass et al. |
| 2008/0140930 A1 | 6/2008 | Hotchkiss |
| 2008/0155070 A1 | 6/2008 | El-Damhougy et al. |
| 2008/0155100 A1 | 6/2008 | Ahmed et al. |
| 2008/0159745 A1 | 7/2008 | Segal |
| 2008/0162691 A1 | 7/2008 | Zhang et al. |
| 2008/0168451 A1 | 7/2008 | Challenger et al. |
| 2008/0183865 A1 | 7/2008 | Appleby et al. |
| 2008/0183882 A1 | 7/2008 | Flynn et al. |
| 2008/0184248 A1 | 7/2008 | Barua et al. |
| 2008/0186965 A1 | 8/2008 | Zheng et al. |
| 2008/0196043 A1 | 8/2008 | Feinleib |
| 2008/0199133 A1 | 8/2008 | Takizawa et al. |
| 2008/0212273 A1 | 9/2008 | Bechtolsheim |
| 2008/0212276 A1 | 9/2008 | Bottom et al. |
| 2008/0215730 A1 | 9/2008 | Sundaram et al. |
| 2008/0216082 A1 | 9/2008 | Eilam et al. |
| 2008/0217021 A1 | 9/2008 | Lembcke et al. |
| 2008/0222434 A1 | 9/2008 | Shimizu et al. |
| 2008/0232378 A1 | 9/2008 | Moorthy |
| 2008/0235443 A1 | 9/2008 | Chow et al. |
| 2008/0235702 A1 | 9/2008 | Eilam et al. |
| 2008/0239649 A1 | 10/2008 | Bradicich |
| 2008/0243634 A1 | 10/2008 | Dworkin et al. |
| 2008/0250181 A1 | 10/2008 | Li et al. |
| 2008/0255953 A1 | 10/2008 | Chang et al. |
| 2008/0259555 A1 | 10/2008 | Bechtolsheim et al. |
| 2008/0259788 A1 | 10/2008 | Wang et al. |
| 2008/0263131 A1 | 10/2008 | Hinni et al. |
| 2008/0263558 A1 | 10/2008 | Lin et al. |
| 2008/0266793 A1 | 10/2008 | Lee |
| 2008/0270599 A1 | 10/2008 | Tamir et al. |
| 2008/0270731 A1 | 10/2008 | Bryant et al. |
| 2008/0279167 A1 | 11/2008 | Cardei et al. |
| 2008/0288646 A1 | 11/2008 | Hasha et al. |
| 2008/0288659 A1 | 11/2008 | Hasha et al. |
| 2008/0288660 A1 | 11/2008 | Balasubramanian et al. |
| 2008/0288664 A1 | 11/2008 | Pettey et al. |
| 2008/0288683 A1 | 11/2008 | Ramey |
| 2008/0288873 A1 | 11/2008 | McCardle et al. |
| 2008/0289029 A1 | 11/2008 | Kim et al. |
| 2008/0301226 A1 | 12/2008 | Cleary et al. |
| 2008/0301379 A1 | 12/2008 | Pong |
| 2008/0301794 A1 | 12/2008 | Lee |
| 2008/0304481 A1 | 12/2008 | Gurney |
| 2008/0310848 A1 | 12/2008 | Yasuda et al. |
| 2008/0313293 A1 | 12/2008 | Jacobs |
| 2008/0313369 A1 | 12/2008 | Verdoorn et al. |
| 2008/0313482 A1 | 12/2008 | Karlapalem et al. |
| 2008/0320121 A1 | 12/2008 | Altaf et al. |
| 2008/0320161 A1 | 12/2008 | Maruccia et al. |
| 2008/0320482 A1 | 12/2008 | Dawson |
| 2009/0010153 A1 | 1/2009 | Filsfils et al. |
| 2009/0021907 A1 | 1/2009 | Mann et al. |
| 2009/0043809 A1 | 2/2009 | Fakhouri et al. |
| 2009/0043888 A1 | 2/2009 | Jackson |
| 2009/0044036 A1 | 2/2009 | Merkin |
| 2009/0049443 A1 | 2/2009 | Powers et al. |
| 2009/0055542 A1 | 2/2009 | Zhoa et al. |
| 2009/0055691 A1 | 2/2009 | Ouksel et al. |
| 2009/0063443 A1 | 3/2009 | Arimilli et al. |
| 2009/0063690 A1 | 3/2009 | Verthein et al. |
| 2009/0064287 A1 | 3/2009 | Bagepalli et al. |
| 2009/0070771 A1 | 3/2009 | Yuyitung et al. |

(56) References Cited

U.S. PATENT DOCUMENTS

| | | |
|---|---|---|
| 2009/0080428 A1 | 3/2009 | Witkowski et al. |
| 2009/0083390 A1 | 3/2009 | Abu-Ghazaleh et al. |
| 2009/0089410 A1 | 4/2009 | Vicente et al. |
| 2009/0094380 A1 | 4/2009 | Qiu et al. |
| 2009/0097200 A1 | 4/2009 | Sharma et al. |
| 2009/0100133 A1 | 4/2009 | Giulio et al. |
| 2009/0103501 A1 | 4/2009 | Farrag et al. |
| 2009/0105059 A1 | 4/2009 | Dorry et al. |
| 2009/0113056 A1 | 4/2009 | Tameshige et al. |
| 2009/0113130 A1 | 4/2009 | He et al. |
| 2009/0133129 A1 | 5/2009 | Jeong et al. |
| 2009/0135751 A1 | 5/2009 | Hodges et al. |
| 2009/0135835 A1 | 5/2009 | Gallatin et al. |
| 2009/0138594 A1 | 5/2009 | Fellenstein et al. |
| 2009/0150566 A1 | 6/2009 | Malkhi |
| 2009/0158070 A1 | 6/2009 | Gruendler |
| 2009/0172423 A1 | 7/2009 | Song et al. |
| 2009/0178132 A1 | 7/2009 | Hudis et al. |
| 2009/0182836 A1 | 7/2009 | Aviles |
| 2009/0187425 A1 | 7/2009 | Thompson et al. |
| 2009/0198958 A1 | 8/2009 | Arimilli et al. |
| 2009/0204834 A1 | 8/2009 | Hendin et al. |
| 2009/0204837 A1 | 8/2009 | Raval et al. |
| 2009/0210356 A1 | 8/2009 | Abrams et al. |
| 2009/0210495 A1 | 8/2009 | Wolfson et al. |
| 2009/0216881 A1 | 8/2009 | Lovy et al. |
| 2009/0216910 A1 | 8/2009 | Duchesneau |
| 2009/0216920 A1 | 8/2009 | Lauterbach et al. |
| 2009/0217329 A1 | 8/2009 | Riedl et al. |
| 2009/0219827 A1 | 9/2009 | Chen et al. |
| 2009/0222884 A1 | 9/2009 | Shaji et al. |
| 2009/0225360 A1 | 9/2009 | Shirai |
| 2009/0225751 A1 | 9/2009 | Koenck et al. |
| 2009/0234917 A1 | 9/2009 | Despotovic et al. |
| 2009/0234962 A1 | 9/2009 | Strong et al. |
| 2009/0234974 A1 | 9/2009 | Arndt et al. |
| 2009/0235104 A1 | 9/2009 | Fung |
| 2009/0238349 A1 | 9/2009 | Pezzutti |
| 2009/0240547 A1 | 9/2009 | Fellenstein et al. |
| 2009/0248943 A1 | 10/2009 | Jiang et al. |
| 2009/0251867 A1 | 10/2009 | Sharma |
| 2009/0257440 A1 | 10/2009 | Yan |
| 2009/0259606 A1 | 10/2009 | Seah et al. |
| 2009/0259863 A1 | 10/2009 | Williams et al. |
| 2009/0259864 A1 | 10/2009 | Li et al. |
| 2009/0265045 A1 | 10/2009 | Coxe, III |
| 2009/0271656 A1 | 10/2009 | Yokota et al. |
| 2009/0276666 A1 | 11/2009 | Haley et al. |
| 2009/0279518 A1 | 11/2009 | Falk et al. |
| 2009/0282274 A1 | 11/2009 | Langgood et al. |
| 2009/0282419 A1 | 11/2009 | Mejdrich et al. |
| 2009/0285136 A1 | 11/2009 | Sun et al. |
| 2009/0287835 A1 | 11/2009 | Jacobson et al. |
| 2009/0292824 A1 | 11/2009 | Marashi et al. |
| 2009/0300608 A1 | 12/2009 | Ferris et al. |
| 2009/0313390 A1 | 12/2009 | Ahuja et al. |
| 2009/0316687 A1 | 12/2009 | Kruppa et al. |
| 2009/0319684 A1 | 12/2009 | Kakivaya et al. |
| 2009/0323691 A1 | 12/2009 | Johnson |
| 2009/0327079 A1 | 12/2009 | Parker et al. |
| 2009/0327489 A1 | 12/2009 | Swildens et al. |
| 2010/0005331 A1 | 1/2010 | Somasundaram et al. |
| 2010/0008038 A1 | 1/2010 | Coglitore |
| 2010/0008365 A1 | 1/2010 | Porat |
| 2010/0026408 A1 | 2/2010 | Shau |
| 2010/0036945 A1 | 2/2010 | Allibhoy et al. |
| 2010/0040053 A1 | 2/2010 | Gottumukkula et al. |
| 2010/0049822 A1 | 2/2010 | Davies et al. |
| 2010/0049931 A1 | 2/2010 | Jacobson et al. |
| 2010/0051391 A1 | 3/2010 | Jahkonen |
| 2010/0070675 A1 | 3/2010 | Yamazaki |
| 2010/0082788 A1 | 4/2010 | Mundy |
| 2010/0088205 A1 | 4/2010 | Robertson |
| 2010/0088490 A1 | 4/2010 | Chakradhar |
| 2010/0091676 A1 | 4/2010 | Moran et al. |
| 2010/0103837 A1 | 4/2010 | Jungck et al. |
| 2010/0106987 A1 | 4/2010 | Lambert et al. |
| 2010/0114531 A1 | 5/2010 | Korn et al. |
| 2010/0118880 A1 | 5/2010 | Kunz et al. |
| 2010/0121932 A1 | 5/2010 | Joshi et al. |
| 2010/0121947 A1 | 5/2010 | Pirzada et al. |
| 2010/0122251 A1 | 5/2010 | Karc |
| 2010/0125742 A1 | 5/2010 | Ohtani |
| 2010/0125915 A1 | 5/2010 | Hall et al. |
| 2010/0131324 A1 | 5/2010 | Ferris et al. |
| 2010/0131624 A1 | 5/2010 | Ferris |
| 2010/0138481 A1 | 6/2010 | Behrens |
| 2010/0153546 A1 | 6/2010 | Clubb et al. |
| 2010/0158005 A1 | 6/2010 | Mukhopadhyay et al. |
| 2010/0161909 A1 | 6/2010 | Nation et al. |
| 2010/0165983 A1 | 7/2010 | Aybay et al. |
| 2010/0169477 A1 | 7/2010 | Stienhans et al. |
| 2010/0169479 A1 | 7/2010 | Jeong et al. |
| 2010/0169888 A1 | 7/2010 | Hare et al. |
| 2010/0174604 A1 | 7/2010 | Mattingly et al. |
| 2010/0174813 A1 | 7/2010 | Hildreth et al. |
| 2010/0198972 A1 | 8/2010 | Umbehocker |
| 2010/0198985 A1 | 8/2010 | Kanevsky |
| 2010/0217801 A1 | 8/2010 | Leighton et al. |
| 2010/0218194 A1 | 8/2010 | Dallman et al. |
| 2010/0220732 A1 | 9/2010 | Hussain et al. |
| 2010/0223332 A1 | 9/2010 | Maxemchuk et al. |
| 2010/0228848 A1 | 9/2010 | Kis et al. |
| 2010/0235234 A1 | 9/2010 | Shuster |
| 2010/0250914 A1 | 9/2010 | Abdul et al. |
| 2010/0262650 A1 | 10/2010 | Chauhan |
| 2010/0265650 A1 | 10/2010 | Chen et al. |
| 2010/0281166 A1 | 11/2010 | Buyya et al. |
| 2010/0281246 A1 | 11/2010 | Bristow et al. |
| 2010/0299548 A1 | 11/2010 | Chadirchi et al. |
| 2010/0302129 A1 | 12/2010 | Kastrup et al. |
| 2010/0308897 A1 | 12/2010 | Evoy et al. |
| 2010/0312910 A1 | 12/2010 | Lin et al. |
| 2010/0312969 A1 | 12/2010 | Yamazaki et al. |
| 2010/0318665 A1 | 12/2010 | Demmer et al. |
| 2010/0318812 A1 | 12/2010 | Auradkar et al. |
| 2010/0325371 A1 | 12/2010 | Jagadish et al. |
| 2010/0332262 A1 | 12/2010 | Horvitz et al. |
| 2010/0333116 A1 | 12/2010 | Prahlad |
| 2011/0023104 A1 | 1/2011 | Franklin |
| 2011/0026397 A1 | 2/2011 | Saltsidis et al. |
| 2011/0029644 A1 | 2/2011 | Gelvin et al. |
| 2011/0029652 A1 | 2/2011 | Chhuor et al. |
| 2011/0035491 A1 | 2/2011 | Gelvin et al. |
| 2011/0055627 A1 | 3/2011 | Zawacki et al. |
| 2011/0058573 A1 | 3/2011 | Balakavi et al. |
| 2011/0075369 A1 | 3/2011 | Sun et al. |
| 2011/0082928 A1 | 4/2011 | Hasha et al. |
| 2011/0090633 A1 | 4/2011 | Rabinovitz |
| 2011/0103391 A1 | 5/2011 | Davis |
| 2011/0113083 A1 | 5/2011 | Shahar |
| 2011/0113115 A1 | 5/2011 | Chang et al. |
| 2011/0119344 A1 | 5/2011 | Eustis |
| 2011/0123014 A1 | 5/2011 | Smith |
| 2011/0138046 A1 | 6/2011 | Bonnier et al. |
| 2011/0145393 A1 | 6/2011 | Ben-Zvi et al. |
| 2011/0153953 A1 | 6/2011 | Khemani et al. |
| 2011/0154318 A1 | 6/2011 | Oshins et al. |
| 2011/0154371 A1 | 6/2011 | Beale |
| 2011/0167110 A1 | 7/2011 | Hoffberg et al. |
| 2011/0173295 A1 | 7/2011 | Bakke et al. |
| 2011/0173612 A1 | 7/2011 | El Zur et al. |
| 2011/0179134 A1 | 7/2011 | Mayo et al. |
| 2011/0185370 A1 | 7/2011 | Tamir et al. |
| 2011/0191514 A1 | 8/2011 | Wu et al. |
| 2011/0191610 A1 | 8/2011 | Agarwal et al. |
| 2011/0197012 A1 | 8/2011 | Liao et al. |
| 2011/0210975 A1 | 9/2011 | Wong et al. |
| 2011/0213869 A1 | 9/2011 | Korsunsky et al. |
| 2011/0231510 A1 | 9/2011 | Korsunsky et al. |
| 2011/0231564 A1 | 9/2011 | Korsunsky et al. |
| 2011/0238841 A1 | 9/2011 | Kakivaya et al. |
| 2011/0238855 A1 | 9/2011 | Korsunsky et al. |
| 2011/0239014 A1 | 9/2011 | Karnowski |

(56) References Cited

U.S. PATENT DOCUMENTS

| | | |
|---|---|---|
| 2011/0271159 A1 | 11/2011 | Ahn et al. |
| 2011/0273840 A1 | 11/2011 | Chen |
| 2011/0274108 A1 | 11/2011 | Fan |
| 2011/0295991 A1 | 12/2011 | Aida |
| 2011/0296141 A1 | 12/2011 | Daffron |
| 2011/0307887 A1 | 12/2011 | Huang et al. |
| 2011/0314465 A1 | 12/2011 | Smith et al. |
| 2011/0320540 A1 | 12/2011 | Oostlander et al. |
| 2011/0320690 A1 | 12/2011 | Petersen et al. |
| 2012/0011500 A1 | 1/2012 | Faraboschi et al. |
| 2012/0020207 A1 | 1/2012 | Corti et al. |
| 2012/0036237 A1 | 2/2012 | Hasha et al. |
| 2012/0042196 A1 | 2/2012 | Aron |
| 2012/0050981 A1 | 3/2012 | Xu et al. |
| 2012/0054469 A1 | 3/2012 | Ikeya et al. |
| 2012/0054511 A1 | 3/2012 | Brinks et al. |
| 2012/0072997 A1 | 3/2012 | Carlson et al. |
| 2012/0081850 A1 | 4/2012 | Regimbal et al. |
| 2012/0096211 A1 | 4/2012 | Davis et al. |
| 2012/0099265 A1 | 4/2012 | Reber |
| 2012/0102457 A1 | 4/2012 | Tal |
| 2012/0110055 A1 | 5/2012 | Van Biljon et al. |
| 2012/0110180 A1 | 5/2012 | Van Biljon et al. |
| 2012/0110188 A1 | 5/2012 | Van Biljon et al. |
| 2012/0110651 A1 | 5/2012 | Van Biljon et al. |
| 2012/0117229 A1 | 5/2012 | Van Biljon et al. |
| 2012/0131201 A1 | 5/2012 | Matthews et al. |
| 2012/0137004 A1 | 5/2012 | Smith |
| 2012/0151476 A1 | 6/2012 | Vincent |
| 2012/0155168 A1 | 6/2012 | Kim et al. |
| 2012/0159116 A1 | 6/2012 | Lim et al. |
| 2012/0167083 A1 | 6/2012 | Suit |
| 2012/0167084 A1 | 6/2012 | Suit |
| 2012/0167094 A1 | 6/2012 | Suit |
| 2012/0185334 A1 | 7/2012 | Sarkar et al. |
| 2012/0191860 A1 | 7/2012 | Traversal et al. |
| 2012/0198075 A1 | 8/2012 | Crowe |
| 2012/0198252 A1 | 8/2012 | Kirschtein et al. |
| 2012/0207165 A1 | 8/2012 | Davis |
| 2012/0209989 A1 | 8/2012 | Stewart |
| 2012/0218901 A1 | 8/2012 | Jungck et al. |
| 2012/0222033 A1 | 8/2012 | Byrum |
| 2012/0226788 A1 | 9/2012 | Jackson |
| 2012/0239479 A1 | 9/2012 | Amaro et al. |
| 2012/0278378 A1 | 11/2012 | Lehane et al. |
| 2012/0278430 A1 | 11/2012 | Lehane et al. |
| 2012/0278464 A1 | 11/2012 | Lehane et al. |
| 2012/0296974 A1 | 11/2012 | Tabe et al. |
| 2012/0297042 A1 | 11/2012 | Davis et al. |
| 2012/0324005 A1 | 12/2012 | Nalawade |
| 2013/0010639 A1 | 1/2013 | Armstrong et al. |
| 2013/0024645 A1 | 1/2013 | Cheriton et al. |
| 2013/0031331 A1 | 1/2013 | Cheriton et al. |
| 2013/0036236 A1 | 2/2013 | Morales et al. |
| 2013/0058250 A1 | 3/2013 | Casado et al. |
| 2013/0060839 A1 | 3/2013 | Van Biljon et al. |
| 2013/0066940 A1 | 3/2013 | Shao |
| 2013/0073602 A1 | 3/2013 | Meadway et al. |
| 2013/0073724 A1 | 3/2013 | Parashar et al. |
| 2013/0086298 A1 | 4/2013 | Alanis |
| 2013/0094499 A1 | 4/2013 | Davis et al. |
| 2013/0097351 A1 | 4/2013 | Davis |
| 2013/0097448 A1 | 4/2013 | Davis et al. |
| 2013/0107444 A1 | 5/2013 | Schnell |
| 2013/0111107 A1 | 5/2013 | Chang et al. |
| 2013/0124417 A1 | 5/2013 | Spears et al. |
| 2013/0145375 A1 | 6/2013 | Kang |
| 2013/0148667 A1 | 6/2013 | Hama et al. |
| 2013/0163605 A1 | 6/2013 | Chandra et al. |
| 2013/0191612 A1 | 7/2013 | Li |
| 2013/0247064 A1 | 9/2013 | Jackson |
| 2013/0268653 A1 | 10/2013 | Deng et al. |
| 2013/0275703 A1 | 10/2013 | Schenfeld et al. |
| 2013/0286840 A1 | 10/2013 | Fan |
| 2013/0290643 A1 | 10/2013 | Lim |
| 2013/0290650 A1 | 10/2013 | Chang et al. |
| 2013/0298134 A1 | 11/2013 | Jackson |
| 2013/0305093 A1 | 11/2013 | Jayachandran et al. |
| 2013/0312006 A1 | 11/2013 | Hardman |
| 2013/0318255 A1 | 11/2013 | Karino |
| 2013/0318269 A1 | 11/2013 | Dalal et al. |
| 2014/0052866 A1 | 2/2014 | Jackson |
| 2014/0082614 A1 | 3/2014 | Klein et al. |
| 2014/0104778 A1 | 4/2014 | Schnell |
| 2014/0122833 A1 | 5/2014 | Davis et al. |
| 2014/0135105 A1 | 5/2014 | Quan et al. |
| 2014/0143773 A1 | 5/2014 | Ciano et al. |
| 2014/0143781 A1 | 5/2014 | Yao |
| 2014/0189039 A1 | 7/2014 | Dalton |
| 2014/0201761 A1 | 7/2014 | Dalal et al. |
| 2014/0317292 A1 | 10/2014 | Odom |
| 2014/0348182 A1 | 11/2014 | Chandra |
| 2014/0359044 A1 | 12/2014 | Davis et al. |
| 2014/0359323 A1 | 12/2014 | Fullerton et al. |
| 2014/0365596 A1 | 12/2014 | Kanevsky |
| 2014/0379836 A1 | 12/2014 | Zilberboim |
| 2015/0012679 A1 | 1/2015 | Davis et al. |
| 2015/0039840 A1 | 2/2015 | Chandra et al. |
| 2015/0103826 A1 | 4/2015 | Davis |
| 2015/0229586 A1 | 8/2015 | Jackson |
| 2015/0293789 A1 | 10/2015 | Jackson |
| 2015/0301880 A1 | 10/2015 | Allu |
| 2015/0381521 A1 | 12/2015 | Jackson |
| 2016/0154539 A1 | 6/2016 | Buddhiraja |
| 2016/0161909 A1 | 6/2016 | Wada |
| 2016/0306586 A1 | 10/2016 | Dornemann |
| 2016/0378570 A1 | 12/2016 | Ljubuncic |
| 2017/0111274 A1 | 4/2017 | Bays |
| 2017/0115712 A1 | 4/2017 | Davis |
| 2017/0127577 A1 | 5/2017 | Rodriguez et al. |
| 2018/0018149 A1 | 1/2018 | Cook |
| 2018/0054364 A1 | 2/2018 | Jackson |
| 2019/0260689 A1 | 8/2019 | Jackson |
| 2019/0286610 A1 | 9/2019 | Dalton |
| 2020/0073722 A1 | 3/2020 | Jackson |
| 2020/0159449 A1 | 5/2020 | Davis et al. |
| 2020/0379819 A1 | 12/2020 | Jackson |
| 2020/0382585 A1 | 12/2020 | Abu-Ghazaleh et al. |
| 2021/0117130 A1 | 4/2021 | Davis |
| 2021/0141671 A1 | 5/2021 | Jackson |
| 2021/0250249 A1 | 8/2021 | Jackson |
| 2021/0306284 A1 | 9/2021 | Jackson |
| 2021/0311804 A1 | 10/2021 | Jackson |
| 2022/0121545 A1 | 4/2022 | Dalton |
| 2022/0206859 A1 | 6/2022 | Jackson |
| 2022/0206861 A1 | 6/2022 | Jackson |
| 2022/0214920 A1 | 7/2022 | Jackson |
| 2022/0214921 A1 | 7/2022 | Jackson |
| 2022/0214922 A1 | 7/2022 | Jackson |
| 2022/0222119 A1 | 7/2022 | Jackson |
| 2022/0222120 A1 | 7/2022 | Jackson |
| 2022/0239606 A1 | 7/2022 | Jackson |
| 2022/0239607 A1 | 7/2022 | Jackson |
| 2022/0247694 A1 | 8/2022 | Jackson |
| 2022/0300334 A1 | 9/2022 | Jackson |
| 2022/0317692 A1 | 10/2022 | Guim Bernat |

FOREIGN PATENT DOCUMENTS

| | | |
|---|---|---|
| DE | 112008001875 | 8/2013 |
| EP | 0268435 | 5/1988 |
| EP | 0605106 A1 | 7/1994 |
| EP | 0859314 A2 | 8/1998 |
| EP | 1331564 | 7/2003 |
| EP | 1365545 | 11/2003 |
| EP | 1492309 | 12/2004 |
| EP | 1865684 | 12/2007 |
| GB | 2391744 | 2/2004 |
| GB | 2392265 | 2/2004 |
| JP | 8-212084 | 8/1996 |
| JP | 2002-207712 | 7/2002 |
| JP | 2005-165568 | 6/2005 |
| JP | 2005-223753 | 8/2005 |
| JP | 2005-536960 | 12/2005 |

(56) References Cited

FOREIGN PATENT DOCUMENTS

| | | |
|---|---|---|
| JP | 2006-309439 | 11/2006 |
| KR | 2004/0107934 | 12/2004 |
| TW | M377621 | 4/2010 |
| TW | 201017430 | 5/2010 |
| WO | WO1998/011702 | 3/1998 |
| WO | WO1998/058518 | 12/1998 |
| WO | WO1999/015999 | 4/1999 |
| WO | WO1999/057660 | 11/1999 |
| WO | WO2000/014938 | 3/2000 |
| WO | WO2000/025485 A1 | 5/2000 |
| WO | WO2000/060825 | 10/2000 |
| WO | WO2001/009791 | 2/2001 |
| WO | WO2001/014987 | 3/2001 |
| WO | WO2001/015397 | 3/2001 |
| WO | WO2001/039470 | 5/2001 |
| WO | WO2001/044271 | 6/2001 |
| WO | WO2003/046751 | 6/2003 |
| WO | WO2003/060798 | 9/2003 |
| WO | WO2004/021109 | 3/2004 |
| WO | WO2004/021641 | 3/2004 |
| WO | WO2004/046919 | 6/2004 |
| WO | WO2004/070547 | 8/2004 |
| WO | WO2004/092884 | 10/2004 |
| WO | WO2005/013143 | 2/2005 |
| WO | WO2005/017763 A2 | 2/2005 |
| WO | WO2005/017783 | 2/2005 |
| WO | WO2005/089245 A2 | 9/2005 |
| WO | WO2005/091136 | 9/2005 |
| WO | WO2006/0362777 | 4/2006 |
| WO | WO2006/107531 | 10/2006 |
| WO | WO2006/108187 | 10/2006 |
| WO | WO2006/112981 | 10/2006 |
| WO | WO2008/000193 | 1/2008 |
| WO | WO2011/044271 | 4/2011 |
| WO | WO2012/037494 | 3/2012 |

OTHER PUBLICATIONS

Office Action on U.S. Appl. No. 17/711,214, dated Apr. 25, 2023.
Office Action, Advisory Action, on U.S. Appl. No. 17/711,214, dated Feb. 14, 2023.
Office Action, Advisory Action, on U.S. Appl. No. 17/722,076, dated Feb. 17, 2023.
Notice of Allowance, Corrected NOA, in U.S. Appl. No. 17/532,667, dated May 9, 2023.
Office Action on U.S. Appl. No. 17/711,242, dated Jun. 7, 2023.
Notice of Allowance in U.S. Appl. No. 17/532,667, dated Apr. 26, 2023.
Office Action in U.S. Appl. No. 17/508,661 dated Jul. 27, 2023.
Office Action in U.S. Appl. No. 17/960,251 dated Aug. 2, 2023.
Notice of Allowance in U.S. Appl. No. 17/985,252 dated Jul. 31, 2023.
Notice of Allowance in U.S. Appl. No. 17/470,209 dated Mar. 21, 2023.
Office Action on U.S. Appl. No. 17/722,076, dated Mar. 21, 2023.
Office Action, Advisory Action, on U.S. Appl. No. 17/835,159, dated Mar. 22, 2023.
Notice of Allowance in U.S. Appl. No. 17/411,616, dated Mar. 29, 2023.
Notice of Allowance in U.S. Appl. No. 17/985,241, dated Apr. 3, 2023.
Notice of Allowance in U.S. Appl. No. 17/980,844, dated Jul. 5, 2023.
Office Action on U.S. Appl. No. 17/697,368 dated Aug. 8, 2023.
Notice of Allowance on U.S. Appl. No. 17/171,152 dated Feb. 27, 2023.
Office Action on U.S. Appl. No. 17/508,661 dated Feb. 27, 2023.
Office Action on U.S. Appl. No. 17/697,235 dated Feb. 28, 2023.
Office Action on U.S. Appl. No. 17/697,403 dated Feb. 28, 2023.
Notice of Allowance (Corrected NOA) in U.S. Appl. No. 17/411,616, dated Apr. 6, 2023.
Office Action on U.S. Appl. No. 17/412,832, dated Apr. 20, 2023.
Office Action on U.S. Appl. No. 14/691,120, dated Feb. 9, 2023.
Notice of Allowance on U.S. Appl. No. 17/171,152, dated Feb. 6, 2023.
Notice of Allowance on U.S. Appl. No. 17/201,231, dated Feb. 6, 2023.
U.S. Appl. No. 11/279,007, filed Apr. 2006, Jackson.
U.S. Appl. No. 13/705,340, filed Apr. 2012, Davis et al.
U.S. Appl. No. 13/899,751, filed May 2013, Chandra.
U.S. Appl. No. 13/935,108, filed Jul. 2013, Davis.
U.S. Appl. No. 13/959,428, filed Aug. 2013, Chandra.
U.S. Appl. No. 60/662,240 filed Mar. 2005, Jackson.
U.S. Appl. No. 60/552,653, filed Apr. 2005, Jackson.
Notice of Allowance on U.S. Appl. No. 10/530,577, dated Oct. 15, 2015.
Office Action on U.S. Appl. No. 10/530,577, dated May 29, 2015.
Notice of Allowance on U.S. Appl. No. 11/207,438, dated Jan. 3, 2012.
Office Action on U.S. Appl. No. 11/207,438 dated Aug. 31, 2010.
Office Action on U.S. Appl. No. 11/207,438 dated Mar. 15, 2010.
Notice of Allowance on U.S. Appl. No. 11/276,852 dated Nov. 26, 2014.
Office Action on U.S. Appl. No. 11/276,852 dated Feb. 10, 2009.
Office Action on U.S. Appl. No. 11/276,852, dated Jan. 16, 2014.
Office Action on U.S. Appl. No. 11/276,852, dated Jun. 26, 2012.
Office Action on U.S. Appl. No. 11/276,852, dated Mar. 17, 2011.
Office Action on U.S. Appl. No. 11/276,852, dated Mar. 4, 2010.
Office Action on U.S. Appl. No. 11/276,852, dated Mar. 5, 2013.
Office Action on U.S. Appl. No. 11/276,852, dated Oct. 4, 2010.
Office Action on U.S. Appl. No. 11/276,852, dated Oct. 5, 2011.
Office Action on U.S. Appl. No. 11/276,852, dated Oct. 16, 2009.
Notice of Allowance on U.S. Appl. No. 11/276,853, dated Apr. 5, 2016.
Office Action on U.S. Appl. No. 11/276,853, dated Apr. 4, 2014.
Office Action on U.S. Appl. No. 11/276,853, dated Aug. 7, 2009.
Office Action on U.S. Appl. No. 11/276,853, dated Dec. 28, 2009.
Office Action on U.S. Appl. No. 11/276,853, dated Dec. 8, 2008.
Office Action on U.S. Appl. No. 11/276,853, dated Jul. 12, 2010.
Office Action on U.S. Appl. No. 11/276,853, dated May 26, 2011.
Office Action on U.S. Appl. No. 11/276,853, dated Nov. 23, 2010.
Office Action on U.S. Appl. No. 11/276,853, dated Oct. 16, 2009.
Notice of Allowance on U.S. Appl. No. 11/276,854, dated Mar. 6, 2014.
Office Action on U.S. Appl. No. 11/276,854, dated Apr. 18, 2011.
Office Action on U.S. Appl. No. 11/276,854, dated Aug. 1, 2012.
Office Action on U.S. Appl. No. 11/276,854, dated Jun. 10, 2009.
Office Action on U.S. Appl. No. 11/276,854, dated Jun. 5, 2013.
Office Action on U.S. Appl. No. 11/276,854, dated Jun. 8, 2010.
Office Action on U.S. Appl. No. 11/276,854, dated Nov. 26, 2008.
Office Action on U.S. Appl. No. 11/276,854, dated Oct. 27, 2010.
Notice of Allowance on U.S. Appl. No. 11/276,855, dated Sep. 13, 2013.
Office Action on U.S. Appl. No. 11/276,855, dated Jul. 22, 2010.
Office Action on U.S. Appl. No. 11/276,855, dated Aug. 13, 2009.
Office Action on U.S. Appl. No. 11/276,855, dated Dec. 30, 2008.
Office Action on U.S. Appl. No. 11/276,855, dated Dec. 31, 2009.
Office Action on U.S. Appl. No. 11/276,855, dated Dec. 7, 2010.
Office Action on U.S. Appl. No. 11/276,855, dated Jan 26, 2012.
Office Action on U.S. Appl. No. 11/276,855, dated Jun. 27, 2011.
Notice of Allowance on U.S. Appl. No. 11/616,156, dated Mar. 25, 2014.
Office Action on U.S. Appl. No. 11/616,156, dated Jan. 18, 2011.
Office Action on U.S. Appl. No. 11/616,156, dated Oct. 13, 2011.
Office Action on U.S. Appl. No. 11/616,156, dated Sep. 17, 2013.
Notice of Allowance on U.S. Appl. No. 11/718,867 dated May 25, 2012.
Office Action on U.S. Appl. No. 11/718,867 dated Dec. 29, 2009.
Office Action on U.S. Appl. No. 11/718,867 dated Jan. 8, 2009.
Office Action on U.S. Appl. No. 11/718,867 dated Jul. 11, 2008.
Office Action on U.S. Appl. No. 11/718,867 dated Jun. 15, 2009.
Notice of Allowance on U.S. Appl. No. 12/573,967, dated Jul. 20, 2015.
Office Action on U.S. Appl. No. 12/573,967, dated Apr. 1, 2014.

(56) References Cited

OTHER PUBLICATIONS

Office Action on U.S. Appl. No. 12/573,967, dated Aug. 13, 2012.
Office Action on U.S. Appl. No. 12/573,967, dated Mar. 1, 2012.
Office Action on U.S. Appl. No. 12/573,967, dated Nov. 21, 2014.
Office Action on U.S. Appl. No. 12/573,967, dated Oct. 10, 2013.
Office Action on U.S. Appl. No. 12/794,996, dated Jun. 19, 2013.
Office Action on U.S. Appl. No. 12/794,996, dated Sep. 17, 2012.
Office Action on U.S. Appl. No. 12/889,721 dated Aug. 2, 2016.
Office Action on U.S. Appl. No. 12/889,721, dated Apr. 17, 2014.
Office Action on U.S. Appl. No. 12/889,721, dated Feb. 24, 2016.
Office Action on U.S. Appl. No. 12/889,721, dated Jul. 2, 2013.
Office Action on U.S. Appl. No. 12/889,721, dated May 22, 2015.
Office Action on U.S. Appl. No. 12/889,721, dated Oct. 11, 2012.
Office Action on U.S. Appl. No. 12/889,721, dated Sep. 29, 2014.
Notice of Allowance on U.S. Appl. No. 13/234,054, dated Sep. 19, 2017.
Office Action on U.S. Appl. No. 13/234,054, dated May 31, 2017.
Office Action on U.S. Appl. No. 13/234,054, dated Oct. 20, 2016.
Office Action on U.S. Appl. No. 13/234,054, dated Apr. 16, 2015.
Office Action on U.S. Appl. No. 13/234,054, dated Aug. 6, 2015.
Office Action on U.S. Appl. No. 13/234,054, dated Jan. 26, 2016.
Office Action on U.S. Appl. No. 13/234,054, dated Oct. 23, 2014.
Notice of Allowance on U.S. Appl. No. 13/284,855, dated Jul. 14, 2014.
Office Action on U.S. Appl. No. 13/284,855, dated Dec. 19, 2013.
Notice of Allowance on U.S. Appl. No. 13/453,086, dated Jul. 18, 2013.
Office Action on U.S. Appl. No. 13/453,086, dated Mar. 12, 2013.
Notice of Allowance on U.S. Appl. No. 13/475,713, dated Feb. 5, 2015.
Office Action on U.S. Appl. No. 13/475,713, dated Apr. 1, 2014.
Office Action on U.S. Appl. No. 13/475,713, dated Oct. 17, 2014.
Notice of Allowance on U.S. Appl. No. 13/475,722, dated Feb. 27, 2015.
Office Action on U.S. Appl. No. 13/475,722, dated Jan. 17, 2014.
Office Action on U.S. Appl. No. 13/475,722, dated Oct. 20, 2014.
Notice of Allowance on U.S. Appl. No. 13/527,498, dated Feb. 23, 2015.
Office Action on U.S. Appl. No. 13/527,498, dated May 8, 2014.
Office Action on U.S. Appl. No. 13/527,498, dated Nov. 17, 2014.
Notice of Allowance on U.S. Appl. No. 13/527,505, dated Mar. 6, 2015.
Office Action on U.S. Appl. No. 13/527,505, dated Dec. 5, 2014.
Office Action on U.S. Appl. No. 13/527,505, dated May 8, 2014.
Notice of Allowance on U.S. Appl. No. 13/621,987 dated Jun. 4, 2015.
Office Action on U.S. Appl. No. 13/621,987 dated Feb. 27, 2015.
Office Action on U.S. Appl. No. 13/621,987 dated Oct. 8, 2014.
Notice of Allowance on U.S. Appl. No. 13/624,725, dated Mar. 30, 2016.
Office Action on U.S. Appl. No. 13/624,725 dated Mar. 10, 2016.
Office Action on U.S. Appl. No. 13/624,725 dated Apr. 23, 2015.
Office Action on U.S. Appl. No. 13/624,725, dated Jan. 10, 2013.
Office Action on U.S. Appl. No. 13/624,725, dated Nov. 4, 2015.
Office Action on U.S. Appl. No. 13/624,725, dated Nov. 13, 2013.
Notice of Allowance on U.S. Appl. No. 13/624,731, dated Mar. 5, 2015.
Office action on U.S. Appl. No. 13/624,731 dated Jan. 29, 2013.
Office Action on U.S. Appl. No. 13/624,731, dated Jul. 25, 2014.
Office Action on U.S. Appl. No. 13/624,731, dated Nov. 12, 2013.
Notice of Allowance on U.S. Appl. No. 13/662,759 dated May 10, 2016.
Office Action on U.S. Appl. No. 13/662,759, dated Feb. 22, 2016.
Office Action on U.S. Appl. No. 13/662,759, dated Nov. 6, 2014.
Notice of Allowance on U.S. Appl. No. 13/692,741 dated Dec. 4, 2015.
Office Action on U.S. Appl. No. 13/692,741, dated Jul. 1, 2015.
Office Action on U.S. Appl. No. 13/692,741, dated Mar. 11, 2015.
Office Action on U.S. Appl. No. 13/692,741, dated Sep. 4, 2014.

Notice of Allowance on U.S. Appl. No. 13/705,286 dated Feb. 24, 2016.
Office Action on U.S. Appl. No. 13/705,286, dated May 13, 2013.
Notice of Allowance on U.S. Appl. No. 13/705,340, dated Dec. 3, 2014.
Notice of Allowance on U.S. Appl. No. 13/705,340, dated Mar. 16, 2015.
Office Action on U.S. Appl. No. 13/705,340, dated Aug. 2, 2013.
Office Action on U.S. Appl. No. 13/705,340, dated Mar. 12, 2014.
Office Action on U.S. Appl. No. 13/705,340, dated Mar. 29, 2013.
Notice of Allowance on U.S. Appl. No. 13/705,386, dated Jan. 24, 2014.
Office Action on U.S. Appl. No. 13/705,386, dated May 13, 2013.
Notice of Allowance on U.S. Appl. No. 13/705,414, dated Nov. 4, 2013.
Office Action on U.S. Appl. No. 13/705,414, dated Apr. 9, 2013.
Office Action on U.S. Appl. No. 13/705,414, dated Aug. 9, 2013.
Office Action on U.S. Appl. No. 13/705,428, dated Jul. 10, 2013.
Notice of Allowance on U.S. Appl. No. 13/728,308 dated Oct. 7, 2015.
Office Action on U.S. Appl. No. 13/728,308, dated May 14, 2015.
Office Action on U.S. Appl. No. 13/728,362, dated Feb. 21, 2014.
Notice of Allowance on U.S. Appl. No. 13/728,428 dated Jul. 18, 2016.
Office Action on U.S. Appl. No. 13/728,428 dated May 6, 2016.
Office Action on U.S. Appl. No. 13/728,428 dated Jun. 12, 2015.
Notice of Allowance on U.S. Appl. 13/758,164, dated Apr. 15, 2015.
Notice of Allowance on U.S. Appl. No. 13/760,600 dated Feb. 26, 2018.
Notice of Allowance on U.S. Appl. No. 13/760,600 dated Jan. 9, 2018.
Office Action on U.S. Appl. No. 13/760,600 dated Aug. 30, 2016.
Office Action on U.S. Appl. No. 13/760,600 dated Jan. 23, 2017.
Office Action on U.S. Appl. No. 13/760,600 dated Jun. 15, 2017.
Office Action on U.S. Appl. No. 13/760,600 dated Mar. 15, 2016.
Office Action on U.S. Appl. No. 13/760,600 dated Oct. 19, 2015.
Office Action on U.S. Appl. No. 13/760,600, dated Apr. 10, 2015.
Notice of Allowance on U.S. Appl. No. 13/855,241, dated Oct. 27, 2020.
Notice of Allowance on U.S. Appl. No. 13/855,241, dated Sep. 14, 2020.
Office Action on U.S. Appl. No. 13/855,241, dated Jan. 13, 2016.
Office Action on U.S. Appl. No. 13/855,241, dated Jul. 6, 2015.
Office Action on U.S. Appl. No. 13/855,241, dated Jun. 27, 2019.
Office Action on U.S. Appl. No. 13/855,241, dated Mar. 30, 2020.
Office Action on U.S. Appl. No. 13/855,241, dated Sep. 15, 2016.
Notice of Allowance on U.S. Appl. No. 14/052,723 dated Feb. 8, 2017.
Office Action on U.S. Appl. No. 14/052,723, dated Dec. 3, 2015.
Office Action on U.S. Appl. No. 14/052,723, dated May 1, 2015.
Notice of Allowance on U.S. Appl. No. 14/106,254 dated May 25, 2017.
Office Action on U.S. Appl. No. 14/106,254 dated August 12, 2016.
Office Action on U.S. Appl. No. 14/106,254 dated Feb. 15, 2017.
Office Action on U.S. Appl. No. 14/106,254, dated May 2, 2016.
Notice of Allowance on U.S. Appl. No. 14/106,697 dated Oct. 24, 2016.
Office Action on U.S. Appl. No. 14/106,697 dated Feb. 2, 2016.
Office Action on US. Appl. No. 14/106,697, dated Aug. 17, 2015.
Office Action on US. Appl. No. 14/106,698 dated Aug. 19, 2015.
Office Action on US. Appl. No. 14/106,698, dated Feb. 12, 2015.
Notice of Allowance on U.S. Appl. No. 14/137,921 dated Aug. 12, 2021 and Jul. 16, 2021.
Office Action on U.S. Appl. No. 14/137,921 dated Feb. 4, 2021.
Office Action on U.S. Appl. No. 14/137,921 dated Jun. 25, 2020.
Office Action on U.S. Appl. No. 14/137,921 dated May 31, 2017.
Office Action on U.S. Appl. No. 14/137,921 dated May 6, 2016.
Office Action on U.S. Appl. No. 14/137,921 dated Oct. 6, 2016.
Office Action on U.S. Appl. No. 14/137,921 dated Oct. 8, 2015.
Notice of Allowance on U.S. Appl. No. 14/137,940 dated Jan. 30, 2019.
Office Action on U.S. Appl. No. 14/137,940 dated Aug. 10, 2018.
Office Action on U.S. Appl. No. 14/137,940 dated Jan. 25, 2018.

(56) References Cited

OTHER PUBLICATIONS

Office Action on U.S. Appl. No. 14/137,940 dated Jun. 3, 2016.
Office Action on U.S. Appl. No. 14/137,940 dated Jun. 9, 2017.
Office Action on U.S. Appl. No. 14/137,940 dated Nov. 3, 2016.
Notice of Allowance on U.S. Appl. No. 14/154,912 dated Apr. 25, 2019.
Notice of Allowance on U.S. Appl. No. 14/154,912, dated Apr. 3, 2019.
Notice of Allowance on U.S. Appl. No. 14/154,912, dated Feb. 7, 2019.
Office Action on U.S. Appl. No. 14/154,912, dated Dec. 7, 2017.
Office Action on U.S. Appl. No. 14/154,912, dated Jul. 20, 2017.
Office Action on U.S. Appl. No. 14/154,912, dated May 8, 2018.
Office Action on U.S. Appl. No. 14/154,912, dated Oct. 11, 2018.
Notice of Allowance on U.S. Appl. No. 14/331,718 dated Jun. 7, 2017.
Office Action on U.S. Appl. 14/331,718 dated Feb. 28, 2017.
Notice of Allowance on U.S. Appl. No. 14/331,772, dated Jan. 10, 2018.
Office Action on U.S. Appl. No. 14/331,772, dated Aug. 11, 2017.
Notice of Allowance on U.S. Appl. No. 14/334,178 dated Aug. 19, 2016.
Notice of Allowance on U.S. Appl. No. 14/334,178 dated Jun. 8, 2016.
Office Action on U.S. Appl. No. 14/334,178 dated Dec. 18, 2015.
Notice of Allowance on U.S. Appl. No. 14/334,931 dated May 20, 2016.
Office Action on U.S. Appl. No. 14/334,931 dated Dec. 11, 2015.
Office Action on U.S. Appl. No. 14/334,931, dated Jan. 5, 2015.
Office Action on U.S. Appl. No. 14/334,931, dated Jul. 9, 2015.
Notice of Allowance on U.S. Appl. No. 14/454,049, dated Jan. 20, 2015.
Notice of Allowance on U.S. Appl. No. 14/590,102, dated Jan. 22, 2018.
Office Action on U.S. Appl. No. 14/590,102, dated Aug. 15, 2017.
Office Action on U.S. Appl. No. 14/691,120 dated Mar. 10, 2022.
Office Action on U.S. Appl. No. 14/691,120 dated Mar. 30, 2020.
Office Action on U.S. Appl. No. 14/691,120 dated Oct. 3, 2019.
Office Action on U.S. Appl. No. 14/691,120 dated Oct. 20, 2020.
Office Action on U.S. Appl. No. 14/691,120 dated Sep. 29, 2021.
Office Action on U.S. Appl. No. 14/691,120, dated Aug. 27, 2018.
Office Action on U.S. Appl. No. 14/691,120, dated Feb. 12, 2018.
Office Action on U.S. Appl. No. 14/691,120, dated Mar. 2, 2017.
Office Action on U.S. Appl. No. 14/691,120, dated Mar. 22, 2019.
Office Action on U.S. Appl. No. 14/691,120, dated Sep. 13, 2017.
Office Action on U.S. Appl. No. 14/691,120, dated Sep. 8, 2022.
Office Action on U.S. Appl. No. 14/691,120, dated Nov. 18, 2022.
Office Action on U.S. Appl. No. 14/691,120, dated Oct. 14, 2022.
Notice of Allowance on U.S. Appl. No. 14/704,231, dated Sep. 2, 2015.
Notice of Allowance on U.S. Appl. No. 14/709,642 dated Mar. 19, 2019.
Notice of Allowance on U.S. Appl. No. 14/709,642, dated May 9, 2019.
Office Action on U.S. Appl. No. 14/709,642 dated Feb. 7, 2018.
Office Action on U.S. Appl. No. 14/709,642 dated Feb. 17, 2016.
Office Action on U.S. Appl. No. 14/709,642 dated Jul. 12, 2017.
Office Action on U.S. Appl. No. 14/709,642 dated Sep. 12, 2016.
Notice of Allowance on U.S. Appl. No. 14/725,543 dated Jul. 21, 2016.
Office Action on U.S. Appl. No. 14/725,543 dated Apr. 7, 2016.
Office Action on U.S. Appl. No. 14/751,529 dated Aug. 9, 2017.
Office Action on U.S. Appl. No. 14/751,529 dated Oct. 3, 2018.
Office Action on U.S. Appl. No. 14/751,529, dated Jun. 6, 2016.
Office Action on U.S. Appl. No. 14/751,529, dated Nov. 14, 2016.
Notice of Allowance on U.S. Appl. No. 14/753,948 dated Jun. 14, 2017.
Office Action on U.S. Appl. No. 14/753,948 dated Nov. 4, 2016.
Notice of Allowance on U.S. Appl. No. 14/791,873 dated Dec. 20, 2018.
Office Action on U.S. Appl. No. 14/791,873 dated May 14, 2018.
Notice of Allowance on U.S. Appl. No. 14/809,723 dated Jan. 11, 2018.
Office Action on U.S. Appl. No. 14/809,723 dated Aug. 25, 2017.
Office Action on U.S. Appl. No. 14/809,723 dated Dec. 30, 2016.
Notice of Allowance on U.S. Appl. No. 14/827,927 dated Apr. 25, 2022.
Notice of Allowance on U.S. Appl. No. 14/827,927 dated Jan. 21, 2022 and Dec. 9, 2021.
Office Action on U.S. Appl. No. 14/827,927 dated Jan. 19, 2021.
Office Action on U.S. Appl. No. 14/827,927 dated Jan. 31, 2020.
Office Action on U.S. Appl. No. 14/827,927 dated May 16, 2018.
Office Action on U.S. Appl. No. 14/827,927 dated May 16, 2019.
Office Action on U.S. Appl. No. 14/827,927 dated Sep. 9, 2019.
Office Action on U.S. Appl. No. 14/827,927, dated Aug. 28, 2018.
Office Action on U.S. Appl. No. 14/827,927, dated Jan. 31, 2019.
Notice of Allowance on U.S. Appl. No. 14/833,673, dated Dec. 2, 2016.
Office Action on U.S. Appl. No. 14/833,673, dated Feb. 11, 2016.
Office Action on U.S. Appl. No. 14/833,673, dated Jun. 10, 2016.
Office Action on U.S. Appl. No. 14/833,673, dated Sep. 24, 2015.
Notice of Allowance on U.S. Appl. No. 14/842,916 dated Oct. 2, 2017.
Office Action on U.S. Appl. No. 14/842,916 dated May 5, 2017.
Notice of Allowance on U.S. Appl. No. 14/872,645 dated Oct. 13, 2016.
Office Action on U.S. Appl. No. 14/872,645 dated Feb. 16, 2016.
Office Action on U.S. Appl. No. 14/872,645 dated Jun. 29, 2016.
Notice of Allowance on U.S. Appl. No. 14/987,059, dated Feb. 14, 2020.
Notice of Allowance on U.S. Appl. No. 14/987,059, dated Jul. 8, 2019.
Notice of Allowance on U.S. Appl. No. 14/987,059, dated Nov. 7, 2019.
Office Action U.S. Appl. No. 14/987,059, dated Jan. 31, 2019.
Office Action U.S. Appl. No. 14/987,059, dated May 11, 2018.
Office Action U.S. Appl. No. 14/987,059, dated Oct. 11, 2018.
Notice of Allowance on U.S. Appl. No. 15/042,489 dated Jul. 16, 2018.
Office Action on U.S. Appl. No. 15/042,489 dated Jan. 9, 2018.
Notice of Allowance on U.S. Appl. No. 15/049,542 dated Feb. 28, 2018.
Notice of Allowance on U.S. Appl. No. 15/049,542 dated Jan. 4, 2018.
Notice of Allowance on U.S. Appl. No. 15/078,115 dated Jan. 8, 2018.
Office Action on U.S. Appl. No. 15/078,115 dated Sep. 5, 2017.
Notice of Allowance on U.S. Appl. No. 15/254,111 dated Nov. 13, 2017.
Notice of Allowance on U.S. Appl. No. 15/254,111 dated Sep. 1, 2017.
Office Action on U.S. Appl. No. 15/254,111 dated Jun. 20, 2017.
Notice of Allowance on U.S. Appl. No. 15/270,418 dated Nov. 2, 2017.
Office Action on U.S. Appl. No. 15/270,418 dated Apr. 21, 2017.
Office Action on U.S. Appl. No. 15/281,462 dated Apr. 6, 2018.
Office Action on U.S. Appl. No. 15/281,462 dated Dec. 15, 2017.
Office Action on U.S. Appl. No. 15/281,462 dated Feb. 10, 2017.
Office Action on U.S. Appl. No. 15/281,462 dated Jun. 13, 2017.
Notice of Allowance on U.S. Appl. No. 15/345,017 dated Feb. 2, 2021.
Office Action on U.S. Appl. No. 15/345,017 dated Aug. 24, 2020.
Office Action on U.S. Appl. No. 15/345,017 dated Aug. 9, 2019.
Office Action on U.S. Appl. No. 15/345,017 dated Jan. 31, 2019.
Office Action on U.S. Appl. No. 15/345,017 dated Jul. 11, 2018.
Office Action on U.S. Appl. No. 15/345,017 dated Mar. 20, 2020.
Office Action on U.S. Appl. No. 15/345,017 dated Nov. 29, 2019.
Notice of Allowance on U.S. Appl. No. 15/357,332 dated Jul. 12, 2018.
Office Action on U.S. Appl. No. 15/357,332 dated May 9, 2018.
Office Action on U.S. Appl. No. 15/357,332 dated Nov. 9, 2017.
Notice of Allowance on U.S. Appl. No. 15/360,668, dated May 5, 2017.

(56) References Cited

OTHER PUBLICATIONS

Notice of Allowance on U.S. Appl. No. 15/430,959 dated Mar. 15, 2018.
Notice of Allowance on U.S. Appl. No. 15/478,467 dated May 30, 2019.
Office Action on U.S. Appl. No. 15/478,467, dated Jan. 11, 2019.
Office Action on U.S. Appl. No. 15/478,467, dated Jul. 13, 2018.
Notice of Allowance on U.S. Appl. No. 15/672,418 dated Apr. 4, 2018.
Notice of Allowance on U.S. Appl. No. 15/717,392 dated Mar. 22, 2019.
Office Action on U.S. Appl. No. 15/717,392 dated Dec. 3, 2018.
Office Action on U.S. Appl. No. 15/717,392 dated Jul. 5, 2018.
Notice of Allowance on U.S. Appl. No. 15/726,509, dated Sep. 25, 2019.
Office Action on U.S. Appl. No. 15/726,509, dated Jun. 3, 2019.
Office Action on U.S. Appl. No. 16/537,256 dated Dec. 23, 2021.
Office Action on U.S. Appl. No. 16/537,256 dated Jul. 7, 2022.
Notice of Allowance on U.S. Appl. No. 16/913,708 dated Aug. 24, 2022.
Office Action on U.S. Appl. No. 16/913,708 dated Jun. 7, 2022.
Notice of Allowance on U.S. Appl. No. 16/913,745, dated Jun. 9, 2022.
Office Action on U.S. Appl. No. 16/913,745 dated Jan. 13, 2022.
Notice of Allowance on U.S. Appl. No. 16/913,745, dated Sep. 27, 2022.
Office Action on U.S. Appl. No. 17/088,954, dated Sep. 13, 2022.
Notice of Allowance on U.S. Appl. No. 17/089,207, dated Jul. 7, 2022.
Office Action on U.S. Appl. No. 17/089,207 dated Jan. 28, 2022.
Notice of Allowance on U.S. Appl. No. 17/089,207, dated Oct. 31, 2022.
Office Action on U.S. Appl. No. 17/171,152 dated Aug. 16, 2022.
Office Action on U.S. Appl. No. 17/201,231 dated Oct. 5, 2022.
Office Action on U.S. Appl. No. 17/201,245 dated Mar. 18, 2022.
Notice of Allowance on U.S. Appl. No. 17/201,245 dated Sep. 14, 2022.
Notice of Allowance on U.S. Appl. No. 17/201,245 dated Sep. 22, 2022.
Office Action on U.S. Appl. No. 17/697,235 dated May 25, 2022.
Office Action on U.S. Appl. No. 17/697,235 dated Sep. 20, 2022.
Advisory Action on U.S. Appl. No. 17/697,235 dated Dec. 5, 2022.
Office Action on U.S. Appl. No. 17/697,368 dated Jun. 7, 2022.
Office Action on U.S. Appl. No. 17/697,368 dated Oct. 18, 2022.
Office Action on U.S. Appl. No. 17/697,403 dated Jun. 7, 2022.
Office Action on U.S. Appl. No. 17/697,403 dated Oct. 18, 2022.
Notice of Allowance on U.S. Appl. No. 17/700,767 dated Jun. 27, 2022.
Notice of Allowance on U.S. Appl. No. 17/700,767 dated Jul. 11, 2022.
Notice of Allowance on U.S. Appl. No. 17/700,767 dated Oct. 14, 2022.
Notice of Allowance on U.S. Appl. No. 17/700,808, dated May 26, 2022 and Jun. 6, 2022.
Notice of Allowance on U.S. Appl. No. 17/700,808, dated Sep. 14, 2022.
Notice of Allowance on U.S. Appl. No. 17/700,808, dated Sep. 26, 2022.
Notice of Allowance on U.S. Appl. No. 17/700,847, dated Jul. 7, 2022.
Notice of Allowance on U.S. Appl. No. 17/700,847, dated Oct. 26, 2022.
Office Action on U.S. Appl. No. 17/711,214, dated Jul. 8, 2022.
Office Action on U.S. Appl. No. 17/711,214, dated Nov. 16, 2022.
Office Action on U.S. Appl. No. 17/711,242, dated Jul. 28, 2022.
Office Action on U.S. Appl. No. 17/711,242, dated Dec. 12, 2022.
Notice of Allowance on U.S. Appl. No. 17/722,037, dated Jul. 18, 2022.
Office Acton on U.S. Appl. No. 17/722,037 dated Jun. 13, 2022.
Notice of Allowance on U.S. Appl. No. 17/722,037, dated Oct. 27, 2022.
Notice of Allowance on U.S. Appl. No. 17/722,062 dated Jun. 15, 2022.
Notice of Allowance on U.S. Appl. No. 17/722,062 dated Oct. 7, 2022.
Office Action on U.S. Appl. No. 17/722,076 dated Jun. 22, 2022.
Office Action on U.S. Appl. No. 17/722,076, dated Nov. 28, 2022.
Office Action on U.S. Appl. No. 17/835,159 dated Aug. 31, 2022.
U.S. Appl. No. 60/552,653, filed Apr. 19, 2005.
U.S. Appl. No. 60/662,240, filed Mar. 16, 2005, Jackson.
Extended European Search Report for EP 10827330.1, dated Jun. 5, 2013.
Search Report on EP Application 10827330.1, dated Feb. 12, 2015.
Reexamination Report on Japanese Application 2012-536877, dated Jan. 22, 2015, including English Translation.
PCT/US2005/008296—International Search Report dated Aug. 3, 2005 for PCT Application No. PCT/US2005/008296, 1 page.
PCT/US2005/008297—International Search Report for Application No. PCT/US2005/008297, dated Sep. 29, 2005.
PCT/US2005/040669—International Preliminary Examination Report for PCT/US2005/040669, dated Apr. 29, 2008.
PCT/US2005/040669—Written Opinion for PCT/US2005/040669, dated Sep. 13, 2006.
PCT/US2009/044200—International Preliminary Report on Patentability for PCT/US2009/044200, dated Nov. 17, 2010.
PCT/US2009/044200—International Search Report and Written Opinion on PCT/US2009/044200, dated Jul. 1, 2009.
PCT/US2010/053227—International Preliminary Report on Patentability for PCT/US2010/053227, dated May 10, 2012.
PCT/US2010/053227—International Search Report and Written Opinion for PCT/US2010/053227, dated Dec 16, 2010.
PCT/US2011/051996—International Search Report and Written Opinion for PCT/US2011/051996, dated Jan. 19, 2012.
PCT/US2012/038986—International Preliminary Report on Patentability for PCT/US2012/038986 dated Nov. 26, 2013.
PCT/US2012/038986—International Search Report and Written Opinion on PCT/US2012/038986, dated Mar. 14, 2013.
PCT/US2012/038987—International Search Report and Written Opinion for PCT/US2012/038987, dated Aug. 16, 2012.
PCT/US2012/061747—International Preliminary Report on Patentability for PCT/US2012/061747, dated Apr. 29, 2014.
PCT/US2012/061747—International Search Report and Written Opinion for PCT/US2012/061747, dated Mar. 1, 2013.
PCT/US2012/062608—International Preliminary Report on Patentability issued on PCT/US2012/062608, dated May 6, 2014.
PCT/US2012/062608—International Search Report and Written Opinion for PCT/US2012/062608, dated Jan. 18, 2013.
Office Action on Taiwan Application 101139729, dated May 25, 2015 (English translation not available).
"Microsoft Computer Dictionary, 5th Ed."; Microsoft Press; 3 pages; 2002.
"Random House Concise Dictionary of Science & Computers"; 3 pages; Helicon Publishing; 2004.
A Language Modeling Framework for Resource Selection and Results Merging Si et al. CIKM 2002, Proceedings of the eleventh international conference on Iformation and Knowledge Management.
Abdelwahed, Sherif et al., "A Control-Based Framework for Self-Managing Distributed Computing Systems", WOSS'04 Oct. 31-Nov. 1, 2004 Newport Beach, CA, USA. Copyright 2004 ACM 1-58113-989-6/04/0010.
Abdelzaher, Tarek, et al., "Performance Guarantees for Web Server End-Systems: A Control-Theoretical Approach", IEEE Transactions on Parallel and Distributed Systems, vol. 13, No. 1, Jan. 2002.
Advanced Switching Technology Tech Brief, published 2005, 2 pages.
Alhusaini et al. "A framework for mapping with resource co-allocation in heterogeneous computing systems," Proceedings 9th Heterogeneous Computing Workshop (HCW 2000) (Cat. No. PR00556), Cancun, Mexico, 2000, pp. 273-286. (Year: 2000).
Ali et al., "Task Execution Time Modeling for Heterogeneous Computing System", IEEE, 2000, pp. 1-15.

(56) References Cited

OTHER PUBLICATIONS

Amini, A. Shaikh, and H. Schulzrinne, "Effective Peering for Multi-provider Content Delivery Services", In Proceedings of 23.sup.rd Annual IEEE Conference on Computer Communications (INFOCOM'04), pp. 850-861, 2004.

Amir and D. Shaw, "WALRUS—A Low Latency, High Throughput Web Service Using Internet-wide Replication", In Proceedings of the 19.sup.th International Conference on Distributed Computing Systems Workshop, 1998.

Amiri et al., "Dynamic Function Placement for Data-Intensive Cluster Computing," Jun. 2000.

Appleby, K., et al., "Oceano-SLA Based Management of a Computing Utility", IBM T.J. Watson Research Center, P.O.Box 704, Yorktown Heights, New York 10598, USA. Proc. 7th IFIP/IEEE Int'l Symp. Integrated Network Management, IEEE Press 2001.

Aweya, James et al., "An adaptive load balancing scheme for web servers", International Journal of Network Management 2002; 12: 3-39 (DOI: 10.1002/nem.4212, Copyright 2002 John Wiley & Sons, Ltd.

Azuma, T. Okamoto, G. Hasegawa, and M. Murata, "Design, Implementation and Evaluation of Resource Management System for Internet Servers", IOS Press, Journal of High Speed Networks, vol. 14 Issue 4, pp. 301-316, Oct. 2005.

Bader et al.; "Applications"; The International Journal of High Performance Computing Applications, vol. 15, No. ; pp. 181-185; Summer 2001.

Baentsch, Michael et al., "World Wide Web Caching: The Application-Level View of the Internet", Communications Magazine, IEEE, vol. 35, Issue 6, pp. 170-178, Jun. 1997.

Banga, Gaurav et al., "Resource Containers: A New Facility for Resource Management in Sewer Systems", Rice University, originally published in the Proceedings of the 3.sup.rd Symposium on Operating Systems Design and Implementation, New Orleans, Louisiana, Feb. 1999.

Banicescu et al., "Competitive Resource management in Distributed Computing Environments with Hectiling", 1999, High Performance Computing Symposium, p. 1-7 (Year: 1999).

Banicescu et al., "Efficient Resource Management for Scientific Applications in Distributed Computing Environment" 1998, Mississippi State Univ. Dept. of Comp. Science, p. 45-54. (Year: 1998).

Belloum, A. et al., "A Scalable Web Server Architecture", World Wide Web: Internet and Web Information Systems, 5, 5-23, 2002 Kluwer Academic Publishers. Manufactured in The Netherlands. 2000.

Benkner, Siegfried, et al., "VGE—A Service-Oriented Grid Environment for On-Demand Supercomputing", Institute for Software Science, University of Vienna, Nordbergstrasse 15/C/3, A-1090 Vienna, Austria. Proceedings of the 5th IEEE/ACM International Workshop on Grid Computing. pp. 11-18. 2004.

Bent, Leeann et al., "Characterization of a Large Web Site Population with Implications for Content Delivery", WWW2004, May 17-22, 2004, New York, New York, USA ACM 1-58113-844-X/04/0005, pp. 522-533.

Bian, Qiyong, et al., "Dynamic Flow Switching, A New Communication Service for ATM Networks", 1997.

Bradford, S. Milliner, and M. Dumas, "Experience Using a Coordination-based Architecture for Adaptive Web Content Provision", In Coordination, pp. 140-156. Springer, 2005.

Braumandl, R. et al., "ObjectGlobe: Ubiquitous query processing on the Internet", Universitat Passau, Lehrstuhl fur Informatik, 94030 Passau, Germany. Technische Universitaat Muunchen, Institut fur Informatik, 81667 Munchen, Germany. Edited by F. Casati, M.-C. Shan, D. Georgakopoulos. Published online Jun. 7, 2001—.sub.—cSpringer-Verlag 2001.

Buyya et al., "An Evaluation of Economy-based Resource Trading and Scheduling on Computational Power Grids for Parameter Sweep Applications," Active Middleware Services, 2000, 10 pages.

Caesar et al., "Design and Implementation of a Routing Control Platform," Usenix, NSDI '05 Paper, Technical Program, obtained from the Internet, on Apr. 13, 2021, at URL <https://www.usenix.org/legacy/event/nsdi05/tech/full_papers/caesar/ca-esar_html/>, 23 pages.

Cardellini, Valeria et al., "Geographic Load Balancing for Scalable Distributed Web Systems", Proceedings of the 8th International Symposium on Modeling, Analysis and Simulation of Computer and Telecommunication Systems, pp. 20-27. 2000.

Cardellini, Valeria et al., "The State of the Art in Locally Distributed Web-Server Systems", ACM Computing Surveys, vol. 34, No. 2, Jun. 2002, pp. 263-311.

Casalicchio, Emiliano, et al., "Static and Dynamic Scheduling Algorithms for Scalable Web Server Farm", University of Roma Tor Vergata, Roma, Italy, 00133.2001. In Proceedings of the IEEE 9.sup.th Euromicro Workshop on Parallel and Distributed Processing, pp. 369-376, 2001.

Chandra, Abhishek et al., "Dynamic Resource Allocation for Shared Data Centers Using Online Measurements" Proceedings of the 11th international conference on Quality of service, Berkeley, CA, USA pp. 381-398. 2003.

Chandra, Abhishek et al., "Quantifying the Benefits of Resource Multiplexing in On-Demand Data Centers", Department of Computer Science, University of Massachusetts Amherst, 2003.

Chapter 1 Overview of the Origin Family Architecture from Origin and Onyx2 Theory of Operations Manual, published 1997, 18 pages.

Chase et al., "Dynamic Virtual Clusters in a Grid Site Manager", Proceedings of the 12.sup.th IEEE International Symposium on High Performance Distributed Comguting (HPDC'03), 2003.

Chawla, Hamesh et al., "HydraNet: Network Support for Scaling of Large-Scale Services",Proceedings of 7th International Conference on Computer Communications and Networks, 1998. Oct. 1998.

Chellappa, Ramnath et al., "Managing Computing Resources in Active Intranets", International Journal of Network Management, 2002, 12:117-128 (DOI:10.1002/nem.4272).

Chen and G. Agrawal, "Resource Allocation in a Middleware for Streaming Data", In Proceedings of the 2.sup.nd Workshop on Middleware for Grid Computing (MGC '04), pp. 5-10, Toronto, Canada, Oct. 2004.

Chen et al., "A flexible service model for advance reservation", Computer Networks, Elsevier science publishers, vol. 37, No. 3-4, pp. 251-262. Nov. 5, 2001.

Chen, et al., "Replicated Servers Allocation for Multiple Information Sources in a Distributed Environment", Department of Computer Science, Hong Kong University of Science and Technology, Clear Water Bay, Kowloon, Hong Kong, Sep. 2000.

Chen, Thomas, "Increasing the Observability of Internet Behavior", Communications of the ACM, vol. 44, No. 1, pp. 93-98, Jan. 2001.

Chen, Xiangping et al., "Performance Evaluation of Service Differentiating Internet Servers", IEEE Transactions on Computers, vol. 51, No. 11, pp. 1368-1375, Nov. 2002.

Cisco MDS 9000 Family Multiprotocol Services Module, published 2006, 13 pages.

Clark, et al., "Providing Scalable Web Service Using Multicast Delivery", College of Computing, Georgia Institute of Technology, Atlanta, GA 30332-0280, 1995.

Clarke and G. Coulson, "An Architecture for Dynamically Extensible Operating Systems", In Proceedings of the 4th International Conference on Configurable Distributed Systems (ICCDS'98), Annapolis, MD, May 1998.

Colajanni, Michele et al., "Analysis of Task Assignment Policies in Scalable Distributed Web-server Systems", IEEE Transactions on Parallel and Distributed Systes, vol. 9, No. 6, Jun. 1998.

Colajanni, P. Yu, V. Cardellini, M. Papazoglou, M. Takizawa, B. Cramer and S. Chanson, "Dynamic Load Balancing in Geographically Distributed Heterogeneous Web Servers", In Proceedings of the 18.sup.th International Conference on Distributed Computing Systems, pp. 295-302, May 1998.

Comparing the I2C BUS to the SMBUS, Maxim Integrated, Dec. 1, 2000, p. 1.

Conti, Marco et al., "Quality of Service Issues in Internet Web Services", IEEE Transactions on Computers, vol. 51, No. 6, pp. 593-594, Jun. 2002.

(56) References Cited

OTHER PUBLICATIONS

Conti, Marco, et al., "Client-side content delivery policies in replicated web services: parallel access versus single server approach", Istituto di Informatica e Telematica (IIT), Italian National Research Council (CNR), Via G. Moruzzi, I. 56124 Pisa, Italy, Performance Evaluation 59 (2005) 137-157, Available online Sep. 11, 2004.
Coomer et al.; "Introduction to the Cluster Grid—Part 1"; Sun Microsystems White Paper; 19 pages; Aug. 2002.
Das et al., "Unifying Packet and Circuit Switched Networks," IEEE Globecom Workshops 2009, Nov. 30, 2009, pp. 1-6.
Deering, "IP Multicast Extensions for 4.3BSD UNIX and related Systems," Jun. 1999, 5 pages.
Devarakonda, V.K. Naik, N. Rajamanim, "Policy-based multi-datacenter resource management", In 6.sup.th IEEE International Workshop on Policies for Distributed Systems and Networks, pp. 247-250, Jun. 2005.
Dilley, John, et al., "Globally Distributed Content Delivery", IEEE Internet Computing, 1089-7801/02/$17.00 .Copyrgt. 2002 IEEE, pp. 50-58, Sep.-Oct. 2002.
Doyle, J. Chase, O. Asad, W. Jin, and A. Vahdat, "Model-Based Resource Provisioning in a Web Service Utility", In Proceedings of the Fourth USENIX Symposium on Internet Technologies and Systems (USITS), Mar. 2003.
Edited by William Gropp, Ewing Lusk and Thomas Sterling, "Beowulf Cluster Computing with Linux," Massachusetts Institute of Technology, 2003.
Elghany et al., "High Throughput High Performance NoC Switch," NORCHIP 2008, Nov. 2008, pp. 237-240.
Ercetin, Ozgur et al., "Market-Based Resource Allocation for Content Delivery in the Internet", IEEE Transactions on Computers, vol. 52, No. 12, pp. 1573-1585, Dec. 2003.
Exhibit 1002, Declaration of Dr. Andrew Wolfe, Ph.D., document filed on behalf of Unified Patents, LLC, in Case No. IPR2022-00136, 110 pages, Declaration dated Nov. 29, 2021.
Exhibit 1008, Declaration of Kevin Jakel, document filed on behalf of Unified Patents, LLC, in Case No. IPR2022-00136, 7 pages, Declaration dated Nov. 4, 2021.
Fan, Li, et al., "Summary Cache: A Scalable Wide-Area Web Cache Sharing Protocol", IEEE/ACM Transactions on networking, vol. 8, No. 3, Jun. 2000.
Feldmann, Anja, et al., "Efficient Policies for Carrying Web Traffic Over Flow-Switched Networks", IEEE/ACM Transactions on Networking, vol. 6, No. 6, Dec. 1998.
Feldmann, Anja, et al., "Reducing Overhead in Flow-Switched Networks: An Empirical Study of Web Traffic", AT&T Labs—Research, Florham Park, NJ, 1998.
Fong, L.L. et al., "Dynamic Resource Management in an eUtility", IBM T. J. Watson Research Center, 0-7803-7382-0/02/$17.00 .Copyrgt. 2002 IEEE.
Foster et al., "A Distributed Resource Management Architecture that Supports Advance Reservations and Co-Allocation," Seventh International Workshop on Quality of Service (IWQoS '99), 1999, pp. 27-36.
Foster, Ian et al., "The Anatomy of the Grid—Enabling Scalable Virtual Organizations", To appear: Intl J. Supercomputer Applications, 2001.
Fox, Armando et al., "Cluster-Based Scalable Network Services", University of California at Berkeley, SOSP—Oct. 16, 1997 Saint-Malo, France, ACM 1997.
fpga4fun.com,"What is JTAG?", 2 pages, Jan. 31, 2010.
From AT to BTX: Motherboard Form Factor, Webopedia, Apr. 29, 2005, p. 1.
Furmento et al. "An Integrated Grid Environment for Component Applications", Proceedings of the Second International Workshop on Grid Computing table of contents, 2001, pp. 26-37.
Furmento et al., "Building computational communities from federated resources." European Conference on Parallel, Springer, Berlin, Heidelberg, pp. 855-863. (Year: 2001).
Garg, Rahul, et al., "A SLA Framework for QoS Provisioning and Dynamic Cagacitx Allocation", 2002.

Gayek, P., et al., "A Web Content Serving Utility", IBM Systems Journal, vol. 43, No. 1, pp. 43-63. 2004.
Genova, Zornitza et al., "Challenges in URL Switching for Implementing Globally Distributed Web Sites", Department of Computer Science and Engineering, University of South Florida, Tampa, Florida 33620. 0-7695-077 I-9/00 $10.00—IEEE. 2000.
Grajcar, Martin, "Genetic List Scheduling Algorithm for Scheduling and Allocation on a Loosely Coupled Heterogeneous Multiprocessor System", Proceedings of the 36.sup.th annual ACM/IEEE Design Automation Conference, New Orleans, Louisiana, pp. 280-285. 1999.
Grecu et al., "A Scalable Communication-Centric SoC Interconnect Architecture" Proceedings 5th International Symposium on Quality Electronic Design, 2005, pp. 343, 348 (full article included).
Grimm, Robert et al., "System Support for Pervasive Applications", ACM Transactions on Computer Systems, vol. 22, No. 4, Nov. 2004, pp. 421-486.
Guo, L. Bhuyan, R. Kumar and S. Basu, "QoS Aware Job Scheduling in a Cluster-Based Web Server for Multimedia Applications", In Proceedings of the 19.sup.th IEEE International Parallel and Distributed Processing Symposium (IPDPS'05), Apr. 2005.
Gupta, A., Kleinberg, J., Kumar, A., Rastogi, R. & Yener, B. "Provisioning a virtual private network: a network design problem for multicommodity flow," Proceedings of the thirty-third annual ACM symposium on Theory of computing [online], Jul. 2001, pp. 389-398, abstract [retrieved on Jun. 14, 2007].Retrieved from the Internet:<URL:http://portal.acm.org/citation.cfm?id=380830&dl=ACM&coll- -=GUIDE>.
Haddad and E. Paquin, "MOSIX: A Cluster Load-Balancing Solution for Linux", In Linux Journal, vol. 2001 Issue 85es, Article No. 6, May 2001.
Hadjiefthymiades, Stathes et al., "Using Proxy Cache Relocation to Accelerate Web Browsing in Wireless/Mobile Communications", University of Athens, Dept. of Informatics and Telecommunications, Panepistimioupolis, Ilisia, Athens, 15784, Greece. WWW10, May 1-5, 2001, Hong Kong.
He XiaoShan; QoS Guided Min-Min Heuristic for Grid Task Scheduling; Jul. 2003, vol. 18, No.4, pp. 442-451 J. Comput. Sci. & Technol.
He XiaoShan; QoS Guided Min-Min Heuristic for Grud Task Scheduling; Jul. 2003, vol. 18, No. 4,pp. 442-451 J. Comput. Sci. & Technol.
Hossain et al., "Extended Butterfly Fat Tree Interconnection (EFTI) Architecture for Network on CHIP," 2005 IEEE Pacific Rim Conference on Communicatinos, Comguters and Signal Processing, Aug. 2005, pp. 613-616.
HP "OpenView OS Manager using Radia software", 5982-7478EN, Rev 1, Nov. 2005; (HP_Nov_2005.pdf; pp. 1-4)
HP ProLiant SL6500 Scalable System, Family data sheet, HP Technical sheet, Sep. 2010 4 pages.
HP Virtual Connect Traffic Flow—Technology brief, Jan. 2012, 22 pages.
Hu, E.C. et al., "Adaptive Fast Path Architecture", Copyright 2001 by International Business Machines Corporation, pp. 191-206, IBM J. Res. & Dev. vol. 45 No. 2 Mar. 2001.
Huang, S. Sebastine and T. Abdelzaher, "An Architecture for Real-Time Active Content Distribution", In Proceedings of the 16.sup.th Euromicro Conference on Real-Time Systems (ECRTS 04), pp. 271-280, 2004.
Huy Tuong Le, "The Data-AWare Resource Broker" Research Project Thesis, Universit of Adelaide, Nov. 2003, pp. 1-63.
IBM Tivoli "IBM Directory Integrator and Tivoli Identity Manager Integration" Apr. 2, 2003, pp. 1-13 online link "http:publib.boulder.ibm.com/tividd/td/ITIM/SC32-1683-00/en_US/HTML/idi_integration/index.html" (Year: 2003).
IBM Tivoli Workload Scheduler job Scheduling Console User's Guide Feature Level 1.2 (Maintenance Release Oct. 2003). Oct. 2003, IBM Corporation, http://publib.boulder.ibm.com/tividd/td/TWS/SH19-4552-01/en.sub.--US/PDF/- jsc.sub.--user.pdf.
Intel, Architecture Guide: Intel® Active Management Technology, Intel.com, Oct. 10, 2008, pp. 1-23, (Year 2008).
IQSearchText-202206090108.txt, publication dated Apr. 6, 2005, 2 pages.

(56) References Cited

OTHER PUBLICATIONS

J. Chase, D. Irwin, L. Grit, J. Moore and S. Sprenkle, "Dynamic Virtual Clusters in a Grid Site Manager", In Proceedings of the 12.sup.th IEEE International Symposium on High Performance Distributed Computing, pp. 90-100, 2003.
Jackson et al., "Grid Computing: Beyond Enablement",; Cluster Resource, Inc., Jan. 21, 2005.
Jann, Joefon et al., "Web Applications and Dynamic Reconfiguration in UNIX Servers", IBM, Thomos J. Watson Research Center, Yorktown' Heights, New York 10598, 0-7803-7756-7/03/$17.00. 2003 IEEE. pp. 186-194.
Jansen et al., "SATA-IO to Develop Specification for Mini Interface Connector" Press Release Sep. 21, 2009, Serial ATA3 pages.
Jarek Nabrzyski, Jennifer M. Schopf and Jan Weglarz, "Grid Resources Management, State of the Art and Future Trends," Kluwer Academic Publishers, 2004.
Jiang, Xuxian et al., "SODA: a Service-On-Demand Architecture for Application Service Hosting Utility Platforms", Proceedings of the 12th IEEE International Symposium on High Performance Distributed Computing (HPDC'03) 1082-8907/03 $17.00 .Copyrgt. 2003 IEEE.
Joseph et al.; "Evolution of grid computing architecture and grid adoption models"; IBM Systems Journal, vol. 43, No. 4; 22 pages; 2004.
Kafil et al., "Optimal Task Assignment in Herterogenous Computing Systems," IEEE, 1997, pp. 135-146.
Kant, Krishna et al., "Server Capacity Planning for Web Traffic Workload", IEEE Transactions on Knowledge and Data Engineering, vol. 11, No. 5, Sep./Oct. 1999, pp. 731-474.
Kapitza, F. J. Hauck, and H. P. Reiser, "Decentralized, Adaptive Services: The AspectIX Approach for a Flexible and Secure Grid Environment", In Proceedings of the Grid Services Engineering and Management Conferences (GSEM, Erfurt, Germany, Nov. 2004), pp. 107-118, LNCS 3270, Springer, 2004.
Kavas et al., "Comparing Windows NT, Linux, and QNX as the Basis for Cluster Systems", Concurrency and Computation Practice & Experience Wiley UK, vol. 13, No. 15, pp. 1303-1332, Dec. 25, 2001.
Koulopoulos, D. et al., "Pleiades: An Internet-based parallel/distributed system", Software-Practice and Experience 2002; 32:1035-1049 (DOI: 10.1002/spe.468).
Kuan-Wei Cheng, Chao-Tung Yang, Chuan-Lin Lai and Shun-Chyi Change, "A parallel loop self-scheduling on grid computing environments," 7th International Symposium on Parallel Architectures, Algorithms and Networks, 2004. Proceedings. 2004, pp. 409-414 (Year: 2004).
Kuz, Ihor et al., "A Distributed-Object Infrastructure for Corporate Websites", Delft University of Technology Vrije Universiteit Vrije Universiteit Delft, The Netherlands, 0-7695-0819-7/00 $10.00 0 2000 IEEE.
Lars C. Wolf et al. "Concepts for Resource Reservation in Advance" Multimedia Tools and Applications. [Online] 1997, pp. 255-278, XP009102070 The Netherlands Retreived from the Internet: URL: http://www.springerlink.com/content/h25481221mu22451/fulltext.pdf [retrieved on Jun. 23, 2008].
Leinberger, W. et al., "Gang Scheduling for Distributed Memory Systems", University of Minnesota—Computer Science and Engineering—Technical Report, Feb. 16, 2000, vol. TR 00-014.
Liao, Raymond, et al., "Dynamic Core Provisioning for Quantitative Differentiated Services", IEEE/ACM Transactions on Networking, vol. 12, No. 3, pp. 429-442, Jun. 2004.
Liu et al. "Design and Evaluation of a Resouce Selection Framework for Grid Applicaitons" High Performance Distributed Computing. 2002. HPDC-11 2002. Proceeding S. 11.sup.th IEEE International Symposium on Jul. 23-26, 2002, Piscataway, NJ, USA IEEE, Jul. 23, 2002, pp. 63-72, XP010601162 ISBN: 978-0-7695-1686-8.
Liu, Simon: "Securing the Clouds: Methodologies and Practices." Encyclopedia of Cloud Computing (2016): 220. (Year: 2016).

Lowell, David et al., "Devirtualizable Virtual Machines Enabling General, Single-Node, Online Maintenance", ASPLOS'04, Oct. 9-13, 2004, Boston, Massachusetts, USA. pp. 211-223, Copyright 2004 ACM.
Lu, Chenyang et al., "A Feedback Control Approach for Guaranteeing Relative Delays in Web Servers", Department of Computer Science, University of Virginia, Charlottesville, VA 22903, 0-7695-1134-1/01 $10.00.2001 IEEE.
Luo Si et al. "A Language Modeling Framework for Resource Selection and Results Merging", Conference on Information and Knowledge Management. 2002 ACM pp. 391-397.
Maheswaran et al., "Dynamic Matching and Scheduling of a Class of Independent Tasks onto Heterogeneous Computing Systems," IEEE, 2000, pp. 1-15.
Mahon, Rob et al., "Cooperative Design in Grid Services", The 8th International Conference on Computer Supported Cooperative Work in Design Proceedings. pp. 406-412. IEEE 2003.
Mateescu et al., "Quality of service on the grid via metascheduling with resource co-scheduling and co-reservation," The International Journal of High Performance Comguting Agglications, 2003, 10 pages.
McCann, Julie, et al., "Patia: Adaptive Distributed Webserver (A Position Paper)", Department of Computing, Imperial College London, SW1 2BZ, UK. 2003.
Montez, Carlos et al., "Implementing Quality of Service in Web Servers", LCMI—Depto de Automacao e Sistemas—Univ. Fed. de Santa Catarina, Caixa Postal 476-88040-900—Florianopolis—SC—Brasil, 1060-9857/02 $17.00. 2002 IEEE.
Naik, S. Sivasubramanian and S. Krishnan, "Adaptive Resource Sharing in a Web Services Environment", In Proceedings of the 5.sup.th ACM/IFIP/USENIX International Conference on Middleware (Middleware '04), pp. 311-330, Springer-Verlag New York, Inc. New York, NY, USA, 2004.
Nakrani and C. Tovey, "On Honey Bees and Dynamic Server Allocation in Internet Hosting Centers", Adaptive Behavior, vol. 12, No. 3-4, pp. 223-240, Dec. 2004.
Nawathe et al., "Implementation of an 8-Core, 64-Thread, Power Efficient SPARC Server on a Chip", IEEE Journal of Solid-State Circuits, vol. 43, No. 1, Jan. 2008, pp. 6-20.
Pacifici, Giovanni et al., "Performance Management for Cluster Based Web Services", IBM TJ Watson Research Center, May 13, 2003.
Pande et al., "Design of a Switch for Network on Chip Applications,"May 25-28, 2003 Proceedings of the 2003 International Symposium on Circuits and Systems, vol. 5, pp. V217-V220.
Petition for Inter Partes Review of U.S. Pat. No. 8,271,980, Challenging Claims 1-5 and 14-15, document filed on behalf of Unified Patents, LLC, in Case No. IPR2022-00136, 92 pages, Petition document dated Nov. 29, 2021.
Ranjan, J. Rolia, H. Fu, and E. Knightly, "QoS-driven Server Migration for Internet Data Centers", In Proceedings of the Tenth International Workshop on Quality of Service (IWQoS 2002), May 2002.
Rashid, Mohammad, et al., "An Analytical Approach to Providing Controllable Differentiated Quality of Service in Web Servers", IEEE Transactions on Parallel and Distributed Systems, vol. 16, No. 11, pp. 1022-1033, Nov. 2005.
Raunak, Mohammad et al., "Implications of Proxy Caching for Provisioning Networks and Servers", IEEE Journal on Selected Areas in Communications, vol. 20, No. 7, pp. 1276-1289, Sep. 2002.
Reed, Daniel et al., "The Next Frontier: Interactive and Closed Loop Performance Steering", Department of Computer Science, University of Illinois, Urbana, Illinois 61801, International Conference on Parallel Processing Workshop, 1996.
Reumann, John et al., "Virtual Services: A New Abstraction for Server Consolidation", Proceedings of 2000 USENIX Annual Technical Conference, San Diego, California, Jun. 18-23, 2000.
Roblitz et al., "Resource Reservations with Fuzzy Requests", Concurrency and computation: Practice and Exgerience, 2005.
Rolia, S. Singhal, and R. Friedrich, "Adaptive Internet data centers", In Proceedings of the International Conference on Advances

(56) References Cited

OTHER PUBLICATIONS in Infrastructure for Electronic Business, Science, and Education on the Internet (SSGRR '00), Jul. 2000.

Rolia, X. Zhu, and M. Arlitt, "Resource Access Management for a Utility Hosting Enterprise Applications", In Proceedings of the 8th IFIP/IEEE International Symposium on Integrated Network Management (IM), pp. 549-562, Colorado Springs, Colorado, USA, Mar. 2003.

Roy, Alain, "Advance Reservation API", University of Wisconsin—Madison, GFD-E.5, Scheduling Working Groug, May 23, 2002.

Ryu, Kyung Dong et al., "Resource Policing to Support Fine-Grain Cycle Stealing in Networks of Workstations", IEEE Transactions on Parallel and Distributed Systems, vol. 15, No. 10, pp. 878-892, Oct. 2004.

Sacks, Lionel et al., "Active Robust Resource Management in Cluster Computing Using Policies", Journal of Network and Systems Management, vol. 11, No. 3, pp. 329-350, Sep. 2003.

Shaikh, Anees et al., "Implementation of a Service Platform for Online Games", Network Software and Services, IBM T.J. Watson Research Center, Hawthorne, NY 10532, SIGCOMM'04 Workshops, Aug. 30 & Sep. 3, 2004, Portland, Oregon, USA. Copyright 2004 ACM.

Shen, H. Tang, T. Yang, and L. Chu, "Integrated Resource Management for Cluster-based Internet Services", In Proceedings of the 5.sup.th Symposium on Operating Systems Design and Implementation (OSDI '02), pp. 225-238, Dec. 2002.

Shen, L. Chu, and T. Yang, "Supporting Cluster-based Network Services on Functionally Symmetric Software Architecture", In Proceedings of the ACM/IEEE 802004 Conference, Nov. 2004.

Si et al., "Language Modeling Framework for Resource Selection and Results Merging", SIKM 2002, Proceedings of the eleventh international conference on Information and Knowledge Management.

Sit, Yiu-Fai et al., "Cyclone: A High-Performance Cluster-Based Web Server with Socket Cloning", Department of Computer Science and Information Systems, The University of Hong Kong, Cluster Computing vol. 7, issue 1, pp. 21-37, Jul. 2004, Kluwer Academic Publishers.

Sit, Yiu-Fai et al., "Socket Cloning for Cluster-BasedWeb Servers", Department of Computer Science and Information Systems, The University of Hong Kong, Proceedings of the IEEE International Conference on Cluster Computing, IEEE 2002.

Smith et al.; "Grid computing"; MIT Sloan Management Review, vol. 46, Iss. 1.; 5 pages; Fall 2004.

Snell et al., "The Performance Impact of Advance Reservation Meta-Scheduling", Springer-Verlag, Berlin, 2000, pp. 137-153.

Snell, Quinn et al., "An Enterprise-Based Grid Resource Management System", Brigham Young University, Provo, Utah 84602, Proceedings of the 11th IEEE International Symposium on High Performance Distributed Computing, 2002.

Soldatos, John, et al., "On the Building Blocks of Quality of Service in Heterogeneous IP Networks", IEEE Communications Surveys, The Electronic Magazine of Original Peer-Reviewed Survey Articles, vol. 7, No. 1. First Quarter 2005.

Stankovic et al., "The Case for Feedback Control Real-Time Scheduling" 1999, IEEE pp. 1-13.

Stone et al., UNIX Fault Management: A Guide for System Administration, Dec. 1, 1999, ISBN 0-13-026525-X, http://www.informit.com/content/images/013026525X/samplechapter/013026525-.pdf.

Supercluster Research and Development Group, "Maui Administrator's Guide", Internet citation, 2002.

Takahashi et al. "A Programming Interface for Network Resource Management," 1999 IEEE, pp. 34-44.

Tanaka et al. "Resource Manager for Globus-Based Wide-Area Cluster Computing," 1999 IEEE, 8 pages.

Tang, Wenting et al., "Load Distribution via Static Scheduling and Client Redirection for Replicated Web Servers", Department of Computer Science and Engineering, 3115 Engineering Building, Michigan State University, East Lansing, MI 48824-1226, Proceedings of the 2000 International Workshop on Parallel Processing, pp. 127-133, IEEE 2000.

Taylor, M. Surridge, and D. Marvin, "Grid Resources for Industrial Applications", In Proceedings of the IEEE International Conference on Web Services (ICWS 04), pp. 402-409, San Diego, California, Jul. 2004.

Urgaonkar, Bhuvan, et al., "Sharc: Managing CPU and Network Bandwidth in Shared Clusters", IEEE Transactions on Parallel and Distributed Systems, vol. 15, No. 1, pp. 2-17, Jan. 2004.

Venaas, "IPv4 Multicast Address Space Registry," 2013, http://www.iana.org/assignments/multicast-addresses/multicast-addresses.xhtml.

Vidyarthi, A. K. Tripathi, B. K. Sarker, A. Dhawan, and L. T. Yang, "Cluster-Based Multiple Task Allocation in Distributed Computing System", In Proceedings of the 18.sup.th International Parallel and Distributed Processing Symposium (IPDPS'04), p. 239, Santa Fe, New Mexico, Apr. 2004.

Villela, P. Pradhan, and D. Rubenstein, "Provisioning Servers in the Application Tier for E-commerce Systems", In Proceedings of the 12.sup.th IEEE International Workshop on Quality of Service (IWQoS '04), pp. 57-66, Jun. 2004.

Wang, Z., et al., "Resource Allocation for Elastic Traffic: Architecture and Mechanisms", Bell Laboratories, Lucent Technologies, Network Operations and Management Symposium, 2000. 2000 IEEE/IFIP, pp. 157-170. Apr. 2000.

Wesley et al., "Taks Allocation and Precedence Relations for Distributed Real-Time Systems", IEEE Transactions on Computers, vol. C-36, No. 6, pp. 667-679. Jun. 1987.

Wolf et al. "Concepts for Resource Reservation in Advance" Multimedia Tools and Applications, 1997.

Workshop on Performance and Architecture of Web Servers (PAWS-2000) Jun. 17-18, 2000, Santa Clara, CA (Held in conjunction with SIGMETRICS-2000).

Xu, Jun, et al., "Sustaining Availability of Web Services under Distributed Denial of Service Attacks", IEEE Transactions on Computers, vol. 52, No. 2, pp. 195-208, Feb. 2003.

Xu, Zhiwei et al., "Cluster and Grid Superservers: The Dawning Experiences in China", Institute of Computing Technology, Chinese Academy of Sciences, P.O. Box 2704, Beijing 100080, China. Proceedings of the 2001 IEEE International Conference on Cluster Computing. IEEE 2002.

Yang, Chu-Sing, et al., "Building an Adaptable, Fault Tolerant, and Highly Manageable Web Server on Clusters of Non-dedicated Workstations", Department of Computer Science and Engineering, National Sun Yat-Sen University, Kaohsiung, Taiwan, R.O.C. 2000.

Zeng, Daniel et al., "Efficient Web Content Delivery Using Proxy Caching Techniques", IEEE Transactions on Systems, Man, and Cybernetics—Part C: Applications and Reviews, vol. 34, No. 3, pp. 270-280, Aug. 2004.

Zhang, Qian et al., "Resource Allocation for Multimedia Streaming Over the Internet", IEEE Transactions on Multimedia, vol. 3, No.3, pp. 339-355, Sep. 2001.

Notice of Allowance on U.S. Appl. No. 16/537,256 dated Jan. 12, 2023.

Office Action on U.S. Appl. No. 17/171,152 dated Dec. 21, 2022.

Advisory Action on U.S. Appl. No. 17/697,368 dated Jan. 13, 2023.

Advisory Action on U.S. Appl. No. 17/697,403 dated Jan. 13, 2023.

Office Action on U.S. Appl. No. 17/835,159 dated Jan. 13, 2023.

Office Action on U.S. Appl. No. 17/697,235 dated Jul. 14, 2023.

Office Action on U.S. Appl. No. 17/697,403 dated Jul. 14, 2023.

Notice of Allowance in U.S. Appl. No. 17/980,865, dated Jul. 18, 2023.

Office Action on U.S. Appl. No. 17/697,368 dated Mar. 29, 2023.

Office Action on U.S. Appl. No. 17/088,954, dated Mar. 15, 2023.

Office Action, Advisory Action, on U.S. Appl. No. 17/711,242, dated Mar. 3, 2023.

SYSTEM AND METHOD OF PROVIDING SYSTEM JOBS WITHIN A COMPUTE ENVIRONMENT

PRIORITY CLAIM

The present application is a continuation of U.S. patent application Ser. No. 17/700,847, filed Mar. 22, 2022 (now U.S. Pat. No. 11,537,435), which is a continuation of U.S. patent application Ser. No. 17/532,667, filed Nov. 22, 2021 (now U.S. Pat. No. 11,709,709), which is a continuation of U.S. patent application Ser. No. 17/470,209, filed Sep. 9, 2021 (now U.S. Pat. No. 11,656,907), which is a continuation of U.S. patent application Ser. No. 16/751,851, filed Jan. 24, 2020 (now U.S. Pat. No. 11,144,355), which is a continuation of U.S. patent application Ser. No. 15/437,135, filed Feb. 20, 2017 (now U.S. Pat. No. 10,585,704), which is a continuation of U.S. patent application Ser. No. 14/872,645 (now U.S. Pat. No. 9,575,805), filed Oct. 1, 2015, which is a continuation of U.S. patent application Ser. No. 13/621,987, filed Sep. 18, 2012, now U.S. Pat. No. 9,152,455, which is a continuation of U.S. patent application Ser. No. 11/718,867, filed May 8, 2007, now U.S. Pat. No. 8,271,980, issued Sep. 18, 2012, which is a National Phase of PCT/US2005/040669, filed Nov. 8, 2005, which claims priority to U.S. Provisional Application No. 60/625,894, filed Nov. 8, 2004, the contents of which are incorporated herein by reference in their entirety.

BACKGROUND

1. Technical Field

The present disclosure relates to managing a compute environment or more specifically to a system and method of modifying or updating a compute environment using system jobs. One embodiment of the disclosure relates to rolling maintenance on a node-by-node basis within the compute environment.

2. Introduction

The present disclosure relates to a system and method of managing resources in the context of a compute environment which may be defined as a grid or cluster of computers. Grid computing may be defined as coordinated resource sharing and problem solving in dynamic, multi-institutional collaborations. Many computing projects require much more computational power and resources than a single computer or computer processor can provide. Networked computers with peripheral resources such as printers, scanners, I/O devices, storage disks, scientific devices and instruments, etc. may need to be coordinated and utilized to complete a task.

Grid cluster resource management generally describes the process of identifying requirements, matching resources to applications, allocating those resources, and scheduling and monitoring compute resources over time in order to run applications or compute jobs as efficiently as possible. Each project will utilize a different set of resources and thus is typically unique. In addition to the challenge of allocating resources for a particular job, administrators also have difficulty obtaining a clear understanding of the resources available, the current status of the environment and available resources, and real-time competing needs of various users. General background information on clusters and grids may be found in several publications. See, e.g., *Grid Resource Management, State of the Art and Future Trench*, Jarek Nabrzyski, Jennifer M. Schopf, and Jan Weglarz, Kluwer Academic Publishers, 2004; and *Beowulf Cluster Computing with Linux*, edited by William Gropp, Ewing Lusk, and Thomas Sterling, Mass. Institute of Technology, 2003.

It is generally understood herein that the terms grid and cluster are interchangeable in that there is no specific definition of either. In general, a grid will disclose a plurality of clusters as will be shown in FIG. 1. Several general challenges exist when attempting to maximize resources in a grid. First, there are typically multiple layers of grid and cluster schedulers. A grid 100 generally disclosure a group of clusters or a group of networked computers. The definition of a grid is very flexible and may mean a number of different configurations of computers. The introduction here is meant to be general given the variety of configurations that are possible. A grid scheduler 102 communicates with a plurality of cluster schedulers 104A, 104B and 104C. Each of these cluster schedulers communicates with a plurality of resource managers 106A, 106B and 106C. Each resource manager communicates with a series of compute resources shown as nodes 108A, 108B, 108C, 108D, 108E, 108F, 108G, 108H, 108I.

Local schedulers (which may refer to the cluster schedulers 104A, 104B, 104C or the resource managers 106A, 106B, 106C) are closer to the specific resources 108 and may not allow grid schedulers 102 direct access to the resources. The resources are grouped into clusters 110, 112 and 114. Examples of cluster resources include data storage devices such as hard drives, compute resources such as computer processors, network resources such as routers and transmission means, and so forth. The grid level scheduler 102 typically does not own or control the actual resources. Therefore, compute jobs are submitted from the high level grid-scheduler 102 to a local set of resources with no more permissions that the user would have. Compute jobs may also be submitted at the cluster scheduler layer of the grid or even directly at the resource managers. There are problems with the efficiency of the arrangement.

The heterogeneous nature of the shared resources causes a reduction in efficiency. Without dedicated access to a resource, the grid level scheduler 102 is challenged with the high degree of variance and unpredictability in the capacity of the resources available for use. Most resources are shared among users and projects and each project varies from the other. The difference in performance goals for various projects also reduces efficiencies. Grid resources are used to improve performance of an application but the resource owners and users have different performance goals: from optimizing the performance for a single application to getting the best system throughput or minimizing response time. Local policies may also play a role in performance.

FIG. 2 illustrates a current stare of art that allows a scheduler/resource manager combination to submit and control standard batch compute jobs. An example of a batch job is a request from a weather service to process a hurricane analysis. The amount of computing resources are large and therefore the job is submitted to a cluster for processing. A batch job is submitted to the queue of a resource manager and is constrained to run within the cluster associated with that resource manager. A batch job 204, 206 or 208 within a queue 202 has the ability to have a number of steps in which each step may have dependencies on other steps, successful or failed completion of previous steps or similar relationships. The hounds of influence for the batch jobs are limited to running non-root applications or executables on that cluster or on compute nodes that are allocated to it.

The respective batch job is unable to do anything outside of the constrained space for the job. There are a number of deficiencies with this approach, particularly in that such a job is unable to modify the scheduling environment. The job is only able to operate within the scheduling environment and it is also constrained to only doing the specified actions. For example, the job may be constrained to run an executable within a compute node of the cluster (within its allocated space), but it is unable to run any other action within the cluster or within the other services of the cluster.

SUMMARY

Additional features and advantages of the disclosure will be set forth in the description which follows, and in part will be obvious from the description, or may be learned by practice. The features and advantages of the disclosure may be realized and obtained by means of the instruments and combinations particularly pointed out in the appended claims. These and other features of the present disclosure will become more fully apparent from the following description and appended claims, or may be learned by the practice as set forth herein.

The disclosure relates to systems, methods and computer-readable storage media for using system jobs for performing actions outside the constraints of batch compute jobs. System jobs may be conceptually thought f as intelligent agents. Typically, controlling and managing the resources within a compute environment such as a cluster or a grid are tasks performed by a scheduler or other management software. No actions, provisioning, or reservations are made outside of the control of this software. The present disclosure provides increased flexibility in managing and controlling, the environment by using entities that are called system jobs that can include triggered events that are outside of events managed by a scheduler. Other concepts that apply to system jobs include state, retry capability, steps, time steps and dependencies.

As an example, the method embodiment of the disclosure includes a method for modifying a compute environment from a system job by associating the system job to a queuable object, triggering the system job based on an event and performing, arbitrary actions on resources in the compute environment. The queuable objects include objects such as batch compute jobs or job reservations. The events that trigger the system job may be time driven, such as ten minutes prior to completion of the batch compute job, or dependent on other actions associated with other system jobs.

Another embodiment of the disclosure relates to performing a rolling maintenance on a compute environment. A method of performing rolling maintenance on a node within a compute environment disclosure receiving a submission of a system job associated with a node, performing a provisioning operation on the node, determining whether the provisioning was successful (health check) and if provisioning was successful, then terminating the system job leaving the node available for use in the compute environment. If the provisioning was not successful, the system job reports an unsuccessful status via means such as an email to an administrator and creates a reservation for the node. Provisioning a node can involve updating software, provisioning an operating system or any other operation that may be performed on that node. The operation on each node is performed on a node by node basis independently and a time associated with the process may be an earliest possible time, a scheduled time or an earliest possible time after a predetermined period of time. System jobs may be submitted at both a grid level and a cluster level within a compute environment.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments and are not therefore to be considered to be limiting of its scope, the disclosed concept will be described and explained with additional specificity and detail through the use of the accompanying drawings in which.

DETAILED DESCRIPTION

Figure 1:
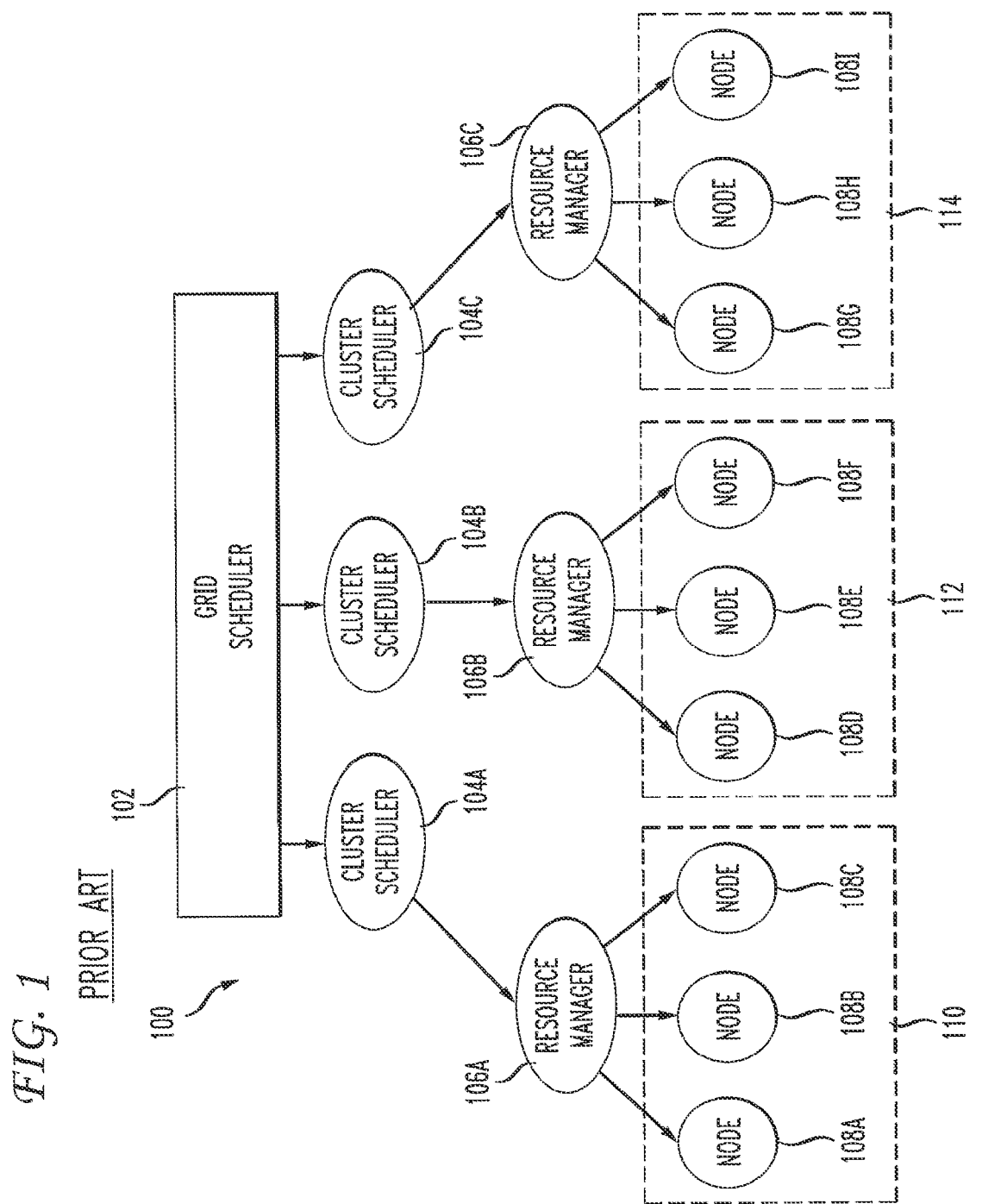
FIG. 1 illustrates generally a grid scheduler, cluster scheduler, and resource managers interacting with compute nodes.
Figure 2:
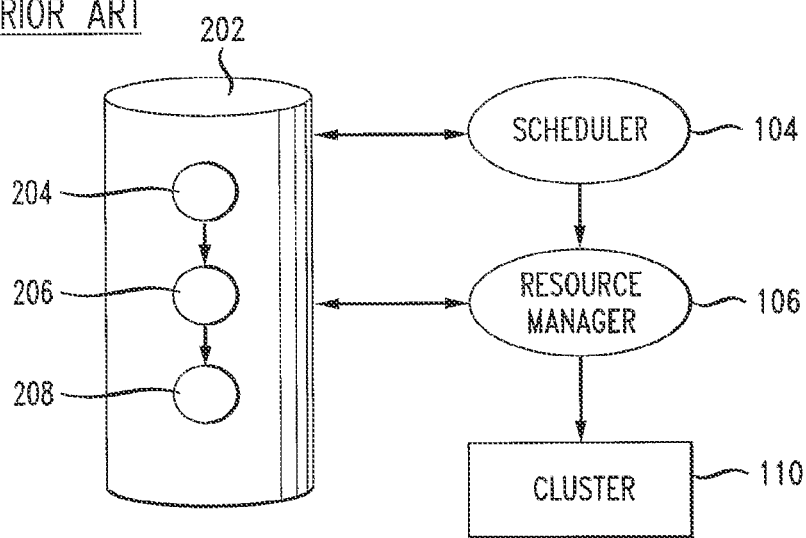
FIG. 2 illustrates a prior art submission of a batch job for processing in a compute environment.

Various embodiments are discussed in detail below. While specific implementations are discussed, it should be understood that this is done for illustration purposes only. A person skilled in the relevant art will recognize that other components and configurations may be used without parting front the spirit and scope of the disclosure.

The present disclosure provides an improvement over the prior art by enabling system jobs or other processing entities that can be queued for processing in a compute environment to perform arbitrary actions on resources outside the compute nodes in the environment. Furthermore, the computing device performing the steps herein causes actions to be taken associated with the submitted job outside the previously constrained space.

Embodiments of the disclosure relate to system jobs, and systems of creating and using system jobs, methods of creating and using system jobs, computer-readable storage media for controlling a computing device to manage system jobs and a compute environment operating according to the principles disclosed herein. As introduced above, one example of a job is a consume job that consumes resources for a particular project, such as a weather study. The present disclosure provides for a different type of job that is flexible and performs other operations and/or modifications in the compute environment. System jobs can be created and/or submitted remotely or internally within a compute environment and can spawn child operations into a resource manager but the master job resides strictly within the workload manager and/or scheduler. System jobs will preferably contain one or more steps with dependencies.

Each step that is involved in processing a system job may consist of one or more tasks where each task modifies the internal and/or external environment of the compute environment or the job. Internal environment changes include, but are not limited to: creating reservations, setting variables, modifying credentials, policies, thresholds, priorities, etc. External changes include modifying resources, database settings, peer interfaces, external credentials, launching arbitrary scripts, launching applications, provisioning resources, etc.

A system job can require several steps to complete its process and terminate. Throughout this process, at various stages, a state of a particular task needs to be identified. Step state is based on success or failure of task execution. Steps can possess triggers. Steps can generate and consume job level and global level variables. Step dependencies can be based on internal or external factors including, but not limited to: job, step, trigger, time, or environment based dependencies. Time dependencies can be based on absolute time, or time relative to some job internal or external event. Dependencies can include local or global variable settings. Dependencies can be based on return value of arbitrary configurable probes.

Steps may optionally allocate resources. Steps may optionally be associated with a walltime. There are several differentiators associated with system jobs. They allow at least one of: (1) integration of environmental data into job flow decisions; (2) creation of arbitrary probes, continuous task retry, etc.; (3) integration of environment data into task execution; (4) dynamic resource reallocation based on results of previous tasks; (5) integration of compute tasks, tasks involving non-compute resources (i.e. data bases, provisioning systems, data managers, etc), and changes to compute environment meta data (such as policies, thresholds, priorities, credential configuration, etc); (6) access to live global cluster and job centric information; (7) envelopment of traditional compute tasks in higher layer wrappers; (8) allowing greater environment management; (8) synchronization of tasks managing unrelated resources and resource types; (9) co-allocation of resources and requirements, scheduling, reservation; (10) guarantees of completion for loose aggregations of request types application of tight and loose time constraints on requests (including periodic window, timeframe proximity, and deadline based constraints); and (11) optimization of loose aggregations of requests.

System jobs are also referred to as workload management object event policies. The purpose of a workload management object event policy is to allow or cause actions to be associated with a workload management object such as a reservation, a compute/system job, a node, a cluster, a user, a resource manger and/or other queue-able workload units that trigger a given action either based on a time criteria or other measurable condition. An example of this can be a system/compute job having an associated event policy that launches a script 10 minutes prior to job completion. This script could send an e-mail to the user notifying them that the job is almost finished, or it can set in action the launch of another job that has a dependency on the results of the initial job being mostly complete. Another example is that of a reservation with an associated event policy that deletes temporary files and restarts all of the reserved nodes to purge them of sensitive data and to clear memory prior to usage by another entity.

An example of the method aspect of the disclosure includes the steps of receiving a request for the creation of an entity to manage or perform at least one operation within a compute environment. The entity is preferably a system job as described herein. The method further includes creating the entity, wherein the entity has arbitrary dependencies, associating the entity with a workload management object and using the entity to perform at least one operation and/or modification on the compute environment.

Figure 3:
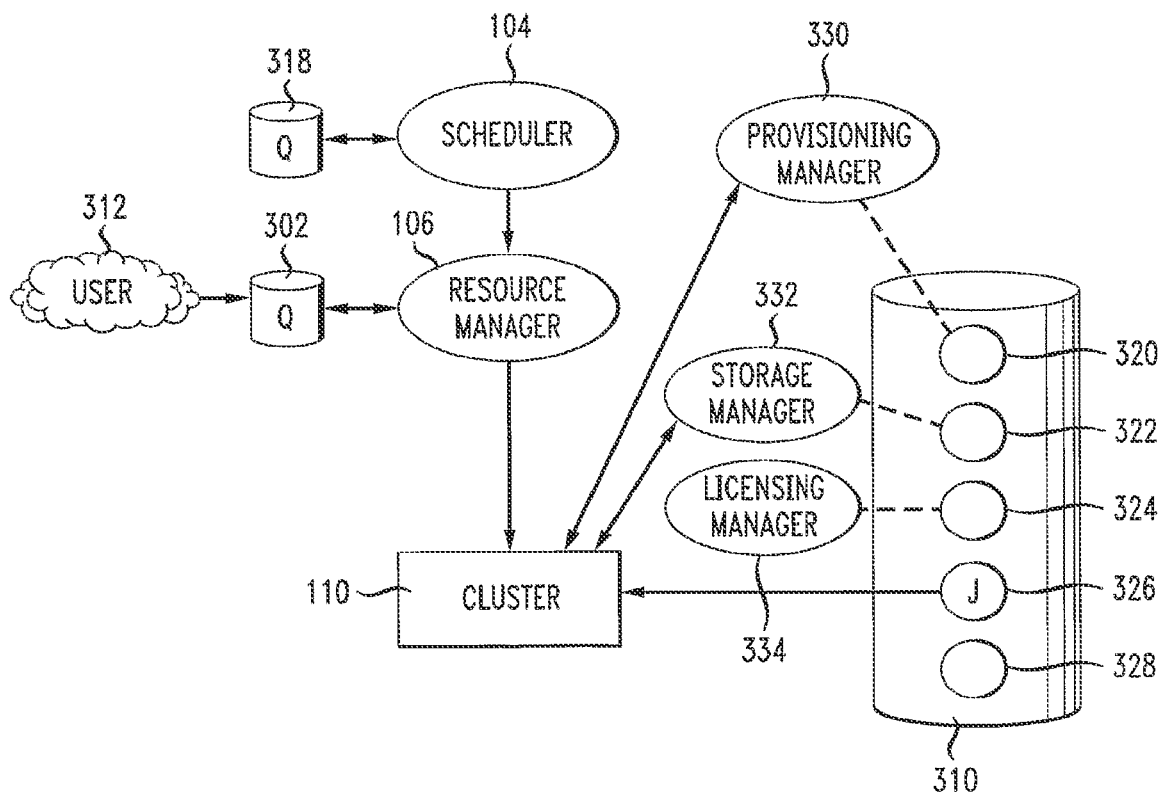
FIG. 3 illustrates the use of system jobs in an architecture according to an aspect of the disclosure.

FIG. 3 illustrates an example of how a system job 326 can be used to set up a virtual private cluster or a job-specific virtual cluster. In FIG. 3, the user 312 submits a job 326 via a queue 302 to a resource manager 106. A queue 318 is also shown as having jobs submitted to the scheduler 104. The queue 310 illustrates in more detail a compute job and system jobs associated with it that will be processed on the cluster 110. While the job 326 is submitted by the user 312, the associated system jobs can be selected by the user 312 or via an automatic process that receives some input from the user 312 and also can reference policy information or service level agreement information to generate system jobs to help to monitor and manager the compute environment for the submitted job 326.

The job steps discussed and the functions performed that are associated with the job can be arbitrary. The concrete examples illustrate how the arbitrary capabilities can be applied. A queue 310 holds a system job 326 and a number of other job steps 320, 322, 324, 328. The first job step 320 involves contacting not the cluster but a provisioning manager 330 to set up a compute environment. The subsequent job step 322 arranges for storage management with a storage manager 332; the third job step 324 contacts a license manager 334 to make sure the applications that are needed are available. The fourth step 326 executes the actual job in the virtual environment within the cluster 110 and the final step 328 involves staging the data out of this environment and destroying or collapsing the virtual cluster.

The above example illustrates the operation of system jobs where there could be any combination of the various tasks associated with a system job. System jobs have a number of distinct differences from standard consume jobs 326. A system operating under the principle described herein provides full support meaning that jobs allow arbitrary dependencies and combinations or relationships between job steps. They also allow arbitrary actions in which arbitrary things can be executed, arbitrary services can be driven, arbitrary data can be modified, arbitrary policies and configurations of the scheduler can be adjusted. They can be set to require resource allocation and can be set up so they only come live when those resources can be allocated and dedicated to the system job. They also have the ability to have arbitrary impact on the system.

Figure 4:
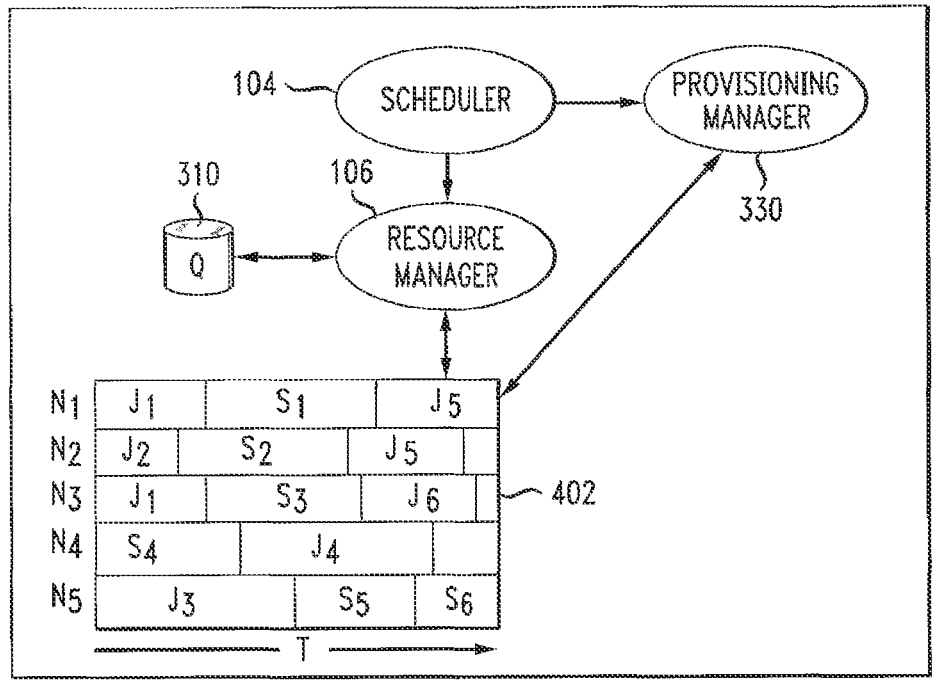
FIG. 4 illustrates the use of system jobs in a cluster of nodes.

FIG. 4 shows an example of using a system job to perform a rolling maintenance. Rolling maintenance can include updating a nodes software, performing rolling provisioning, patches and software upgrades as well as other functions. In a rolling maintenance, a site has a desire to either check or change current applications, operating systems or kernel versions in their compute nodes or other cluster resources. For example, assume that a compute node needs to have software reinstalled and updated. Previously, this process would be done by taking the entire node down after all the jobs assigned to that node are complete, making the system unavailable, installing by hand all the nodes with the new level of software and once checks are made turning all nodes back to the users to continue running jobs. This process is made more efficient by the application of system jobs.

FIG. 4 illustrates a series of nodes 402 with the associated with resource manager 106, scheduler 104 and provisioning manager 330. Using system jobs, a system administrator, rather than performing all the above-mentioned steps, simply submits a system job which performs the update automatically. For example, the system job schedules at the earliest possible time on each node an independent node update, a software update and in addition to updating the node, it also performs a sanity and/or health check. In event of failure, the system job notifies the administrator so that he or she should take action as needed on the nodes that actually failed. This reduces the human administration time required in any update or modification.

Cluster 402 of FIG. 4 illustrates a series of jobs 1-6 running some of the nodes 1-5 with time along the X axis. As shown, node 1 is currently running job 1 and in some time in the future, job 1 will complete and a system job 1 will operate for some time, followed by job 5. Some of these nodes are currently empty, namely node 4 which is running system job 4. When the administrator actually schedules the system job, the system preferably identifies the earliest time that the job could occur on each node. The system job can also be modified to identify any particular time to begin, i.e., it may be instructed to find the earliest time starting one week from today, an earliest possible time from any predetermined time or a scheduled time. For example, on node 4 the job can start immediately, which it does, and then update that node and turns it over to run job 4 which automatically happens as soon as it completes its health and sanity check.

On other nodes the system job is scheduled for immediate processing upon completion of existing workloads. The update is completed as soon as possible and the node is again automatically turned over to user access and jobs (shown as job 6) can begin or continue to run. The system jobs principle takes advantage of the fact that the system jobs are actually not running our on the compute host (die cluster). When a system job requires allocation of a resource such as node 1, as soon as node 1 is available, the job launches a request to the provisioning service 330. The provisioning service 330 then updates the node as necessary to handle the job. As soon as that step of the system job is complete, a health check trigger is launched verifying the node is operational. If the health check trigger is successful, the node if freed and the system job is canceled. If the health check is unsuccessful, an e-mail is sent out and the node is reserved indefinitely. The e-mail is sent to the administrator so he or she can correct whatever problems occurred. In a similar case, in till cases the system job is not actually run on the compute host even though the compute host is allocated and impacted by the system job.

Figure 5:
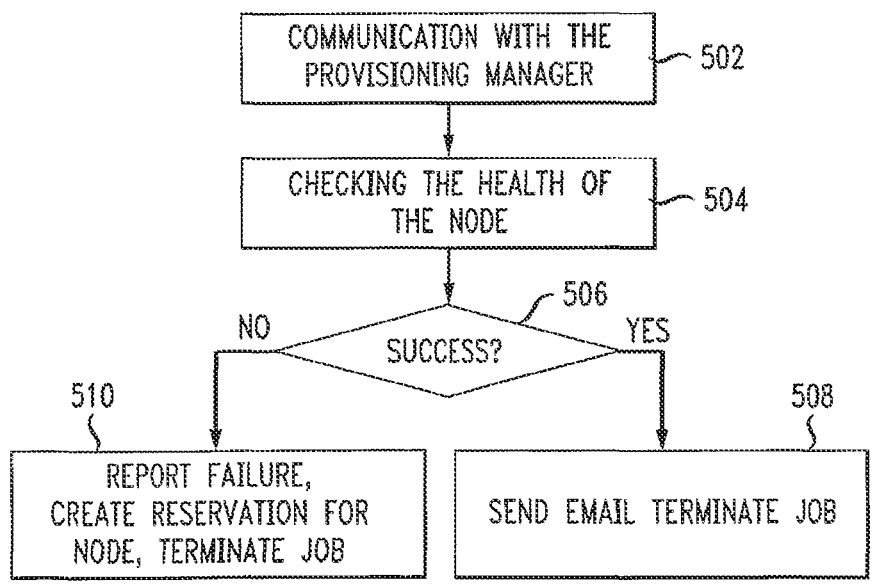
FIG. 5 illustrates a method embodiment of the disclosure.

FIG. 5 illustrates the method aspect of the disclosure related to the use of a system job required for maintenance. The method includes a number of steps performed by the system job. The first step includes the system job transmitting a communication to the provisioning manager to provision an allocated resource (502). Each system job will have a requirement for a specific node. For example, in the example shown in FIG. 5, the system job requires that the system job only runs with regard to node 1 because it requires node 1. The job is not available to start until the node is allocated and dedicated to this job. Once that job runs, it uses the provisioning to provision a particular operating system (or for some other provisioning need) that has been requested.

Next, the method includes running a script that communicates with the node to verity that the provisioning step was properly carried out and that the node is healthy (504). If step 504 reports success (506), then the system job sends and e-mail and terminates the job (508) thus allowing other compute jobs to immediately use the node within the cluster. If step (504) fails (506), then the system job reports the failure, and creates a system reservation for the node, and terminates the job (510) leaving the node in a reserve state until an administrator can respond to the failure and correct the operating system. This example was the application of a system job to allow for rolling maintenance.

Jobs associated with rolling maintenance that are scheduled are not a resource manager process. They are higher level jobs that perform arbitrary tasks outside processes handled by the resource manager. A trigger is a subset of a system job and has dependencies and can interface with web services, local processes, socket interfaces and can manage priorities. This allows an administrator to have the workload manager not being tied to a resource manager. The administrator can schedule a file system backup (e.g., job 1 and 2 will use the file system and job 3 will back up the file system). The scheduler typically has a locked model where the scheduler only knows about the resource manager.

Figure 6:
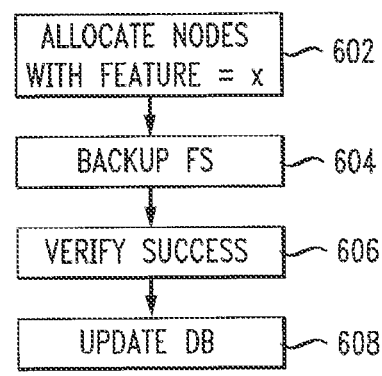
FIG. 6 is a flowchart illustrating an example embodiment of the disclosure.
Figure 7:
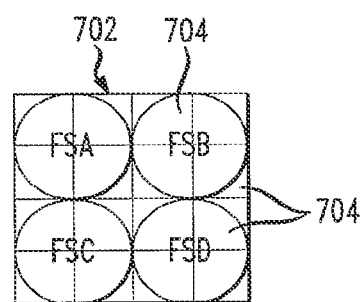
FIG. 7 illustrates a cluster with files system spanning multiple nodes.

FIG. 6 shows another use of a system job, in particular for backing up a file system. In this particular situation, assume that a cluster has a number of file systems available and they are available across a parallel set of nodes. This scenario is illustrated in FIG. 7 in cluster 702 having a variety of sixteen nodes 704 with file system A (ESA), file system B (FSB), file system C (FLC), and file system file system D (FSD). There are four nodes associated with each file system. Suppose the site has a goal of backing up each file system and in order to do that, it must quiesce each individual file system so that there is no activity when it is hacked up. To quiesce each file system means to terminate activity thus allowing aspects of a parallel system to come to a completed state. When a system is quiesced, previously planned transmissions and signals are all delivered and activity is allowed to stop in a natural manner.

To accomplish this set of requirements, an object is created that submits a series of system jobs. The first system job requests allocation of all four nodes associated with file system A (602). This is performed using a feature requirement. Once it has all the nodes dedicated, the first step is that it issues a communication to the backup file system which backs up the file system (604). When that completes, the system job verifies the success of the process (606). In this case, regardless of whether the back was successful, the job reports the verification information and updates the database recording that information and then terminates allowing the nodes to be used by the user (608).

It is possible to modify the scenario slightly in which the file system must be quiesced. The file system can be quiesced for a period of die before everything synchronizes. Within a system job, it is possible to have the ability or step to force a duration, a step can either complete when its task is complete or when a duration has been reached. Therefore, this example could be modified so that step (602) simply to allocate the resources and quiesce them for a period of 10 minutes to allow full synchronization of the parallel aspects followed by the backup step (604) and step (606) which determines the success of the process, and wherein step (608) which updates the database with the success status.

To create a system job there are a number of different models. A system job can be automatically created by submitting a standard job to a particular quality of service where the quality of service requires enablement of special services such as automatic provisioning or dedicated network bandwidth. In such a case, the user submits a standard job with a selected quality of service. For example assume a user submits a job with a quality of service related to a dedicated bandwidth. With such a request, the scheduler would take the job request and encapsulate it in a system job. The first step in a system job 1 is to identify the resources and then communicate with the network manager to dynamically partition the network so as to provide the guaranteed bandwidth. Once that is completed, the system job will proceed to allow the submitted job to process.

The same model is also used to allow data stage-in, data stage-out and have tightly coordinated resource usage after the environment is set up. The system jobs allow one to have a tight time frame control. Without system jobs, normal performance of job steps causes one step to follow the next step but does not constrain how tightly the second step must follow. A system job can tightly constrain steps such that a subsequent job will run immediately following the first job thus allowing chaining of a prerequisite job and post requisite steps. In the situation of a rolling maintenance, within the graphical user interface, a user does not even need to be aware that the system job exists. In most cases, system jobs run "under the covers" to enable outlying functionality. An administrator can indicate in a graphical interface to run a particular script on all nodes which will automatically install the application. The administrator can also indicate that the application will be updated on all nodes using a cluster provisioning manager. The rest of the steps are done automatically without the administrator's knowledge.

An important attribute of system jobs is that a system job is queueable. A system job can have dependency on types of resources, dependency on other system jobs or batch compute jobs. System jobs can incorporate dynamic content sensitive triggers, which allow them to customize the environment or customize the general local scheduling environment. The steps in a system job may or may not have a duration, and they may or may not have a resource allocation or a resource co-allocation. They do have the ability to perform arbitrary execution or use arbitrary services. For example, system jobs can tap in and activate services such as a peer-to-peer service or a resource manager. Furthermore, system jobs can be reserved and can have relative or absolute priority.

Embodiments within the scope of the present disclosure may also include non-transitory computer-readable storage media for carrying or having computer-executable instructions or data structures stored thereon. Such computer-readable media can be any available media that can be accessed by a general purpose or special purpose computer. By way of example, and not limitation, such non-transitory computer-readable media can disclose RAM, ROM, EEPROM, CD-ROM or other optical disk storage, magnetic disk storage or other magnetic storage devices, or any other non-transitory medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. A computer-readable storage medium is limited to hardware storage such as RAM, ROM, hard drives and the like and expressly excludes wireless interfaces or signals per se. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in standalone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the disclosure are part of the scope of this disclosure. Accordingly, the appended claims and their legal equivalents should only define the invention, rather than any specific examples given.

What is claimed is:

1. A non-transitory computer-readable storage medium storing instructions for managing a multi-node compute environment, the instructions which when executed by a processor of a computerized device, perform operations comprising:
    creating at least one software process, the at least one software process configured to be associated with one or more queueable objects operative within the multi-node compute environment, the at least one software process comprising an event policy, the one or more queueable objects operative within the multi-node compute environment comprising one or more compute jobs, the one or more compute jobs scheduled onto one or more respective resources of the multi-node compute environment by a computerized scheduler process of the multi-node compute environment;
    detecting at least one trigger condition associated with the event policy; and
    automatically performing via the at least one software process and based on the detecting, one or more steps necessary to implement one or more requirements specified by a user-configured input to the multi-node compute environment, the user-configured input relating to the one or more queueable objects, and the automatically performing the one or more steps necessary to implement the one or more requirements comprising automated performance of actions on resources that are not schedulable by the computerized scheduler process.

2. The non-transitory computer-readable storage medium of claim 1, wherein the automatically performing the one or more steps comprises automatically performing without further user input or intervention.

3. The non-transitory computer-readable storage medium of claim 1, wherein the at least one software process is configured to operate at a first layer of abstraction, and the one or more queueable objects operate within the multi-node compute environment a second layer of abstraction, the second layer of abstraction being below the first layer of abstraction.

4. The non-transitory computer-readable storage medium of claim 1, wherein the multi-node compute environment comprises a special service, the special service which provisions one or more dedicated resources of the multi-node compute environment.

5. The non-transitory computer-readable storage medium of claim 1, wherein:
the one or more queueable objects comprise one or more rolling maintenance tasks, the one or more rolling maintenance tasks configured to perform node-by-node software updates on at least a portion of a plurality of nodes of the multi-node compute environment; and
the user-configured input relating to the one or more queueable objects further comprises a specification of at least one of an application software update or an operating system (OS) update.

6. The non-transitory computer-readable storage medium of claim 1, wherein the automatic performance of the actions the resources comprises provisioning of at least one node of the multi-node compute environment with a particular operating system (OS), the particular OS specified within the one or more requirements specified by the user-configured input.

7. The non-transitory computer-readable storage medium of claim 1, wherein the one or more steps necessary to implement the one or more requirements specified by the user-configured input to the multi-node compute environment further comprise (i) launching one or more software applications; and (ii) termination of the one or more software applications.

8. The non-transitory computer-readable storage medium of claim 1, wherein:
the at least one software process comprises at least one software object that is queueable within a queue associated with the computerized scheduler process of the multi-node compute environment.

9. The non-transitory computer-readable storage medium of claim 1, wherein the actions on the resources that are not schedulable by the computerized scheduler process comprise actions which are necessary for running at least some of the one or more compute jobs within the multi-node compute environment.

10. The non-transitory computer-readable storage medium of claim 9, wherein the actions which are necessary for running at least some of the one or more compute jobs within the multi-node compute environment comprise actions which must be completed before any running of the at least some of the one or more compute jobs is started.

11. The non-transitory computer-readable storage medium of claim 1, wherein:
the at least one trigger condition associated with the event policy comprises meeting at least one temporal criterion relating to execution of the one or more compute jobs.

12. The non-transitory computer-readable storage medium of claim 1, wherein:
the at least one trigger condition associated with the event policy comprises meeting or exceeding a required level of resources necessary to run the one or more compute jobs.

13. The non-transitory computer-readable storage medium of claim 1, wherein:
the one or more compute jobs are constrained to run within a prescribed compute space of the multi-node compute environment by the computerized scheduler process of the multi-node compute environment; and
the automatically performing the one or more steps necessary to implement the one or more requirements comprises automatically performing actions outside of or not constrained by the prescribed compute space.

14. The non-transitory computer-readable storage medium of claim 1, wherein the one or more queueable objects operative within the multi-node compute environment comprise one or more workload items having one or more reservations for resources within the multi-node compute environment associated therewith.

15. A non-transitory computer-readable storage medium storing instructions for managing at least a portion of a multi-node compute environment, the instructions which when executed by a processor of a computerized device, perform operations comprising:
creating at least one software object, the at least one software object configured to implement a first workload management object event policy;
associating the at least one software object with at least one queueable workload object, wherein execution of the at least one queueable workload object is not performed or caused by the at least one software object; and
performing, via the at least one software object, of one or more actions configured to provision at least one of (i) the multi-node compute environment, or (ii) a resource external to the multi-node compute environment, the one or more actions comprising launch of a second software object, the second software object configured to implement a second workload management object event policy that has at least one dependency on completion of the one or more actions, and the performing of the one or more actions based at least on:
one or more requirements specified in a workload submission to the multi-node compute environment; and
one or more parameters associated with the at least one queueable workload object meeting a prescribed criterion, the prescribed criterion is specified at least in part by the first workload management object event policy.

16. The non-transitory computer-readable storage medium of claim 15, wherein the second workload management object event policy further has at least one dependency on results produced by the execution of the at least one queueable workload object.

17. The non-transitory computer-readable storage medium of claim 15, wherein the one or more actions caused to be performed are associated with resources not managed by a compute workload scheduler process of the multi-node compute environment.

18. The non-transitory computer-readable storage medium of claim 15, wherein the instructions are further configured to, when executed by the processor, specify one or more resource requirements associated with performance of the one or more actions via the first workload management object event policy.

19. A method of operating a multi-node compute cluster having a plurality of compute nodes, a workload scheduler process, and a software process operating on resources external to the workload scheduler process and configured to manage one or more aspects of provisioning of the plurality of compute nodes in support of a user-specified compute workload submission to the multi-node compute cluster, the method comprising:

creating the software process, the software process configured to implement a workload management object event policy associated with the user-specified compute workload submission;

monitoring at least one condition specified by the workload management object event policy, the at least one condition associated with one or more of the plurality of compute nodes, the monitoring of the at least one condition comprising monitoring for completion of execution, by the one or more of the plurality of compute nodes, of one or more queueable workload objects that are not associated with the user-specified compute workload submission;

based at least on the monitoring, performing one or more steps associated with the software process, the one or more steps configured to effect provisioning of the one or more of the plurality of compute nodes to support at least one of a resource requirement or quality requirement specified by the user-specified compute workload submission; and releasing the one or more of the plurality of compute nodes to be used for execution of the one or more queueable workload objects associated with the user-specified compute workload submission.

20. The method of claim 19, wherein the performing the one or more steps associated with the software process comprises causing restart of the one or more of the plurality of compute nodes before the execution of the one or more queueable workload objects that are associated with the user-specified compute workload submission.

21. The method of claim 19, wherein the software process is configured to run on one or more computerized apparatus of the multi-node compute cluster other than the one or more of the plurality of compute nodes.

22. Non-transitory computer-readable storage medium, the non-transitory computer-readable storage medium storing instructions, the instructions when executed by a processor a computerized apparatus of a compute cluster having a compute environment comprising a plurality of compute nodes, perform operations comprising:

creating a software process, the software process configured to implement a workload management object event policy, the workload management object event policy relating to at least one aspect of processing of at least a portion of a user-specified compute workload submission to the compute cluster;

monitoring at least one condition of the compute cluster associated with one or more requirements specified by the workload management object event policy, the monitoring of the at least one condition comprising monitoring for completion of execution by at least one of the plurality of compute nodes, of one or more queueable workload objects that are not associated with the user-specified compute workload submission;

based at least on the monitoring, performing one or more steps associated with the software process, the one or more steps configured to effect provisioning of the at least one of the plurality of compute nodes to support the one or more requirements specified by the compute workload submission, the provisioning utilizing at least one resource external to the compute environment; and based at least on success of the completion of the execution, releasing the at least one of the plurality of compute nodes, the release enabling the at least one of the plurality of compute nodes to be used for execution of queueable workload objects associated with the compute workload submission.

23. The non-transitory computer-readable storage medium of claim 22, wherein the performing the one or more steps associated with the software process further comprises causing restart of the at least one of the plurality of nodes before execution of the one or more queueable workload objects that are associated with the user-specified compute workload submission.

24. The non-transitory computer-readable storage medium of claim 22, wherein the software process is configured to run on one or more computerized apparatus of the multi-node compute cluster other than the at least one of the at least one of the plurality of nodes.

* * * * *